US008811784B2

(12) United States Patent
Mukasa

(10) Patent No.: US 8,811,784 B2
(45) Date of Patent: Aug. 19, 2014

(54) OPTICAL FIBER AND OPTICAL TRANSMISSION SYSTEM

(75) Inventor: Kazunori Mukasa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 2 days.

(21) Appl. No.: 13/602,855

(22) Filed: Sep. 4, 2012

(65) Prior Publication Data

US 2013/0084077 A1    Apr. 4, 2013

Related U.S. Application Data

(63) Continuation of application No. PCT/JP2012/050020, filed on Jan. 4, 2012.

(30) Foreign Application Priority Data

Oct. 4, 2011 (JP) ................................. 2011-220470

(51) Int. Cl.
*G02B 6/32* (2006.01)

(52) U.S. Cl.
USPC .......................................... 385/123; 398/142

(58) Field of Classification Search
CPC ........... G02B 6/02295; G02B 6/02314; G02B 6/02333; G02B 6/02338
USPC .................. 385/123, 126; 398/142
See application file for complete search history.

(56) References Cited

U.S. PATENT DOCUMENTS

| 6,661,958 | B2 * | 12/2003 | Hirano et al. | 385/127 |
|---|---|---|---|---|
| 7,046,887 | B2 * | 5/2006 | Kawanishi et al. | 385/125 |
| 7,502,540 | B2 * | 3/2009 | Miyabe et al. | 385/127 |
| 7,613,374 | B2 * | 11/2009 | Imamura | 385/124 |
| 2002/0172486 | A1 * | 11/2002 | Fermann | 385/128 |
| 2004/0151454 | A1 * | 8/2004 | Fajardo et al. | 385/126 |
| 2005/0069269 | A1 * | 3/2005 | Libori et al. | 385/125 |
| 2005/0157998 | A1 * | 7/2005 | Dong et al. | 385/126 |
| 2006/0133753 | A1 * | 6/2006 | Nelson et al. | 385/125 |

(Continued)

FOREIGN PATENT DOCUMENTS

| JP | 2004-233686 A | 8/2004 |
|---|---|---|
| JP | 2006-292893 | 10/2006 |

(Continued)

OTHER PUBLICATIONS

Imamura, K.; Mukasa, K.; Mimura, Y.; Yagi, T., "Multi-core holey fibers for the long-distance (>>100 km) ultra large capacity transmission," Optical Fiber Communication—incudes post deadline papers, 2009. OFC 2009. Conference on , vol., no., pp. 1,3, Mar. 22-26, 2009.*

(Continued)

*Primary Examiner* — Peter Radkowski
(74) *Attorney, Agent, or Firm* — Oblon, Spivak, McClelland, Maier & Neustadt, L.L.P.

(57) ABSTRACT

An optical fiber that propagates light over a use wavelength bandwidth of 100 nm or wider in a plurality of propagation modes is provided. The optical fiber has: a confinement loss equal to or less than 1 dB/km in each of the plurality of propagation modes over the use wavelength bandwidth; and a bending loss equal to or less than 100 dB/m in each of the plurality of propagation modes over the use wavelength bandwidth when the optical fiber is bent at a diameter of 20 mm.

15 Claims, 44 Drawing Sheets

(56) References Cited

U.S. PATENT DOCUMENTS

| | | | | |
|---|---|---|---|---|
| 2007/0053641 A1* | 3/2007 | Hirano et al. | ............... | 385/124 |
| 2007/0116417 A1* | 5/2007 | Aikawa et al. | ............... | 385/123 |
| 2008/0056656 A1* | 3/2008 | Dong et al. | ............... | 385/125 |
| 2008/0273850 A1* | 11/2008 | Imamura | ............... | 385/126 |
| 2009/0046984 A1* | 2/2009 | Mukasa | ............... | 385/125 |
| 2009/0097810 A1* | 4/2009 | Imamura | ............... | 385/125 |
| 2009/0162020 A1* | 6/2009 | Mukasa | ............... | 385/125 |
| 2009/0324242 A1* | 12/2009 | Imamura | ............... | 398/142 |
| 2010/0054742 A1* | 3/2010 | Imamura | ............... | 398/79 |
| 2011/0305251 A1* | 12/2011 | Tanigawa et al. | ............... | 372/6 |

FOREIGN PATENT DOCUMENTS

| | | |
|---|---|---|
| JP | 2007-522497 | 8/2007 |
| JP | 2007-336253 | 12/2007 |
| JP | 2009-042523 | 2/2009 |
| JP | 2010-197730 A | 9/2010 |
| WO | 2008/093870 A1 | 8/2008 |

OTHER PUBLICATIONS

International Search Report issued on Feb. 7, 2012 for PCT/JP2012/050020 filed on Jan. 4, 2012 (with English translation of categories).
International Written Opinion issued on Feb. 7, 2012 for PCT/JP2012/050020 filed on Jan. 4, 2012.
"Visible to Infrared WDM Transmission over PCF," K. Ieda Kurokawa et al., ECOC2006-Tu3.3.4, 2006.
"Multi-core holey fibers for the long-distance (>100 km) ultra large capacity transmission," Katsunori Imamura et al., OFC2009, No. OTuC3, 2009.
"Experiment on All-optical Demultiplexer for Mode Division Multiplex Communication Technique," Takuya Oda et al., p. 390, Mar. 2, 2010 (with English summary).
"Multi-Core Holey Fibers for Ultra Large Capacity Wide-Band Transmission," Katsunori Imamura et al., The Institute of Electronics, Information and Communication Engineers, IEICE Technical Report, OCS2009-39 (Aug. 2009), vol. 109, No. 178, pp. 57-62, Aug. 20, 2009 (with English Abstract).
"A study on input-power-expanding in Photonic Crystal Fiber," Nobutomo Hanzawa et al., The Institute of Electronics, Information and Communication Engineers, IEICE Technical Report OFT2009-6(May 2009), vol. 109, No. 59, pp. 25-30, May 21, 2009 (with English Abstract).
"Photonic Crystal Fibers(1)—Optical Properties—," M. Fujita et al., Jul. 2002 (with English Abstract).
"Numerical Analysis of Confinement Loss including Bending Effects for Holey Fibers," Kiyoyuki Yokoyama et al., The Institute of Electronics, Information and Communication Engineers, Technical Report of IEICE, LQE2004-164(Jan. 2005), vol. 104, No. 611, pp. 67-72, Jan. 21, 2005 (with English Abstract).
"Multi Core Fibers to Realize Space Division Multiplexing," Katsunori Imamura et al., pp. 11-15, Aug. 2011 (with English summary).
"Ultra wide-band transmission systems comprising a large Aeff Holey Fiber and a wide-band DCF," Kazunori Mukasa et al., The Institute of Electronics, Information and Communication Engineers, IEICE Technical Report OCS2007-95(Jan. 2008), vol. 107, No. 444, pp. 53-56, Jan. 17, 2008 (with English Abstract).
"[Invited] Multi-core and Multi-mode Technique toward Ultra-high Capacity Optical Transmission," Shoichiro Matsuo et al., The Institute of Electronics, Information and Communication Engineers, IEICE Technical Report, MW2011-45, OPE2011-32, EST2011-31, MWP2011-13(Jul. 2011), pp. 39-44, Jul. 21, 2011.
International Search Report issued on Oct. 4, 2011 for PCT/JP2012/050020 filed on Jan. 4, 2012 (with English translation of categories).
International Written Opinion issued on Oct. 4, 2011 for PCT/JP2012/050020 filed on Jan. 4, 2012.
U.S. Appl. No. 13/962,642, filed Aug. 8, 2013, Mukasa.

* cited by examiner

FIG.2

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 10 | 0.50 | LP01 | 0.45 | 1.46573337 | 7.83E-08 | 102.47 | 11.10 | |
| 10 | 0.50 | LP01 | 0.55 | 1.46000634 | 2.66E-15 | 103.43 | 11.16 | 2.79E+01 |
| 10 | 0.50 | LP01 | 0.65 | 1.45654529 | 5.03E-15 | 104.37 | 11.21 | 4.74E+00 |
| 10 | 0.50 | LP01 | 0.75 | 1.45414964 | 1.25E-14 | 105.28 | 11.27 | 1.77E+01 |
| 10 | 0.50 | LP01 | 0.85 | 1.45230157 | 2.26E-14 | 106.17 | 11.32 | 3.39E+01 |
| 10 | 0.50 | LP01 | 0.95 | 1.45074662 | 5.32E-14 | 107.03 | 11.38 | 5.54E+00 |
| 10 | 0.50 | LP01 | 1.05 | 1.44934731 | 4.32E-14 | 107.87 | 11.43 | 4.23E-02 |
| 10 | 0.50 | LP01 | 1.15 | 1.44802375 | 9.11E-14 | 108.69 | 11.48 | 2.39E-02 |
| 10 | 0.50 | LP01 | 1.25 | 1.44672666 | 1.71E-13 | 109.49 | 11.52 | 7.12E-05 |
| 10 | 0.50 | LP01 | 1.35 | 1.44542410 | 2.96E-13 | 110.27 | 11.57 | 8.47E-04 |
| 10 | 0.50 | LP01 | 1.45 | 1.44409438 | 4.91E-13 | 111.04 | 11.62 | 3.69E-04 |
| 10 | 0.50 | LP01 | 1.55 | 1.44272217 | 3.54E-13 | 111.80 | 11.66 | 1.19E-06 |
| 10 | 0.50 | LP01 | 1.65 | 1.44129619 | 1.79E-10 | 112.55 | 11.71 | 1.54E-07 |
| 10 | 0.50 | LP11 | 0.45 | 1.46550783 | 2.12E-05 | 148.50 | 14.66 | |
| 10 | 0.50 | LP11 | 0.55 | 1.45967209 | 3.36E-08 | 151.26 | 14.85 | |
| 10 | 0.50 | LP11 | 0.65 | 1.45608264 | 9.88E-08 | 153.68 | 15.05 | |
| 10 | 0.50 | LP11 | 0.75 | 1.45353941 | 2.50E-07 | 155.73 | 15.25 | |
| 10 | 0.50 | LP11 | 0.85 | 1.45152507 | 5.47E-07 | 157.32 | 15.46 | |
| 10 | 0.50 | LP11 | 0.95 | 1.44978560 | 1.53E-06 | 158.26 | 15.69 | |
| 10 | 0.50 | LP11 | 1.05 | 1.44818396 | 3.98E-06 | 158.32 | 15.92 | |
| 10 | 0.50 | LP11 | 1.15 | 1.44664064 | 1.09E-05 | 157.23 | 16.16 | |
| 10 | 0.50 | LP11 | 1.25 | 1.44510674 | 2.04E-05 | 154.71 | 16.41 | |
| 10 | 0.50 | LP11 | 1.35 | 1.44355067 | 3.70E-05 | 150.62 | 16.67 | |
| 10 | 0.50 | LP11 | 1.45 | 1.44195115 | 8.11E-05 | 145.16 | 16.93 | |
| 10 | 0.50 | LP11 | 1.55 | 1.44029322 | 1.75E-04 | 139.06 | 17.20 | |
| 10 | 0.50 | LP11 | 1.65 | 1.43856600 | 3.72E-04 | 133.51 | 17.47 | 2.43E+02 |

FIG.3

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 10 | 0.60 | LP01 | 0.45 | 1.4657090 | 2.20E-21 | 88.73 | 10.25 | 1.41E+00 |
| 10 | 0.60 | LP01 | 0.55 | 1.4599700 | 5.60E-20 | 89.33 | 10.29 | 9.22E-01 |
| 10 | 0.60 | LP01 | 0.65 | 1.4564944 | 1.72E-20 | 89.94 | 10.33 | 1.59E-01 |
| 10 | 0.60 | LP01 | 0.75 | 1.4540818 | 1.86E-20 | 90.53 | 10.37 | 4.36E-04 |
| 10 | 0.60 | LP01 | 0.85 | 1.4522144 | 5.43E-21 | 91.10 | 10.40 | 1.02E-04 |
| 10 | 0.60 | LP01 | 0.95 | 1.4506376 | 6.57E-21 | 91.67 | 10.44 | 3.88E-06 |
| 10 | 0.60 | LP01 | 1.05 | 1.4492141 | 2.53E-20 | 92.22 | 10.47 | 3.31E-07 |
| 10 | 0.60 | LP01 | 1.15 | 1.4478640 | 5.56E-20 | 92.77 | 10.51 | 8.83E-11 |
| 10 | 0.60 | LP01 | 1.25 | 1.4465380 | 1.02E-19 | 93.31 | 10.54 | 3.55E-05 |
| 10 | 0.60 | LP01 | 1.35 | 1.4452048 | 2.66E-19 | 93.84 | 10.57 | 1.13E-07 |
| 10 | 0.60 | LP01 | 1.45 | 1.4438407 | 3.47E-19 | 94.36 | 10.61 | 1.94E-07 |
| 10 | 0.60 | LP01 | 1.55 | 1.4424325 | 7.89E-19 | 94.89 | 10.64 | 1.01E-11 |
| 10 | 0.60 | LP01 | 1.65 | 1.4409682 | 1.41E-18 | 95.41 | 10.67 | 9.30E-07 |
| 10 | 0.60 | LP11 | 0.45 | 1.4654464 | 4.58E-16 | 118.87 | 12.92 | |
| 10 | 0.60 | LP11 | 0.55 | 1.4595792 | 1.16E-15 | 121.32 | 13.00 | |
| 10 | 0.60 | LP11 | 0.65 | 1.4559516 | 2.45E-15 | 123.39 | 13.07 | 4.51E-01 |
| 10 | 0.60 | LP11 | 0.75 | 1.4533634 | 6.09E-15 | 124.92 | 13.14 | 3.89E-01 |
| 10 | 0.60 | LP11 | 0.85 | 1.4512973 | 1.31E-14 | 125.40 | 13.22 | 3.55E-01 |
| 10 | 0.60 | LP11 | 0.95 | 1.4494992 | 1.83E-13 | 123.52 | 13.29 | 1.26E+00 |
| 10 | 0.60 | LP11 | 1.05 | 1.4478320 | 9.59E-14 | 116.50 | 13.36 | 9.38E-02 |
| 10 | 0.60 | LP11 | 1.15 | 1.4462166 | 2.51E-13 | 102.00 | 13.43 | 1.02E-01 |
| 10 | 0.60 | LP11 | 1.25 | 1.4446047 | 9.87E-13 | 88.84 | 13.49 | 3.48E-03 |
| 10 | 0.60 | LP11 | 1.35 | 1.4429654 | 1.20E-12 | 89.14 | 13.54 | 5.15E-03 |
| 10 | 0.60 | LP11 | 1.45 | 1.4412770 | 2.42E-12 | 96.48 | 13.60 | 3.19E-04 |
| 10 | 0.60 | LP11 | 1.55 | 1.4395240 | 5.77E-12 | 103.74 | 13.65 | 4.44E-04 |
| 10 | 0.60 | LP11 | 1.65 | 1.4376951 | 1.58E-11 | 109.44 | 13.71 | 1.94E-05 |

FIG.4

| Λ μm | d/Λ | MODE | WAVE-LENGTH μm | neff | CONFINE-MENT LOSS dB/m | Aeff μm² | MFD μm | BENDING LOSS dB/m |
|---|---|---|---|---|---|---|---|---|
| 10 | 0.70 | LP01 | 0.45 | 1.4656796 | 1.03E-25 | 76.0 | 9.5 | 2.41E-04 |
| 10 | 0.70 | LP01 | 0.55 | 1.4599256 | 5.65E-25 | 76.4 | 9.5 | 3.48E-06 |
| 10 | 0.70 | LP01 | 0.65 | 1.4564324 | 7.86E-25 | 76.8 | 9.5 | 6.80E-05 |
| 10 | 0.70 | LP01 | 0.75 | 1.4539992 | 4.96E-25 | 77.3 | 9.5 | 2.30E-06 |
| 10 | 0.70 | LP01 | 0.85 | 1.4521084 | 2.87E-25 | 77.7 | 9.6 | 1.08E-07 |
| 10 | 0.70 | LP01 | 0.95 | 1.4505054 | 1.47E-23 | 78.1 | 9.6 | 7.97E-07 |
| 10 | 0.70 | LP01 | 1.05 | 1.4490529 | 1.15E-25 | 78.5 | 9.6 | 3.02E-06 |
| 10 | 0.70 | LP01 | 1.15 | 1.4476709 | 1.32E-24 | 78.9 | 9.7 | 2.19E-06 |
| 10 | 0.70 | LP01 | 1.25 | 1.4463103 | 2.17E-24 | 79.3 | 9.7 | 4.52E-06 |
| 10 | 0.70 | LP01 | 1.35 | 1.4449391 | 2.32E-25 | 79.7 | 9.7 | 8.55E-07 |
| 10 | 0.70 | LP01 | 1.45 | 1.4435357 | 3.17E-24 | 80.1 | 9.7 | 1.17E-05 |
| 10 | 0.70 | LP01 | 1.55 | 1.4420848 | 4.19E-24 | 80.5 | 9.8 | 2.40E-09 |
| 10 | 0.70 | LP01 | 1.65 | 1.4405752 | 5.06E-24 | 80.9 | 9.8 | 5.02E-06 |
| 10 | 0.70 | LP11 | 0.45 | 1.4653671 | 8.51E-24 | 102.3 | 11.8 | 1.65E-04 |
| 10 | 0.70 | LP11 | 0.55 | 1.4594619 | 2.4E-22 | 103.8 | 11.8 | 3.95E-07 |
| 10 | 0.70 | LP11 | 0.65 | 1.4557896 | 1.62E-22 | 105.3 | 11.9 | 3.77E-06 |
| 10 | 0.70 | LP11 | 0.75 | 1.4531500 | 5.32E-22 | 106.4 | 11.9 | 4.76E-05 |
| 10 | 0.70 | LP11 | 0.85 | 1.4510259 | 1.80E-22 | 103.7 | 12.0 | 9.04E-06 |
| 10 | 0.70 | LP11 | 0.95 | 1.4491622 | 3.95E-23 | 73.1 | 12.0 | 1.89E-09 |
| 10 | 0.70 | LP11 | 1.05 | 1.4474251 | 6.54E-23 | 97.7 | 12.1 | 6.38E-08 |
| 10 | 0.70 | LP11 | 1.15 | 1.4457313 | 4.87E-23 | 104.0 | 12.1 | 4.98E-08 |
| 10 | 0.70 | LP11 | 1.25 | 1.4440334 | 1.88E-22 | 106.6 | 12.2 | 2.18E-10 |
| 10 | 0.70 | LP11 | 1.35 | 1.4422995 | 7.18E-22 | 108.3 | 12.2 | 2.41E-10 |
| 10 | 0.70 | LP11 | 1.45 | 1.4405084 | 6.95E-22 | 109.6 | 12.3 | 3.26E-06 |
| 10 | 0.70 | LP11 | 1.55 | 1.4386449 | 2.08E-21 | 110.7 | 12.3 | 2.17E-07 |
| 10 | 0.70 | LP11 | 1.65 | 1.4366981 | 3.45E-21 | 111.7 | 12.4 | 1.61E-11 |
| 10 | 0.70 | LP21 | 0.45 | 1.4649862 | 2.20E-18 | 108.5 | 13.5 | |
| 10 | 0.70 | LP21 | 0.55 | 1.4588888 | 4.80E-18 | 108.9 | 13.6 | 2.11E-02 |
| 10 | 0.70 | LP21 | 0.65 | 1.4549542 | 1.56E-16 | 109.3 | 13.6 | 2.54E+00 |
| 10 | 0.70 | LP21 | 0.75 | 1.4520501 | 5.64E-16 | 109.1 | 13.7 | 3.65E-01 |
| 10 | 0.70 | LP21 | 0.85 | 1.4496280 | 1.99E-15 | 98.0 | 13.8 | 6.71E-01 |
| 10 | 0.70 | LP21 | 0.95 | 1.4474388 | 1.25E-14 | 94.4 | 14.0 | 4.14E-02 |
| 10 | 0.70 | LP21 | 1.05 | 1.4453387 | 8.25E-14 | 111.4 | 14.1 | 7.35E-02 |
| 10 | 0.70 | LP21 | 1.15 | 1.4432530 | 3.62E-13 | 115.1 | 14.2 | 1.54E-01 |
| 10 | 0.70 | LP21 | 1.25 | 1.4411325 | 1.73E-12 | 117.1 | 14.3 | 1.40E-01 |
| 10 | 0.70 | LP21 | 1.35 | 1.4389462 | 7.83E-12 | 118.8 | 14.4 | 1.59E-02 |
| 10 | 0.70 | LP21 | 1.45 | 1.4366728 | 4.02E-11 | 120.4 | 14.5 | 1.53E-02 |
| 10 | 0.70 | LP21 | 1.55 | 1.4342980 | 1.56E-10 | 122.0 | 14.6 | 7.83E-03 |
| 10 | 0.70 | LP21 | 1.65 | 1.4318111 | 7.69E-10 | 123.7 | 14.8 | 1.74E-02 |
| 10 | 0.70 | LP02 | 0.45 | 1.4648218 | 3.37E-15 | 61.1 | 12.0 | |
| 10 | 0.70 | LP02 | 0.55 | 1.4586526 | 1.45E-14 | 62.4 | 12.1 | |
| 10 | 0.70 | LP02 | 0.65 | 1.4546681 | 2.12E-13 | 63.8 | 12.2 | |
| 10 | 0.70 | LP02 | 0.75 | 1.4516697 | 2.12E-12 | 65.4 | 12.4 | |
| 10 | 0.70 | LP02 | 0.85 | 1.4491411 | 2.67E-11 | 67.0 | 12.6 | |
| 10 | 0.70 | LP02 | 0.95 | 1.4468296 | 3.81E-10 | 68.8 | 12.9 | |
| 10 | 0.70 | LP02 | 1.05 | 1.4445992 | 3.99E-09 | 70.9 | 13.1 | |
| 10 | 0.70 | LP02 | 1.15 | 1.4423716 | 4.49E-08 | 73.2 | 13.5 | |
| 10 | 0.70 | LP02 | 1.25 | 1.4400994 | 5.61E-07 | 75.9 | 13.9 | |
| 10 | 0.70 | LP02 | 1.35 | 1.4377525 | 7.20E-06 | 79.3 | 14.5 | |
| 10 | 0.70 | LP02 | 1.45 | 1.4353117 | 9.86E-05 | 83.9 | 15.4 | 2.96E+01 |
| 10 | 0.70 | LP02 | 1.55 | 1.4327648 | 1.50E-03 | 90.8 | 16.7 | 8.39E+01 |
| 10 | 0.70 | LP02 | 1.65 | 1.4301057 | 2.91E-02 | 103.8 | 19.5 | 9.52E+01 |

FIG.5

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 10 | 0.80 | LP01 | 0.45 | 1.46564206 | 2.59E-33 | 64.2 | 8.7 | 1.95E-23 |
| 10 | 0.80 | LP01 | 0.55 | 1.45986951 | 8.03E-33 | 64.5 | 8.7 | 1.28E-24 |
| 10 | 0.80 | LP01 | 0.65 | 1.45635403 | 1.43E-32 | 64.9 | 8.7 | 1.76E-27 |
| 10 | 0.80 | LP01 | 0.75 | 1.45389511 | 1.17E-32 | 65.2 | 8.8 | 1.96E-27 |
| 10 | 0.80 | LP01 | 0.85 | 1.45197502 | 1.21E-33 | 65.5 | 8.8 | 8.76E-30 |
| 10 | 0.80 | LP01 | 0.95 | 1.45033935 | 5.47E-33 | 65.8 | 8.8 | 1.89E-31 |
| 10 | 0.80 | LP01 | 1.05 | 1.44885072 | 4.18E-32 | 66.2 | 8.8 | 1.61E-30 |
| 10 | 0.80 | LP01 | 1.15 | 1.44742930 | 1.52E-31 | 66.5 | 8.8 | 4.07E-31 |
| 10 | 0.80 | LP01 | 1.25 | 1.44602591 | 2.25E-34 | 66.8 | 8.9 | 1.54E-31 |
| 10 | 0.80 | LP01 | 1.35 | 1.44460865 | 1.07E-31 | 67.1 | 8.9 | 1.89E-31 |
| 10 | 0.80 | LP01 | 1.45 | 1.44315592 | 9.38E-32 | 67.5 | 8.9 | 3.74E-30 |
| 10 | 0.80 | LP01 | 1.55 | 1.44165247 | 9.75E-31 | 67.8 | 8.9 | 6.05E-30 |
| 10 | 0.80 | LP01 | 1.65 | 1.44008709 | 2.09E-33 | 68.1 | 9.0 | 1.60E-30 |
| 10 | 0.80 | LP11 | 0.45 | 1.46527993 | 8.41E-30 | 81.1 | 10.8 | 3.99E-19 |
| 10 | 0.80 | LP11 | 0.55 | 1.45933033 | 4.41E-32 | 88.4 | 10.9 | 1.39E-14 |
| 10 | 0.80 | LP11 | 0.65 | 1.45560457 | 1.22E-29 | 89.5 | 10.9 | 1.09E-24 |
| 10 | 0.80 | LP11 | 0.75 | 1.45290264 | 2.23E-29 | 90.0 | 10.9 | 5.25E-25 |
| 10 | 0.80 | LP11 | 0.85 | 1.45070723 | 2.73E-30 | 90.5 | 11.0 | 6.19E-25 |
| 10 | 0.80 | LP11 | 0.95 | 1.44876438 | 9.06E-30 | 91.0 | 11.0 | 1.69E-25 |
| 10 | 0.80 | LP11 | 1.05 | 1.44693707 | 4.56E-29 | 91.5 | 11.0 | 3.10E-26 |
| 10 | 0.80 | LP11 | 1.15 | 1.44514586 | 6.15E-29 | 92.0 | 11.1 | 8.51E-28 |
| 10 | 0.80 | LP11 | 1.25 | 1.44334190 | 3.57E-29 | 92.5 | 11.1 | 1.41E-25 |
| 10 | 0.80 | LP11 | 1.35 | 1.44149367 | 9.06E-30 | 93.1 | 11.1 | 4.31E-27 |
| 10 | 0.80 | LP11 | 1.45 | 1.43957991 | 2.68E-29 | 93.9 | 11.2 | 1.69E-27 |
| 10 | 0.80 | LP11 | 1.55 | 1.43758570 | 1.23E-28 | 94.2 | 11.2 | 3.46E-26 |
| 10 | 0.80 | LP11 | 1.65 | 1.43550015 | 6.62E-29 | 94.7 | 11.2 | 2.33E-27 |
| 10 | 0.80 | LP21 | 0.45 | 1.46482086 | 3.97E-29 | 89.4 | 12.3 | 9.92E-15 |
| 10 | 0.80 | LP21 | 0.55 | 1.45864070 | 6.08E-27 | 88.5 | 12.3 | 1.23E-19 |
| 10 | 0.80 | LP21 | 0.65 | 1.45463765 | 1.63E-27 | 83.1 | 12.3 | 4.58E-19 |
| 10 | 0.80 | LP21 | 0.75 | 1.45161473 | 4.98E-25 | 73.3 | 12.4 | 7.00E-20 |
| 10 | 0.80 | LP21 | 0.85 | 1.44906170 | 3.81E-25 | 91.5 | 12.4 | 9.68E-21 |
| 10 | 0.80 | LP21 | 0.95 | 1.44672023 | 4.68E-24 | 93.5 | 12.5 | 5.14E-23 |
| 10 | 0.80 | LP21 | 1.05 | 1.44445332 | 3.57E-25 | 94.6 | 12.5 | 5.75E-23 |
| 10 | 0.80 | LP21 | 1.15 | 1.44218184 | 9.09E-24 | 95.4 | 12.6 | 1.59E-23 |
| 10 | 0.80 | LP21 | 1.25 | 1.43985730 | 1.18E-23 | 96.3 | 12.6 | 5.63E-23 |
| 10 | 0.80 | LP21 | 1.35 | 1.43744852 | 1.43E-23 | 97.1 | 12.7 | 5.26E-24 |
| 10 | 0.80 | LP21 | 1.45 | 1.43493456 | 9.15E-24 | 97.9 | 12.7 | 3.58E-22 |
| 10 | 0.80 | LP21 | 1.55 | 1.43230084 | 8.02E-25 | 98.7 | 12.7 | 5.20E-23 |
| 10 | 0.80 | LP21 | 1.65 | 1.42953682 | 5.61E-24 | 99.4 | 12.8 | 3.95E-22 |
| 10 | 0.80 | LP02 | 0.45 | 1.46464628 | 5.65E-25 | 51.2 | 10.7 | 5.27E-08 |
| 10 | 0.80 | LP02 | 0.55 | 1.45838590 | 2.08E-24 | 51.9 | 10.8 | 9.67E-13 |
| 10 | 0.80 | LP02 | 0.65 | 1.45429032 | 1.16E-26 | 52.6 | 10.9 | 1.13E-18 |
| 10 | 0.80 | LP02 | 0.75 | 1.45116030 | 7.38E-26 | 53.2 | 10.9 | 5.39E-18 |
| 10 | 0.80 | LP02 | 0.85 | 1.44847921 | 5.21E-26 | 53.9 | 11.0 | 3.32E-18 |
| 10 | 0.80 | LP02 | 0.95 | 1.44599367 | 8.26E-24 | 54.6 | 11.1 | 1.12E-20 |
| 10 | 0.80 | LP02 | 1.05 | 1.44356721 | 8.35E-24 | 55.2 | 11.2 | 4.01E-21 |
| 10 | 0.80 | LP02 | 1.15 | 1.44112088 | 1.43E-24 | 55.9 | 11.2 | 4.53E-22 |
| 10 | 0.80 | LP02 | 1.25 | 1.43860632 | 6.81E-23 | 56.5 | 11.2 | 1.03E-21 |
| 10 | 0.80 | LP02 | 1.35 | 1.43599247 | 6.20E-23 | 57.2 | 11.3 | 5.99E-22 |
| 10 | 0.80 | LP02 | 1.45 | 1.43325854 | 4.41E-23 | 57.9 | 11.4 | 3.83E-23 |
| 10 | 0.80 | LP02 | 1.55 | 1.43039006 | 6.36E-23 | 58.5 | 11.4 | 7.38E-22 |
| 10 | 0.80 | LP02 | 1.65 | 1.42737664 | 1.34E-22 | 59.2 | 11.5 | 4.41E-22 |

FIG.14

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 8 | 0.60 | LP01 | 0.45 | 1.4656144 | 1.38E-20 | 57.45 | 8.26 | 3.81E+00 |
| 8 | 0.60 | LP01 | 0.55 | 1.4598294 | 1.55E-20 | 57.91 | 8.30 | 6.72E-04 |
| 8 | 0.60 | LP01 | 0.65 | 1.4562994 | 1.90E-20 | 58.36 | 8.33 | 8.28E-07 |
| 8 | 0.60 | LP01 | 0.75 | 1.4538241 | 3.34E-20 | 58.80 | 8.37 | 1.62E-09 |
| 8 | 0.60 | LP01 | 0.85 | 1.4518857 | 3.96E-21 | 59.23 | 8.40 | 7.32E-12 |
| 8 | 0.60 | LP01 | 0.95 | 1.4502299 | 2.83E-20 | 59.65 | 8.43 | 3.86E-13 |
| 8 | 0.60 | LP01 | 1.05 | 1.4487194 | 3.64E-19 | 60.07 | 8.47 | 1.18E-13 |
| 8 | 0.60 | LP01 | 1.15 | 1.4472744 | 1.14E-18 | 60.48 | 8.50 | 1.02E-14 |
| 8 | 0.60 | LP01 | 1.25 | 1.4458459 | 1.38E-18 | 60.88 | 8.53 | 2.79E-15 |
| 8 | 0.60 | LP01 | 1.35 | 1.4444019 | 3.87E-18 | 61.29 | 8.56 | 1.89E-15 |
| 8 | 0.60 | LP01 | 1.45 | 1.4429210 | 5.32E-18 | 61.69 | 8.59 | 1.44E-15 |
| 8 | 0.60 | LP01 | 1.55 | 1.4413879 | 9.82E-18 | 62.09 | 8.62 | 6.61E-16 |
| 8 | 0.60 | LP01 | 1.65 | 1.4397916 | 2.65E-17 | 62.50 | 8.66 | 8.05E-16 |
| 8 | 0.60 | LP11 | 0.45 | 1.4652061 | 8.00E-15 | 76.36 | 10.42 | 4.68E+00 |
| 8 | 0.60 | LP11 | 0.55 | 1.4592229 | 9.69E-15 | 78.59 | 10.49 | 3.25E+00 |
| 8 | 0.60 | LP11 | 0.65 | 1.4554582 | 3.75E-14 | 80.47 | 10.56 | 1.85E+01 |
| 8 | 0.60 | LP11 | 0.75 | 1.4527125 | 4.24E-14 | 78.85 | 10.62 | 1.09E+01 |
| 8 | 0.60 | LP11 | 0.85 | 1.4504699 | 8.02E-13 | 56.75 | 10.68 | 6.08E-03 |
| 8 | 0.60 | LP11 | 0.95 | 1.4484804 | 4.10E-13 | 63.96 | 10.81 | 1.08E-03 |
| 8 | 0.60 | LP11 | 1.05 | 1.4466057 | 1.23E-12 | 71.94 | 10.90 | 2.09E-05 |
| 8 | 0.60 | LP11 | 1.15 | 1.4447652 | 2.19E-12 | 75.90 | 10.97 | 9.59E-07 |
| 8 | 0.60 | LP11 | 1.25 | 1.4429101 | 6.24E-12 | 78.37 | 11.03 | 6.11E-07 |
| 8 | 0.60 | LP11 | 1.35 | 1.4410090 | 1.59E-11 | 80.19 | 11.09 | 9.61E-07 |
| 8 | 0.60 | LP11 | 1.45 | 1.4390407 | 3.64E-11 | 81.68 | 11.15 | 1.25E-06 |
| 8 | 0.60 | LP11 | 1.55 | 1.4369903 | 9.19E-11 | 82.97 | 11.21 | 5.53E-08 |
| 8 | 0.60 | LP11 | 1.65 | 1.4348472 | 3.10E-10 | 84.15 | 11.27 | 1.63E-08 |

FIG.15

| Λ | d/Λ | MODE | WAVE-LENGTH | neff | CONFINEMENT LOSS | Aeff | MFD | BENDING LOSS |
|---|---|---|---|---|---|---|---|---|
| μm | | | μm | | dB/m | μm² | μm | dB/m |
| 8 | 0.70 | LP01 | 0.45 | 1.4655679 | 6.84E-26 | 49.1 | 7.6 | 3.61E-11 |
| 8 | 0.70 | LP01 | 0.55 | 1.4597598 | 8.81E-26 | 49.4 | 7.6 | 1.65E-12 |
| 8 | 0.70 | LP01 | 0.65 | 1.4562022 | 2.00E-25 | 49.8 | 7.7 | 2.57E-14 |
| 8 | 0.70 | LP01 | 0.75 | 1.4536948 | 1.54E-25 | 50.1 | 7.6 | 3.75E-14 |
| 8 | 0.70 | LP01 | 0.85 | 1.4517200 | 4.27E-27 | 50.4 | 7.7 | 1.11E-15 |
| 8 | 0.70 | LP01 | 0.95 | 1.4500235 | 1.16E-26 | 50.7 | 7.7 | 1.02E-16 |
| 8 | 0.70 | LP01 | 1.05 | 1.4484680 | 1.17E-24 | 51.0 | 7.8 | 3.21E-17 |
| 8 | 0.70 | LP01 | 1.15 | 1.4469738 | 4.39E-25 | 51.3 | 7.8 | 4.50E-18 |
| 8 | 0.70 | LP01 | 1.25 | 1.4454919 | 1.54E-23 | 51.7 | 7.8 | 7.43E-19 |
| 8 | 0.70 | LP01 | 1.35 | 1.4439904 | 9.47E-24 | 52.0 | 7.8 | 9.28E-20 |
| 8 | 0.70 | LP01 | 1.45 | 1.4424480 | 2.24E-23 | 52.3 | 7.9 | 2.58E-20 |
| 8 | 0.70 | LP01 | 1.55 | 1.4408493 | 2.86E-22 | 52.6 | 7.9 | 9.49E-21 |
| 8 | 0.70 | LP01 | 1.65 | 1.4391835 | 1.29E-24 | 52.9 | 7.9 | 1.46E-21 |
| 8 | 0.70 | LP11 | 0.45 | 1.4650907 | 7.68E-21 | 60.8 | 9.5 | 2.73E-05 |
| 8 | 0.70 | LP11 | 0.55 | 1.4590497 | 2.76E-22 | 52.7 | 9.6 | 3.78E-09 |
| 8 | 0.70 | LP11 | 0.65 | 1.4552172 | 4.39E-23 | 57.3 | 9.6 | 1.34E-11 |
| 8 | 0.70 | LP11 | 0.75 | 1.4523951 | 3.15E-23 | 68.6 | 9.7 | 2.71E-15 |
| 8 | 0.70 | LP11 | 0.85 | 1.4500652 | 2.65E-23 | 70.3 | 9.7 | 4.00E-16 |
| 8 | 0.70 | LP11 | 0.95 | 1.4479738 | 9.61E-22 | 71.0 | 9.8 | 2.67E-16 |
| 8 | 0.70 | LP11 | 1.05 | 1.4459841 | 6.02E-21 | 71.7 | 9.8 | 1.43E-17 |
| 8 | 0.70 | LP11 | 1.15 | 1.4440170 | 1.11E-21 | 72.3 | 9.9 | 5.66E-17 |
| 8 | 0.70 | LP11 | 1.25 | 1.4420239 | 4.18E-21 | 72.8 | 9.9 | 3.28E-18 |
| 8 | 0.70 | LP11 | 1.35 | 1.4399736 | 3.49E-21 | 73.4 | 10.0 | 3.73E-18 |
| 8 | 0.70 | LP11 | 1.45 | 1.4378451 | 5.33E-20 | 73.9 | 10.0 | 3.00E-18 |
| 8 | 0.70 | LP11 | 1.55 | 1.4356238 | 1.41E-19 | 74.5 | 10.0 | 3.62E-18 |
| 8 | 0.70 | LP11 | 1.65 | 1.4332992 | 1.52E-19 | 75.0 | 10.1 | 2.33E-17 |
| 8 | 0.70 | LP21 | 0.45 | 1.4644615 | 1.12E-17 | 70.8 | 11.0 | |
| 8 | 0.70 | LP21 | 0.55 | 1.4581273 | 7.35E-17 | 72.0 | 11.2 | |
| 8 | 0.70 | LP21 | 0.65 | 1.4539518 | 7.36E-16 | 72.8 | 11.3 | |
| 8 | 0.70 | LP21 | 0.75 | 1.4507371 | 6.45E-15 | 73.5 | 11.5 | 4.53E+01 |
| 8 | 0.70 | LP21 | 0.85 | 1.4479673 | 1.00E-13 | 74.0 | 11.6 | 1.92E-02 |
| 8 | 0.70 | LP21 | 0.95 | 1.4453901 | 8.02E-13 | 74.5 | 11.7 | 4.00E-04 |
| 8 | 0.70 | LP21 | 1.05 | 1.4428695 | 7.31E-12 | 74.9 | 11.8 | 4.71E-05 |
| 8 | 0.70 | LP21 | 1.15 | 1.4403271 | 3.73E-11 | 75.4 | 12.0 | 8.96E-06 |
| 8 | 0.70 | LP21 | 1.25 | 1.4377154 | 1.41E-10 | 75.8 | 12.1 | 5.85E-07 |
| 8 | 0.70 | LP21 | 1.35 | 1.4350037 | 1.47E-09 | 76.4 | 12.2 | 3.95E-04 |
| 8 | 0.70 | LP21 | 1.45 | 1.4321720 | 2.89E-09 | 77.1 | 12.3 | 9.12E-05 |
| 8 | 0.70 | LP21 | 1.55 | 1.4292066 | 3.38E-08 | 77.9 | 12.5 | 2.47E-05 |
| 8 | 0.70 | LP21 | 1.65 | 1.4260980 | 2.16E-07 | 78.9 | 12.6 | 8.05E-05 |
| 8 | 0.70 | LP02 | 0.45 | | | | | |
| 8 | 0.70 | LP02 | 0.55 | 1.4578036 | 2.62E-12 | 42.5 | 10.2 | |
| 8 | 0.70 | LP02 | 0.65 | 1.4534995 | 2.22E-10 | 44.2 | 10.4 | |
| 8 | 0.70 | LP02 | 0.75 | 1.4501361 | 1.31E-09 | 46.0 | 10.7 | 1.60E+01 |
| 8 | 0.70 | LP02 | 0.85 | 1.4471990 | 4.65E-08 | 48.0 | 11.0 | 1.30E+00 |
| 8 | 0.70 | LP02 | 0.95 | 1.4444373 | 4.32E-07 | 50.4 | 11.4 | 2.81E+01 |
| 8 | 0.70 | LP02 | 1.05 | 1.4417172 | 4.15E-06 | 53.2 | 12.0 | 1.28E+01 |
| 8 | 0.70 | LP02 | 1.15 | 1.4389633 | 9.16E-05 | 56.9 | 12.7 | 5.10E+01 |
| 8 | 0.70 | LP02 | 1.25 | 1.4361321 | 1.55E-03 | 63.0 | 14.4 | |
| 8 | 0.70 | LP02 | 1.35 | | | | | |
| 8 | 0.70 | LP02 | 1.45 | | | | | |
| 8 | 0.70 | LP02 | 1.55 | | | | | |
| 8 | 0.70 | LP02 | 1.65 | | | | | |

FIG.16

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 8 | 0.80 | LP01 | 0.45 | 1.4655093 | 6.79E-30 | 41.4 | 7.0 | 6.09E-19 |
| 8 | 0.80 | LP01 | 0.55 | 1.4596722 | 3.35E-30 | 41.6 | 7.6 | 2.14E-22 |
| 8 | 0.80 | LP01 | 0.65 | 1.4560801 | 4.87E-30 | 41.9 | 7.0 | 7.81E-22 |
| 8 | 0.80 | LP01 | 0.75 | 1.4535329 | 4.09E-30 | 42.1 | 7.0 | 2.58E-18 |
| 8 | 0.80 | LP01 | 0.85 | 1.4515129 | 5.56E-30 | 42.4 | 7.1 | 2.33E-19 |
| 8 | 0.80 | LP01 | 0.95 | 1.4497660 | 1.63E-30 | 42.7 | 7.1 | 4.14E-18 |
| 8 | 0.80 | LP01 | 1.05 | 1.4481549 | 4.55E-30 | 42.9 | 7.1 | 3.36E-18 |
| 8 | 0.80 | LP01 | 1.15 | 1.4466000 | 7.50E-30 | 43.2 | 7.1 | 3.68E-20 |
| 8 | 0.80 | LP01 | 1.25 | 1.4450524 | 3.92E-30 | 43.5 | 7.2 | 3.75E-20 |
| 8 | 0.80 | LP01 | 1.35 | 1.4434803 | 1.32E-30 | 43.7 | 7.2 | 1.21E-22 |
| 8 | 0.80 | LP01 | 1.45 | 1.4418624 | 2.07E-29 | 44.0 | 7.2 | 1.29E-22 |
| 8 | 0.80 | LP01 | 1.55 | 1.4401835 | 7.70E-29 | 44.3 | 7.2 | 3.22E-23 |
| 8 | 0.80 | LP01 | 1.65 | 1.4384327 | 1.97E-28 | 44.5 | 7.2 | 6.15E-19 |
| 8 | 0.80 | LP11 | 0.45 | 1.4649488 | 2.07E-29 | 56.5 | 8.7 | 1.94E-15 |
| 8 | 0.80 | LP11 | 0.55 | 1.4588390 | 6.99E-29 | 57.4 | 8.7 | 2.52E-21 |
| 8 | 0.80 | LP11 | 0.65 | 1.4549098 | 1.25E-27 | 58.1 | 8.8 | 1.25E-20 |
| 8 | 0.80 | LP11 | 0.75 | 1.4520034 | 1.10E-27 | 58.5 | 8.8 | 6.33E-18 |
| 8 | 0.80 | LP11 | 0.85 | 1.4495613 | 1.37E-29 | 59.0 | 8.9 | 4.25E-18 |
| 8 | 0.80 | LP11 | 0.95 | 1.4473007 | 2.68E-26 | 59.2 | 8.9 | 1.07E-22 |
| 8 | 0.80 | LP11 | 1.05 | 1.4452151 | 5.93E-26 | 59.8 | 8.9 | 8.08E-22 |
| 8 | 0.80 | LP11 | 1.15 | 1.4430957 | 1.42E-27 | 60.3 | 9.0 | 4.33E-24 |
| 8 | 0.80 | LP11 | 1.25 | 1.4409375 | 7.68E-27 | 60.7 | 9.0 | 2.95E-24 |
| 8 | 0.80 | LP11 | 1.35 | 1.4387096 | 3.50E-27 | 61.1 | 9.0 | 1.46E-25 |
| 8 | 0.80 | LP11 | 1.45 | 1.4363911 | 1.24E-26 | 61.5 | 9.1 | 6.82E-25 |
| 8 | 0.80 | LP11 | 1.55 | 1.4339679 | 2.90E-28 | 62.0 | 9.1 | 2.27E-25 |
| 8 | 0.80 | LP11 | 1.65 | 1.4314294 | 1.44E-25 | 62.4 | 9.1 | 6.50E-24 |
| 8 | 0.80 | LP21 | 0.45 | 1.4642290 | 5.29E-27 | 57.6 | 9.8 | 3.48E-12 |
| 8 | 0.80 | LP21 | 0.55 | 1.4577579 | 3.16E-25 | 43.1 | 9.9 | 3.89E-17 |
| 8 | 0.80 | LP21 | 0.65 | 1.4534076 | 5.24E-25 | 59.0 | 9.9 | 3.61E-19 |
| 8 | 0.80 | LP21 | 0.75 | 1.4500194 | 2.37E-24 | 60.2 | 10.0 | 2.43E-22 |
| 8 | 0.80 | LP21 | 0.85 | 1.4470306 | 4.73E-24 | 60.9 | 10.1 | 3.75E-18 |
| 8 | 0.80 | LP21 | 0.95 | 1.4442040 | 2.19E-24 | 61.6 | 10.2 | 1.04E-21 |
| 8 | 0.80 | LP21 | 1.05 | 1.4414039 | 1.66E-25 | 62.3 | 10.2 | 4.16E-23 |
| 8 | 0.80 | LP21 | 1.15 | 1.4385522 | 8.03E-24 | 63.0 | 10.3 | 2.21E-22 |
| 8 | 0.80 | LP21 | 1.25 | 1.4356014 | 7.64E-25 | 63.6 | 10.3 | 1.67E-22 |
| 8 | 0.80 | LP21 | 1.35 | 1.4325212 | 7.16E-23 | 64.3 | 10.4 | 2.50E-22 |
| 8 | 0.80 | LP21 | 1.45 | 1.4292917 | 1.44E-22 | 65.0 | 10.4 | 1.96E-22 |
| 8 | 0.80 | LP21 | 1.55 | 1.4258993 | 8.67E-22 | 65.7 | 10.5 | 1.77E-21 |
| 8 | 0.80 | LP21 | 1.65 | 1.4223345 | 2.20E-22 | 66.4 | 10.5 | 6.12E-19 |
| 8 | 0.80 | LP02 | 0.45 | 1.4639645 | 1.05E-24 | 33.3 | 8.7 | 6.01E-15 |
| 8 | 0.80 | LP02 | 0.55 | 1.4573742 | 1.19E-24 | 33.9 | 8.7 | 1.36E-15 |
| 8 | 0.80 | LP02 | 0.65 | 1.4528879 | 1.39E-23 | 34.4 | 8.8 | 1.05E-17 |
| 8 | 0.80 | LP02 | 0.75 | 1.4493076 | 7.21E-25 | 35.0 | 8.9 | 3.68E-20 |
| 8 | 0.80 | LP02 | 0.85 | 1.4461176 | 5.92E-24 | 35.6 | 9.0 | 3.56E-20 |
| 8 | 0.80 | LP02 | 0.95 | 1.4430658 | 7.48E-25 | 36.2 | 9.0 | 1.88E-21 |
| 8 | 0.80 | LP02 | 1.05 | 1.4400167 | 8.11E-23 | 36.8 | 9.1 | 1.26E-21 |
| 8 | 0.80 | LP02 | 1.15 | 1.4368924 | 1.35E-23 | 37.4 | 9.2 | 5.36E-22 |
| 8 | 0.80 | LP02 | 1.25 | 1.4336458 | 4.98E-26 | 38.0 | 9.3 | 3.82E-21 |
| 8 | 0.80 | LP02 | 1.35 | 1.4302469 | 1.21E-22 | 38.6 | 9.3 | 3.27E-21 |
| 8 | 0.80 | LP02 | 1.45 | 1.4266760 | 5.61E-23 | 39.2 | 9.4 | 4.16E-21 |
| 8 | 0.80 | LP02 | 1.55 | 1.4229200 | 3.26E-21 | 39.8 | 9.5 | 7.88E-21 |
| 8 | 0.80 | LP02 | 1.65 | 1.4189697 | 9.85E-21 | 40.5 | 9.5 | 1.23E-19 |

FIG.23

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 12 | 0.60 | LP01 | 0.45 | 1.4657611 | 5.21E-22 | 126.89 | 12.26 | 5.80E-01 |
| 12 | 0.60 | LP01 | 0.55 | 1.4600473 | 4.19E-21 | 127.62 | 12.30 | 3.27E-01 |
| 12 | 0.60 | LP01 | 0.65 | 1.4566018 | 1.13E-21 | 128.36 | 12.33 | 7.43E-03 |
| 12 | 0.60 | LP01 | 0.75 | 1.4542239 | 4.67E-21 | 129.08 | 12.37 | 4.12E-02 |
| 12 | 0.60 | LP01 | 0.85 | 1.4523958 | 1.36E-21 | 129.80 | 12.41 | 3.39E-01 |
| 12 | 0.60 | LP01 | 0.95 | 1.4508630 | 2.34E-21 | 130.51 | 12.45 | 1.22E-03 |
| 12 | 0.60 | LP01 | 1.05 | 1.4494879 | 1.19E-20 | 131.21 | 12.48 | 1.17E-01 |
| 12 | 0.60 | LP01 | 1.15 | 1.4481906 | 1.54E-20 | 131.89 | 12.52 | 1.83E-05 |
| 12 | 0.60 | LP01 | 1.25 | 1.4469217 | 2.30E-20 | 132.57 | 12.55 | 9.33E-06 |
| 12 | 0.60 | LP01 | 1.35 | 1.4456494 | 7.16E-20 | 133.23 | 12.59 | 2.77E-07 |
| 12 | 0.60 | LP01 | 1.45 | 1.4443517 | 1.44E-19 | 133.89 | 12.62 | 1.24E-07 |
| 12 | 0.60 | LP01 | 1.55 | 1.4430135 | 1.85E-19 | 134.54 | 12.66 | 4.76E-10 |
| 12 | 0.60 | LP01 | 1.65 | 1.4416234 | 3.15E-19 | 135.19 | 12.69 | 1.95E-11 |
| 12 | 0.60 | LP11 | 0.45 | 1.4655780 | 3.73E-17 | 169.61 | 15.45 | |
| 12 | 0.60 | LP11 | 0.55 | 1.4597746 | 1.68E-15 | 172.80 | 15.52 | |
| 12 | 0.60 | LP11 | 0.65 | 1.4562226 | 4.51E-15 | 175.46 | 15.59 | |
| 12 | 0.60 | LP11 | 0.75 | 1.4537217 | 6.24E-15 | 177.58 | 15.66 | |
| 12 | 0.60 | LP11 | 0.85 | 1.4517542 | 8.83E-15 | 179.03 | 15.74 | |
| 12 | 0.60 | LP11 | 0.95 | 1.4500657 | 2.63E-14 | 179.55 | 15.81 | |
| 12 | 0.60 | LP11 | 1.05 | 1.4485191 | 5.76E-14 | 178.66 | 15.88 | 1.26E+00 |
| 12 | 0.60 | LP11 | 1.15 | 1.4470346 | 1.11E-13 | 175.62 | 15.96 | 3.09E-01 |
| 12 | 0.60 | LP11 | 1.25 | 1.4455630 | 2.70E-13 | 169.51 | 16.03 | 4.18E-01 |
| 12 | 0.60 | LP11 | 1.35 | 1.4440726 | 6.44E-13 | 159.74 | 16.10 | 5.15E-02 |
| 12 | 0.60 | LP11 | 1.45 | 1.4425420 | 1.58E-12 | 147.26 | 16.17 | 1.73E-02 |
| 12 | 0.60 | LP11 | 1.55 | 1.4409562 | 3.19E-12 | 135.45 | 16.23 | 1.31E-01 |
| 12 | 0.60 | LP11 | 1.65 | 1.4393041 | 5.41E-12 | 128.35 | 16.29 | 4.44E-03 |

FIG.24

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 12 | 0.70 | LP01 | 0.45 | 1.4657407 | 3.34E-26 | 108.5 | 11.30 | 2.56E-02 |
| 12 | 0.70 | LP01 | 0.55 | 1.4600167 | 5.11E-25 | 109.1 | 11.33 | 1.49E-02 |
| 12 | 0.70 | LP01 | 0.65 | 1.4565589 | 8.29E-26 | 109.6 | 11.36 | 2.40E-06 |
| 12 | 0.70 | LP01 | 0.75 | 1.4541667 | 1.59E-25 | 110.2 | 11.39 | 1.98E-09 |
| 12 | 0.70 | LP01 | 0.85 | 1.4523223 | 1.78E-26 | 110.7 | 11.42 | 1.96E-11 |
| 12 | 0.70 | LP01 | 0.95 | 1.4507712 | 1.92E-25 | 111.2 | 11.45 | 1.61E-11 |
| 12 | 0.70 | LP01 | 1.05 | 1.4493758 | 7.30E-25 | 111.8 | 11.48 | 1.18E-14 |
| 12 | 0.70 | LP01 | 1.15 | 1.4480563 | 3.07E-25 | 112.3 | 11.51 | 4.60E-19 |
| 12 | 0.70 | LP01 | 1.25 | 1.4467632 | 1.03E-24 | 112.8 | 11.53 | 5.02E-23 |
| 12 | 0.70 | LP01 | 1.35 | 1.4454647 | 7.68E-25 | 113.3 | 11.56 | 5.82E-22 |
| 12 | 0.70 | LP01 | 1.45 | 1.4441390 | 1.36E-25 | 113.8 | 11.59 | 3.34E-22 |
| 12 | 0.70 | LP01 | 1.55 | 1.4427708 | 1.99E-24 | 114.3 | 11.62 | 4.99E-22 |
| 12 | 0.70 | LP01 | 1.65 | 1.4413490 | 2.35E-24 | 114.8 | 11.64 | 4.95E-23 |
| 12 | 0.70 | LP11 | 0.45 | 1.4655268 | 1.65E-21 | 147.8 | 14.13 | 1.80E-06 |
| 12 | 0.70 | LP11 | 0.55 | 1.4596975 | 4.93E-22 | 147.9 | 14.18 | 2.64E-02 |
| 12 | 0.70 | LP11 | 0.65 | 1.4561144 | 3.18E-22 | 147.5 | 14.22 | 1.86E-06 |
| 12 | 0.70 | LP11 | 0.75 | 1.4535771 | 1.16E-21 | 146.1 | 14.26 | 2.24E-06 |
| 12 | 0.70 | LP11 | 0.85 | 1.4515680 | 1.59E-22 | 142.5 | 14.31 | 1.59E-07 |
| 12 | 0.70 | LP11 | 0.95 | 1.4498327 | 1.31E-22 | 134.3 | 14.35 | 3.87E-08 |
| 12 | 0.70 | LP11 | 1.05 | 1.4482340 | 2.57E-22 | 117.7 | 14.39 | 1.03E-08 |
| 12 | 0.70 | LP11 | 1.15 | 1.4466928 | 4.95E-21 | 103.7 | 14.44 | 1.26E-07 |
| 12 | 0.70 | LP11 | 1.25 | 1.4451603 | 2.61E-21 | 116.9 | 14.50 | 3.29E-12 |
| 12 | 0.70 | LP11 | 1.35 | 1.4436048 | 3.48E-21 | 134.4 | 14.54 | 1.15E-13 |
| 12 | 0.70 | LP11 | 1.45 | 1.4420043 | 4.20E-21 | 144.7 | 14.59 | 1.70E-14 |
| 12 | 0.70 | LP11 | 1.55 | 1.4403436 | 9.92E-22 | 150.6 | 14.64 | 6.38E-15 |
| 12 | 0.70 | LP11 | 1.65 | 1.4386113 | 7.86E-23 | 154.3 | 14.68 | 8.44E-17 |
| 12 | 0.70 | LP21 | 0.45 | 1.4652583 | 3.80E-19 | 157.1 | 16.22 | 6.31E-01 |
| 12 | 0.70 | LP21 | 0.55 | 1.4592951 | 1.78E-18 | 157.6 | 16.26 | 2.77E-02 |
| 12 | 0.70 | LP21 | 0.65 | 1.4555512 | 8.33E-17 | 157.6 | 16.30 | 1.39E-01 |
| 12 | 0.70 | LP21 | 0.75 | 1.4528263 | 3.01E-17 | 156.6 | 16.35 | 4.07E-03 |
| 12 | 0.70 | LP21 | 0.85 | 1.4506028 | 3.64E-16 | 151.0 | 16.40 | 8.76E-02 |
| 12 | 0.70 | LP21 | 0.95 | 1.4486273 | 4.12E-16 | 115.4 | 16.53 | 1.24E+01 |
| 12 | 0.70 | LP21 | 1.05 | 1.4467572 | 2.89E-15 | 140.5 | 16.41 | 2.32E-01 |
| 12 | 0.70 | LP21 | 1.15 | 1.4449515 | 8.57E-15 | 151.7 | 16.75 | 3.86E-02 |
| 12 | 0.70 | LP21 | 1.25 | 1.4431190 | 2.31E-14 | 157.8 | 16.84 | 4.56E-02 |
| 12 | 0.70 | LP21 | 1.35 | 1.4412410 | 1.94E-13 | 161.1 | 16.93 | 1.21E+00 |
| 12 | 0.70 | LP21 | 1.45 | 1.4392960 | 9.23E-13 | 163.6 | 17.03 | 8.57E-01 |
| 12 | 0.70 | LP21 | 1.55 | 1.4372690 | 3.55E-12 | 165.8 | 17.13 | 2.98E-01 |
| 12 | 0.70 | LP21 | 1.65 | 1.4351492 | 1.33E-11 | 167.9 | 17.24 | 2.56E+00 |
| 12 | 0.70 | LP02 | 0.45 | 1.4651465 | 2.43E-15 | 89.3 | 14.33 | |
| 12 | 0.70 | LP02 | 0.55 | 1.4591326 | 1.28E-14 | 90.6 | 14.43 | 3.06E-01 |
| 12 | 0.70 | LP02 | 0.65 | 1.4553310 | 1.03E-13 | 92.0 | 14.55 | 1.92E-02 |
| 12 | 0.70 | LP02 | 0.75 | 1.4525421 | 9.38E-13 | 93.5 | 14.69 | 2.54E-03 |
| 12 | 0.70 | LP02 | 0.85 | 1.4503491 | 5.79E-12 | 95.1 | 14.84 | 2.45E-01 |
| 12 | 0.70 | LP02 | 0.95 | 1.4481984 | 4.81E-11 | 96.8 | 15.02 | 5.23E+01 |
| 12 | 0.70 | LP02 | 1.05 | 1.4462534 | 3.46E-10 | 98.7 | 15.22 | 1.40E+01 |
| 12 | 0.70 | LP02 | 1.15 | 1.4443350 | 3.38E-09 | 100.7 | 15.45 | 2.35E+00 |
| 12 | 0.70 | LP02 | 1.25 | 1.4423947 | 2.51E-08 | 102.9 | 15.72 | 2.04E+00 |
| 12 | 0.70 | LP02 | 1.35 | 1.4404014 | 1.81E-07 | 105.3 | 16.04 | 2.20E+00 |
| 12 | 0.70 | LP02 | 1.45 | 1.4383343 | 1.40E-06 | 108.2 | 16.42 | 2.23E+01 |
| 12 | 0.70 | LP02 | 1.55 | 1.4361792 | 1.14E-05 | 111.6 | 16.91 | 1.17E+02 |
| 12 | 0.70 | LP02 | 1.65 | 1.4339257 | 9.68E-05 | 115.8 | 17.55 | 1.54E+02 |

FIG.25

| Λ | d/Λ | MODE | WAVE-LENGTH | neff | CONFINE-MENT LOSS | Aeff | MFD | BENDING LOSS |
|---|---|---|---|---|---|---|---|---|
| $\mu m$ | | | $\mu m$ | | dB/m | $\mu m^2$ | $\mu m$ | dB/m |
| 12 | 0.80 | LP01 | 0.45 | 1.4657149 | 4.89E-32 | 92.0 | 10.40 | 2.67E-09 |
| 12 | 0.80 | LP01 | 0.55 | 1.4599779 | 2.47E-31 | 92.4 | 10.42 | 5.34E-12 |
| 12 | 0.80 | LP01 | 0.65 | 1.4565047 | 3.48E-31 | 92.8 | 10.44 | 6.63E-20 |
| 12 | 0.80 | LP01 | 0.75 | 1.4540946 | 4.70E-31 | 93.2 | 10.47 | 3.91E-22 |
| 12 | 0.80 | LP01 | 0.85 | 1.4522298 | 4.13E-31 | 93.6 | 10.49 | 1.59E-25 |
| 12 | 0.80 | LP01 | 0.95 | 1.4506558 | 4.11E-31 | 94.0 | 10.51 | 1.52E-26 |
| 12 | 0.80 | LP01 | 1.05 | 1.4492351 | 1.92E-30 | 94.4 | 10.53 | 4.26E-28 |
| 12 | 0.80 | LP01 | 1.15 | 1.4478879 | 1.41E-30 | 94.8 | 10.56 | 2.09E-26 |
| 12 | 0.80 | LP01 | 1.25 | 1.4465648 | 2.39E-30 | 95.2 | 10.58 | 7.06E-28 |
| 12 | 0.80 | LP01 | 1.35 | 1.4452339 | 6.03E-30 | 95.6 | 10.60 | 7.74E-29 |
| 12 | 0.80 | LP01 | 1.45 | 1.4438734 | 3.77E-30 | 96.0 | 10.63 | 7.26E-29 |
| 12 | 0.80 | LP01 | 1.55 | 1.4424681 | 3.04E-30 | 96.4 | 10.65 | 4.21E-29 |
| 12 | 0.80 | LP01 | 1.65 | 1.4410067 | 5.87E-30 | 96.8 | 10.67 | 1.34E-30 |
| 12 | 0.80 | LP11 | 0.45 | 1.4654624 | 1.24E-29 | 109.8 | 12.99 | 8.93E-07 |
| 12 | 0.80 | LP11 | 0.55 | 1.4596003 | 1.81E-30 | 93.0 | 12.99 | 5.44E-16 |
| 12 | 0.80 | LP11 | 0.65 | 1.4559795 | 2.76E-29 | 113.1 | 13.03 | 1.04E-18 |
| 12 | 0.80 | LP11 | 0.75 | 1.4533984 | 1.95E-28 | 128.1 | 13.07 | 5.42E-21 |
| 12 | 0.80 | LP11 | 0.85 | 1.4513398 | 3.80E-28 | 129.5 | 13.10 | 2.39E-20 |
| 12 | 0.80 | LP11 | 0.95 | 1.4495493 | 1.05E-28 | 130.0 | 13.14 | 6.82E-25 |
| 12 | 0.80 | LP11 | 1.05 | 1.4478897 | 9.04E-30 | 130.5 | 13.18 | 3.53E-25 |
| 12 | 0.80 | LP11 | 1.15 | 1.4462814 | 4.36E-28 | 131.1 | 13.22 | 3.96E-24 |
| 12 | 0.80 | LP11 | 1.25 | 1.4446753 | 3.30E-28 | 131.7 | 13.25 | 3.09E-25 |
| 12 | 0.80 | LP11 | 1.35 | 1.4430395 | 1.55E-28 | 132.4 | 13.29 | 3.61E-26 |
| 12 | 0.80 | LP11 | 1.45 | 1.4413527 | 1.53E-28 | 133.0 | 13.32 | 2.62E-26 |
| 12 | 0.80 | LP11 | 1.55 | 1.4395996 | 1.81E-28 | 133.7 | 13.35 | 7.80E-26 |
| 12 | 0.80 | LP11 | 1.65 | 1.4377692 | 9.47E-28 | 134.4 | 13.39 | 1.45E-26 |
| 12 | 0.80 | LP21 | 0.45 | 1.4651446 | 7.90E-26 | 129.2 | 14.71 | 1.42E-06 |
| 12 | 0.80 | LP21 | 0.55 | 1.4591242 | 1.54E-25 | 128.9 | 14.73 | 1.98E-13 |
| 12 | 0.80 | LP21 | 0.65 | 1.4553116 | 1.74E-25 | 127.8 | 14.75 | 2.22E-15 |
| 12 | 0.80 | LP21 | 0.75 | 1.4525066 | 4.64E-25 | 123.3 | 14.78 | 1.48E-13 |
| 12 | 0.80 | LP21 | 0.85 | 1.4501920 | 1.35E-25 | 98.6 | 14.81 | 5.40E-13 |
| 12 | 0.80 | LP21 | 0.95 | 1.4481181 | 2.61E-24 | 111.0 | 14.85 | 2.97E-14 |
| 12 | 0.80 | LP21 | 1.05 | 1.4461488 | 2.92E-24 | 128.1 | 14.90 | 8.96E-15 |
| 12 | 0.80 | LP21 | 1.15 | 1.4442020 | 2.79E-24 | 132.3 | 14.95 | 2.42E-18 |
| 12 | 0.80 | LP21 | 1.25 | 1.4422286 | 9.99E-25 | 134.3 | 14.99 | 2.97E-19 |
| 12 | 0.80 | LP21 | 1.35 | 1.4401972 | 9.49E-25 | 135.7 | 15.04 | 5.28E-20 |
| 12 | 0.80 | LP21 | 1.45 | 1.4380863 | 3.16E-24 | 136.9 | 15.09 | 8.00E-22 |
| 12 | 0.80 | LP21 | 1.55 | 1.4358809 | 1.28E-23 | 138.0 | 15.13 | 3.95E-21 |
| 12 | 0.80 | LP21 | 1.65 | 1.4335700 | 2.72E-23 | 139.0 | 15.18 | 6.57E-22 |
| 12 | 0.80 | LP02 | 0.45 | 1.4650212 | 5.51E-28 | 73.7 | 12.86 | 6.57E-09 |
| 12 | 0.80 | LP02 | 0.55 | 1.4589431 | 4.18E-26 | 74.4 | 12.92 | 9.37E-13 |
| 12 | 0.80 | LP02 | 0.65 | 1.4550636 | 3.16E-26 | 75.1 | 12.98 | 5.69E-15 |
| 12 | 0.80 | LP02 | 0.75 | 1.4521831 | 2.52E-26 | 75.9 | 13.04 | 2.76E-10 |
| 12 | 0.80 | LP02 | 0.85 | 1.4497843 | 1.47E-25 | 76.6 | 13.10 | 1.19E-12 |
| 12 | 0.80 | LP02 | 0.95 | 1.4476134 | 2.12E-27 | 77.4 | 13.16 | 3.90E-12 |
| 12 | 0.80 | LP02 | 1.05 | 1.4455334 | 4.78E-25 | 78.1 | 13.22 | 1.51E-13 |
| 12 | 0.80 | LP02 | 1.15 | 1.4434651 | 8.99E-25 | 78.9 | 13.28 | 6.74E-15 |
| 12 | 0.80 | LP02 | 1.25 | 1.4413596 | 8.51E-25 | 79.6 | 13.34 | 2.06E-15 |
| 12 | 0.80 | LP02 | 1.35 | 1.4391853 | 2.52E-24 | 80.4 | 13.40 | 2.10E-16 |
| 12 | 0.80 | LP02 | 1.45 | 1.4369211 | 4.38E-25 | 81.1 | 13.45 | 4.72E-18 |
| 12 | 0.80 | LP02 | 1.55 | 1.4345520 | 1.10E-24 | 81.9 | 13.51 | 2.21E-18 |
| 12 | 0.80 | LP02 | 1.65 | 1.4320671 | 4.44E-25 | 82.6 | 13.57 | 1.78E-19 |

FIG.32

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 13.5 | 0.60 | LP01 | 0.45 | 1.465786 | 2.70E-21 | 159.93 | 13.76 | |
| 13.5 | 0.60 | LP01 | 0.55 | 1.465786 | 1.91E-21 | 159.93 | 13.76 | |
| 13.5 | 0.60 | LP01 | 0.65 | 1.456653 | 3.38E-21 | 161.59 | 13.84 | |
| 13.5 | 0.60 | LP01 | 0.75 | 1.454292 | 2.50E-21 | 162.42 | 13.88 | 1.15E+02 |
| 13.5 | 0.60 | LP01 | 0.85 | 1.452483 | 1.17E-20 | 163.24 | 13.91 | 1.32E+01 |
| 13.5 | 0.60 | LP01 | 0.95 | 1.450972 | 1.83E-22 | 164.06 | 13.95 | 2.13E-01 |
| 13.5 | 0.60 | LP01 | 1.05 | 1.449620 | 2.58E-21 | 164.86 | 13.99 | 6.77E-01 |
| 13.5 | 0.60 | LP01 | 1.15 | 1.448348 | 3.84E-21 | 165.66 | 14.03 | 9.83E-02 |
| 13.5 | 0.60 | LP01 | 1.25 | 1.447107 | 2.18E-21 | 166.44 | 14.06 | 1.29E-01 |
| 13.5 | 0.60 | LP01 | 1.35 | 1.445864 | 2.91E-20 | 167.21 | 14.10 | 1.60E-04 |
| 13.5 | 0.60 | LP01 | 1.45 | 1.444599 | 3.41E-20 | 167.97 | 14.13 | 2.14E-05 |
| 13.5 | 0.60 | LP01 | 1.55 | 1.443295 | 3.58E-20 | 168.72 | 14.17 | 2.37E-07 |
| 13.5 | 0.60 | LP01 | 1.65 | 1.441941 | 4.07E-19 | 169.47 | 14.20 | 1.14E-07 |
| 13.5 | 0.60 | LP11 | 0.45 | 1.465641 | 8.94E-16 | 211.82 | 17.37 | |
| 13.5 | 0.60 | LP11 | 0.55 | 1.459868 | 5.45E-16 | 216.24 | 17.43 | |
| 13.5 | 0.60 | LP11 | 0.65 | 1.456353 | 9.69E-16 | 219.93 | 17.50 | |
| 13.5 | 0.60 | LP11 | 0.75 | 1.453894 | 2.65E-15 | 222.85 | 17.57 | |
| 13.5 | 0.60 | LP11 | 0.85 | 1.451974 | 4.53E-15 | 224.89 | 17.64 | |
| 13.5 | 0.60 | LP11 | 0.95 | 1.450338 | 1.93E-14 | 225.79 | 17.71 | |
| 13.5 | 0.60 | LP11 | 1.05 | 1.448850 | 1.91E-14 | 225.15 | 17.78 | |
| 13.5 | 0.60 | LP11 | 1.15 | 1.447429 | 3.98E-14 | 222.42 | 17.85 | |
| 13.5 | 0.60 | LP11 | 1.25 | 1.446026 | 1.35E-13 | 216.96 | 17.92 | |
| 13.5 | 0.60 | LP11 | 1.35 | 1.444610 | 2.52E-13 | 208.39 | 17.99 | |
| 13.5 | 0.60 | LP11 | 1.45 | 1.443158 | 4.42E-13 | 196.99 | 18.06 | 2.86E+01 |
| 13.5 | 0.60 | LP11 | 1.55 | 1.441656 | 8.23E-13 | 184.29 | 18.13 | 3.86E+00 |
| 13.5 | 0.60 | LP11 | 1.65 | 1.440092 | 1.68E-12 | 172.78 | 18.20 | 1.10E+00 |
| 13.5 | 0.60 | LP21 | 0.45 | 1.465063 | 8.67E-02 | 256.05 | 27.08 | |
| 13.5 | 0.60 | LP21 | 0.55 | 1.459013 | 9.06E-02 | 241.82 | 26.39 | |
| 13.5 | 0.60 | LP21 | 0.65 | 1.455171 | 1.21E-01 | 233.25 | 26.14 | |
| 13.5 | 0.60 | LP21 | 0.75 | 1.452338 | 1.52E-01 | 229.37 | 26.12 | |
| 13.5 | 0.60 | LP21 | 0.85 | 1.449995 | 2.05E-01 | 228.63 | 26.25 | |
| 13.5 | 0.60 | LP21 | 0.95 | 1.447889 | 2.85E-01 | 230.07 | 26.49 | |
| 13.5 | 0.60 | LP21 | 1.05 | 1.445883 | 3.90E-01 | 233.18 | 26.81 | |
| 13.5 | 0.60 | LP21 | 1.15 | 1.443898 | 4.78E-01 | 237.66 | 27.16 | |
| 13.5 | 0.60 | LP21 | 1.25 | 1.441885 | 5.49E-01 | 243.34 | 27.56 | |
| 13.5 | 0.60 | LP21 | 1.35 | | | | | |
| 13.5 | 0.60 | LP21 | 1.45 | | | | | |
| 13.5 | 0.60 | LP21 | 1.55 | | | | | |
| 13.5 | 0.60 | LP21 | 1.65 | | | | | |

FIG.33

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 13.5 | 0.70 | LP01 | 0.45 | 1.465770 | 3.54E-26 | 136.87 | 12.70 | |
| 13.5 | 0.70 | LP01 | 0.55 | 1.460060 | 4.28E-26 | 137.50 | 12.73 | 7.62E-01 |
| 13.5 | 0.70 | LP01 | 0.65 | 1.456619 | 7.87E-26 | 138.14 | 12.76 | 9.43E-05 |
| 13.5 | 0.70 | LP01 | 0.75 | 1.454247 | 5.05E-26 | 138.77 | 12.79 | 1.57E-06 |
| 13.5 | 0.70 | LP01 | 0.85 | 1.452425 | 4.84E-26 | 139.40 | 12.82 | 1.11E-04 |
| 13.5 | 0.70 | LP01 | 0.95 | 1.450899 | 1.55E-25 | 140.02 | 12.85 | 1.28E-09 |
| 13.5 | 0.70 | LP01 | 1.05 | 1.449531 | 9.62E-26 | 140.63 | 12.88 | 1.84E-09 |
| 13.5 | 0.70 | LP01 | 1.15 | 1.448241 | 1.84E-25 | 141.23 | 12.91 | 3.11E-12 |
| 13.5 | 0.70 | LP01 | 1.25 | 1.446981 | 7.43E-26 | 141.83 | 12.93 | 2.87E-14 |
| 13.5 | 0.70 | LP01 | 1.35 | 1.445718 | 5.37E-25 | 142.41 | 12.96 | 9.72E-18 |
| 13.5 | 0.70 | LP01 | 1.45 | 1.444430 | 5.76E-25 | 142.99 | 12.99 | 2.55E-19 |
| 13.5 | 0.70 | LP01 | 1.55 | 1.443102 | 4.36E-25 | 143.57 | 13.02 | 1.05E-20 |
| 13.5 | 0.70 | LP01 | 1.65 | 1.441722 | 2.32E-25 | 144.14 | 13.05 | 2.05E-22 |
| 13.5 | 0.70 | LP11_TE | 0.45 | 1.465601 | 7.67E-24 | 183.32 | 15.90 | 1.43E-01 |
| 13.5 | 0.70 | LP11_TE | 0.55 | 1.459807 | 1.16E-23 | 182.69 | 15.94 | 7.66E-04 |
| 13.5 | 0.70 | LP11_TE | 0.65 | 1.456267 | 4.02E-23 | 181.51 | 15.98 | 2.33E-03 |
| 13.5 | 0.70 | LP11_TE | 0.75 | 1.453780 | 1.49E-22 | 179.47 | 16.02 | 4.47E-05 |
| 13.5 | 0.70 | LP11_TE | 0.85 | 1.451827 | 1.14E-22 | 176.05 | 16.07 | 5.36E-05 |
| 13.5 | 0.70 | LP11_TE | 0.95 | 1.450154 | 3.59E-22 | 170.33 | 16.11 | 3.54E-05 |
| 13.5 | 0.70 | LP11_TE | 1.05 | 1.448625 | 3.94E-22 | 161.00 | 16.15 | 3.90E-07 |
| 13.5 | 0.70 | LP11_TE | 1.15 | 1.447159 | 1.03E-21 | 147.24 | 16.19 | 9.55E-08 |
| 13.5 | 0.70 | LP11_TE | 1.25 | 1.445707 | 2.16E-22 | 133.70 | 16.24 | 1.15E-09 |
| 13.5 | 0.70 | LP11_TE | 1.35 | 1.444237 | 7.17E-23 | 134.43 | 16.28 | 5.30E-08 |
| 13.5 | 0.70 | LP11_TE | 1.45 | 1.442729 | 3.71E-23 | 151.14 | 16.33 | 5.36E-12 |
| 13.5 | 0.70 | LP11_TE | 1.55 | 1.441167 | 1.27E-21 | 168.82 | 16.38 | 8.22E-12 |
| 13.5 | 0.70 | LP11_TE | 1.65 | 1.439539 | 1.18E-22 | 181.11 | 16.43 | 3.91E-14 |
| 13.5 | 0.70 | LP21_EH | 0.45 | 1.465389 | 2.50E-19 | 199.99 | 18.30 | 8.34E-02 |
| 13.5 | 0.70 | LP21_EH | 0.55 | 1.459491 | 5.39E-19 | 200.58 | 18.34 | 2.05E+00 |
| 13.5 | 0.70 | LP21_EH | 0.65 | 1.455824 | 1.51E-18 | 200.97 | 18.38 | 1.39E-02 |
| 13.5 | 0.70 | LP21_EH | 0.75 | 1.453189 | 8.05E-18 | 200.86 | 18.42 | 2.29E-03 |
| 13.5 | 0.70 | LP21_EH | 0.85 | 1.451053 | 8.05E-17 | 195.02 | 18.40 | 2.76E-01 |
| 13.5 | 0.70 | LP21_EH | 0.95 | 1.449205 | 1.02E-16 | 187.98 | 18.54 | 5.54E+00 |
| 13.5 | 0.70 | LP21_EH | 1.05 | 1.447466 | 4.79E-16 | 127.95 | 18.70 | 1.59E+01 |
| 13.5 | 0.70 | LP21_EH | 1.15 | 1.445776 | 5.84E-15 | 172.47 | 18.75 | 3.14E+00 |
| 13.5 | 0.70 | LP21_EH | 1.25 | 1.444085 | 2.22E-14 | 188.81 | 18.82 | 5.58E+01 |
| 13.5 | 0.70 | LP21_EH | 1.35 | 1.442359 | 3.46E-13 | 194.94 | 18.90 | 1.23E+00 |
| 13.5 | 0.70 | LP21_EH | 1.45 | 1.440575 | 2.63E-13 | 198.72 | 18.99 | 9.66E+01 |
| 13.5 | 0.70 | LP21_EH | 1.55 | 1.438720 | 1.18E-12 | 201.71 | 19.09 | 2.89E+00 |
| 13.5 | 0.70 | LP21_EH | 1.65 | 1.436781 | 3.99E-12 | 204.37 | 19.19 | 2.94E+00 |
| 13.5 | 0.70 | LP02 | 0.45 | 1.465302 | 3.86E-15 | 113.80 | 16.1235 | 9.23E+00 |
| 13.5 | 0.70 | LP02 | 0.55 | 1.459363 | 1.58E-14 | 115.21 | 16.2208 | 1.62E+01 |
| 13.5 | 0.70 | LP02 | 0.65 | 1.455650 | 7.40E-14 | 116.73 | 16.3331 | 7.25E-01 |
| 13.5 | 0.70 | LP02 | 0.75 | 1.452963 | 3.78E-13 | 118.33 | 16.4616 | 7.58E-01 |
| 13.5 | 0.70 | LP02 | 0.85 | 1.450784 | 1.04E-12 | 120.04 | 16.6076 | 1.58E-01 |
| 13.5 | 0.70 | LP02 | 0.95 | 1.448861 | 1.02E-11 | 121.86 | 16.773 | 2.59E-02 |
| 13.5 | 0.70 | LP02 | 1.05 | 1.447056 | 4.21E-11 | 123.81 | 16.9606 | 9.82E-03 |
| 13.5 | 0.70 | LP02 | 1.15 | 1.445290 | 3.13E-10 | 125.91 | 17.1739 | 1.67E+01 |
| 13.5 | 0.70 | LP02 | 1.25 | 1.443514 | 1.72E-09 | 128.20 | 17.4172 | 1.60E+01 |
| 13.5 | 0.70 | LP02 | 1.35 | 1.441696 | 1.11E-08 | 130.72 | 17.6968 | 9.79E+01 |
| 13.5 | 0.70 | LP02 | 1.45 | 1.439816 | 5.55E-08 | 133.52 | 18.0212 | 8.37E+00 |
| 13.5 | 0.70 | LP02 | 1.55 | 1.437859 | 3.37E-07 | 136.71 | 18.4033 | 1.36E+01 |
| 13.5 | 0.70 | LP02 | 1.65 | 1.435813 | 5.35E-06 | 140.39 | 18.8629 | 3.16E+01 |

FIG.38

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 10 | 0.60 | LP01 | 0.45 | 1.465709 | 1.40E-20 | 88.51 | 10.24 | 1.12E+01 |
| 10 | 0.60 | LP01 | 0.55 | 1.459970 | 6.07E-21 | 89.12 | 10.28 | 1.86E+00 |
| 10 | 0.60 | LP01 | 0.65 | 1.456494 | 8.34E-21 | 89.73 | 10.32 | 1.69E+00 |
| 10 | 0.60 | LP01 | 0.75 | 1.454081 | 8.52E-22 | 90.32 | 10.35 | 3.00E-02 |
| 10 | 0.60 | LP01 | 0.85 | 1.452214 | 2.94E-20 | 90.90 | 10.39 | 2.75E-04 |
| 10 | 0.60 | LP01 | 0.95 | 1.450637 | 2.53E-20 | 91.47 | 10.42 | 7.36E-05 |
| 10 | 0.60 | LP01 | 1.05 | 1.449213 | 1.39E-19 | 92.03 | 10.46 | 9.65E-08 |
| 10 | 0.60 | LP01 | 1.15 | 1.447863 | 2.49E-19 | 92.58 | 10.49 | 9.95E-10 |
| 10 | 0.60 | LP01 | 1.25 | 1.446537 | 5.31E-19 | 93.12 | 10.53 | 6.61E-12 |
| 10 | 0.60 | LP01 | 1.35 | 1.445203 | 9.90E-19 | 93.65 | 10.56 | 3.60E-13 |
| 10 | 0.60 | LP01 | 1.45 | 1.443839 | 2.06E-18 | 94.18 | 10.59 | 4.49E-14 |
| 10 | 0.60 | LP01 | 1.55 | 1.442431 | 1.31E-17 | 94.71 | 10.63 | 1.81E-14 |
| 10 | 0.60 | LP01 | 1.65 | 1.440967 | 6.95E-18 | 95.23 | 10.66 | 1.25E-14 |
| 10 | 0.60 | LP11 | 0.45 | 1.465448 | 1.33E-15 | 118.67 | 12.97 | 1.51E+00 |
| 10 | 0.60 | LP11 | 0.55 | 1.459582 | 5.55E-15 | 111.32 | 13.04 | 1.21E+00 |
| 10 | 0.60 | LP11 | 0.65 | 1.455955 | 1.70E-14 | 101.36 | 13.12 | 5.79E+00 |
| 10 | 0.60 | LP11 | 0.75 | 1.453369 | 5.46E-14 | 92.71 | 13.19 | 1.43E+00 |
| 10 | 0.60 | LP11 | 0.85 | 1.451307 | 1.07E-13 | 87.56 | 13.26 | 5.98E-01 |
| 10 | 0.60 | LP11 | 0.95 | 1.449511 | 2.11E-13 | 85.86 | 13.33 | 4.46E-02 |
| 10 | 0.60 | LP11 | 1.05 | 1.447848 | 4.23E-13 | 86.53 | 13.40 | 2.21E-01 |
| 10 | 0.60 | LP11 | 1.15 | 1.446237 | 6.84E-13 | 88.52 | 13.46 | 3.63E-02 |
| 10 | 0.60 | LP11 | 1.25 | 1.444629 | 1.26E-12 | 91.14 | 13.52 | 1.13E-03 |
| 10 | 0.60 | LP11 | 1.35 | 1.442992 | 4.15E-12 | 93.98 | 13.57 | 2.10E-03 |
| 10 | 0.60 | LP11 | 1.45 | 1.441305 | 5.97E-12 | 96.83 | 13.63 | 3.48E-03 |
| 10 | 0.60 | LP11 | 1.55 | 1.439552 | 1.45E-11 | 99.59 | 13.68 | 3.24E-04 |
| 10 | 0.60 | LP11 | 1.65 | 1.437723 | 5.20E-11 | 102.22 | 13.74 | 2.55E-04 |
| 10 | 0.60 | LP21 | 0.45 | 1.464421 | 1.24E-01 | 149.69 | 23.32 | |
| 10 | 0.60 | LP21 | 0.55 | 1.458068 | 2.24E-01 | 154.78 | 23.43 | |
| 10 | 0.60 | LP21 | 0.65 | 1.453868 | 3.46E-01 | 157.81 | 23.67 | |
| 10 | 0.60 | LP21 | 0.75 | 1.450625 | 5.44E-01 | 161.01 | 23.98 | |
| 10 | 0.60 | LP21 | 0.85 | 1.447822 | 8.56E-01 | 165.77 | 24.32 | |
| 10 | 0.60 | LP21 | 0.95 | 1.445205 | 1.41E+00 | 172.99 | 24.68 | |
| 10 | 0.60 | LP21 | 1.05 | 1.442637 | 2.46E+00 | 182.74 | 25.09 | |
| 10 | 0.60 | LP21 | 1.15 | 1.440040 | 3.79E+00 | 194.05 | 25.55 | |
| 10 | 0.60 | LP21 | 1.25 | 1.437365 | 5.09E+00 | 205.70 | 26.05 | |
| 10 | 0.60 | LP21 | 1.35 | 1.434581 | 6.72E+00 | 216.92 | 26.63 | |
| 10 | 0.60 | LP21 | 1.45 | 1.431667 | 8.95E+00 | 227.46 | 27.28 | |
| 10 | 0.60 | LP21 | 1.55 | 1.428607 | 1.17E+01 | 237.31 | 27.97 | |
| 10 | 0.60 | LP21 | 1.65 | 1.425392 | 1.56E+01 | 246.57 | 28.71 | |

FIG.39

| Λ | d/Λ | MODE | WAVE-LENGTH | neff | CONFINE-MENT LOSS | Aeff | MFD | BENDING LOSS |
|---|---|---|---|---|---|---|---|---|
| μm | | | μm | | dB/m | μm² | μm | dB/m |
| 10 | 0.58 | LP01 | 0.45 | 1.465714 | 2.88E-20 | 91.33 | 10.41 | 2.57E+02 |
| 10 | 0.58 | LP01 | 0.55 | 1.459978 | 6.27E-20 | 91.96 | 10.45 | 6.95E-01 |
| 10 | 0.58 | LP01 | 0.65 | 1.456505 | 1.53E-19 | 92.58 | 10.49 | 1.15E+01 |
| 10 | 0.58 | LP01 | 0.75 | 1.454096 | 2.40E-19 | 93.19 | 10.53 | 3.90E+00 |
| 10 | 0.58 | LP01 | 0.85 | 1.452233 | 5.21E-19 | 93.80 | 10.56 | 7.39E-03 |
| 10 | 0.58 | LP01 | 0.95 | 1.450661 | 9.81E-19 | 94.39 | 10.60 | 7.13E-05 |
| 10 | 0.58 | LP01 | 1.05 | 1.449242 | 2.12E-18 | 94.97 | 10.64 | 2.90E-06 |
| 10 | 0.58 | LP01 | 1.15 | 1.447898 | 4.22E-18 | 95.55 | 10.67 | 2.65E-07 |
| 10 | 0.58 | LP01 | 1.25 | 1.446578 | 8.33E-18 | 96.11 | 10.71 | 2.04E-09 |
| 10 | 0.58 | LP01 | 1.35 | 1.445250 | 1.66E-17 | 96.67 | 10.74 | 3.55E-11 |
| 10 | 0.58 | LP01 | 1.45 | 1.443894 | 3.21E-17 | 97.23 | 10.78 | 2.46E-12 |
| 10 | 0.58 | LP01 | 1.55 | 1.442493 | 6.46E-17 | 97.78 | 10.81 | 5.75E-13 |
| 10 | 0.58 | LP01 | 1.65 | 1.441037 | 1.18E-16 | 98.33 | 10.84 | 2.40E-13 |
| 10 | 0.58 | LP11 | 0.45 | 1.465461 | 7.02E-14 | 125.42 | 13.23 | |
| 10 | 0.58 | LP11 | 0.55 | 1.459601 | 2.78E-13 | 124.39 | 13.30 | 1.58E+00 |
| 10 | 0.58 | LP11 | 0.65 | 1.455982 | 5.88E-13 | 113.52 | 13.38 | 4.75E+01 |
| 10 | 0.58 | LP11 | 0.75 | 1.453406 | 1.89E-12 | 99.44 | 13.46 | 2.01E+01 |
| 10 | 0.58 | LP11 | 0.85 | 1.451353 | 3.84E-12 | 91.25 | 13.54 | 4.12E-01 |
| 10 | 0.58 | LP11 | 0.95 | 1.449571 | 9.53E-12 | 89.26 | 13.62 | 1.82E+00 |
| 10 | 0.58 | LP11 | 1.05 | 1.447921 | 2.33E-11 | 90.50 | 13.69 | 1.92E+00 |
| 10 | 0.58 | LP11 | 1.15 | 1.446325 | 5.69E-11 | 93.01 | 13.76 | 8.38E-01 |
| 10 | 0.58 | LP11 | 1.25 | 1.444733 | 1.37E-10 | 95.90 | 13.82 | 1.85E+01 |
| 10 | 0.58 | LP11 | 1.35 | 1.443114 | 3.05E-10 | 98.83 | 13.89 | 7.37E-03 |
| 10 | 0.58 | LP11 | 1.45 | 1.441446 | 5.95E-10 | 101.67 | 13.95 | 2.26E-02 |
| 10 | 0.58 | LP11 | 1.55 | 1.439712 | 8.16E-10 | 104.39 | 14.01 | 1.14E-01 |
| 10 | 0.58 | LP11 | 1.65 | 1.437906 | 1.75E-09 | 106.98 | 14.08 | 2.19E-02 |
| 10 | 0.58 | LP21 | 0.45 | 1.464472 | 5.83E-01 | 156.28 | 26.64 | |
| 10 | 0.58 | LP21 | 0.55 | 1.458145 | 8.35E-01 | 165.58 | 26.82 | |
| 10 | 0.58 | LP21 | 0.65 | 1.453979 | 1.25E+00 | 172.25 | 27.14 | |
| 10 | 0.58 | LP21 | 0.75 | 1.450774 | 2.07E+00 | 178.70 | 27.59 | |
| 10 | 0.58 | LP21 | 0.85 | 1.448016 | 3.65E+00 | 186.93 | 28.15 | |
| 10 | 0.58 | LP21 | 0.95 | 1.445450 | 5.53E+00 | 198.29 | 28.66 | |
| 10 | 0.58 | LP21 | 1.05 | 1.442940 | 7.81E+00 | 213.32 | 29.10 | |
| 10 | 0.58 | LP21 | 1.15 | 1.440406 | 1.10E+01 | 230.57 | 29.54 | |
| 10 | 0.58 | LP21 | 1.25 | 1.437799 | 1.59E+01 | 246.68 | 30.07 | |
| 10 | 0.58 | LP21 | 1.35 | 1.435087 | 2.22E+01 | 258.74 | 30.66 | |
| 10 | 0.58 | LP21 | 1.45 | 1.432250 | 2.73E+01 | 266.38 | 31.11 | |
| 10 | 0.58 | LP21 | 1.55 | 1.429271 | 3.01E+01 | 271.14 | 31.35 | |
| 10 | 0.58 | LP21 | 1.65 | 1.426139 | 3.26E+01 | 274.82 | 31.55 | |

FIG.40

| Λ | d/Λ | MODE | WAVE-LENGTH | neff | CONFINE-MENT LOSS | Aeff | MFD | BENDING LOSS |
|---|---|---|---|---|---|---|---|---|
| $\mu m$ | | | $\mu m$ | | dB/m | $\mu m^2$ | $\mu m$ | dB/m |
| 10 | 0.56 | LP01 | 0.45 | 1.465719 | 7.62E-19 | 94.11 | 10.58 | 4.42E+01 |
| 10 | 0.56 | LP01 | 0.55 | 1.459985 | 1.96E-18 | 94.76 | 10.62 | 1.67E+01 |
| 10 | 0.56 | LP01 | 0.65 | 1.456516 | 3.43E-18 | 95.41 | 10.66 | 1.86E+01 |
| 10 | 0.56 | LP01 | 0.75 | 1.454110 | 7.78E-18 | 96.05 | 10.70 | 7.03E-01 |
| 10 | 0.56 | LP01 | 0.85 | 1.452251 | 1.54E-17 | 96.68 | 10.74 | 4.02E+00 |
| 10 | 0.56 | LP01 | 0.95 | 1.450683 | 3.08E-17 | 97.30 | 10.77 | 1.18E-03 |
| 10 | 0.56 | LP01 | 1.05 | 1.449269 | 7.51E-17 | 97.91 | 10.81 | 1.48E-03 |
| 10 | 0.56 | LP01 | 1.15 | 1.447930 | 1.24E-16 | 98.52 | 10.85 | 3.35E-06 |
| 10 | 0.56 | LP01 | 1.25 | 1.446616 | 2.25E-16 | 99.11 | 10.88 | 2.62E-06 |
| 10 | 0.56 | LP01 | 1.35 | 1.445295 | 4.13E-16 | 99.70 | 10.92 | 4.50E-09 |
| 10 | 0.56 | LP01 | 1.45 | 1.443945 | 8.22E-16 | 100.28 | 10.96 | 1.81E-10 |
| 10 | 0.56 | LP01 | 1.55 | 1.442552 | 1.38E-15 | 100.86 | 10.99 | 4.43E-11 |
| 10 | 0.56 | LP01 | 1.65 | 1.441103 | 2.65E-15 | 101.44 | 11.03 | 7.84E-12 |
| 10 | 0.56 | LP11 | 0.45 | 1.465474 | 3.65E-12 | 122.83 | 13.54 | 8.78E+01 |
| 10 | 0.56 | LP11 | 0.55 | 1.459620 | 1.04E-11 | 130.38 | 13.61 | 1.09E+01 |
| 10 | 0.56 | LP11 | 0.65 | 1.456009 | 1.99E-11 | 130.00 | 13.66 | 2.45E+02 |
| 10 | 0.56 | LP11 | 0.75 | 1.453441 | 4.28E-11 | 110.71 | 13.74 | 6.05E-01 |
| 10 | 0.56 | LP11 | 0.85 | 1.451399 | 2.44E-10 | 94.63 | 13.83 | 1.23E+01 |
| 10 | 0.56 | LP11 | 0.95 | 1.449628 | 8.43E-10 | 92.62 | 13.92 | 5.29E+01 |
| 10 | 0.56 | LP11 | 1.05 | 1.447993 | 1.00E-09 | 95.61 | 14.01 | 9.44E+00 |
| 10 | 0.56 | LP11 | 1.15 | 1.446412 | 2.66E-09 | 99.42 | 14.10 | 3.72E+01 |
| 10 | 0.56 | LP11 | 1.25 | 1.444836 | 6.73E-09 | 103.06 | 14.18 | 4.43E+00 |
| 10 | 0.56 | LP11 | 1.35 | 1.443235 | 7.35E-09 | 106.37 | 14.26 | 2.19E+01 |
| 10 | 0.56 | LP11 | 1.45 | 1.441586 | 1.14E-08 | 109.37 | 14.33 | 1.60E+00 |
| 10 | 0.56 | LP11 | 1.55 | 1.439874 | 2.19E-08 | 112.14 | 14.41 | 2.66E-01 |
| 10 | 0.56 | LP11 | 1.65 | 1.438089 | 3.65E-08 | 114.72 | 14.49 | 1.04E+00 |
| 10 | 0.56 | LP21 | 0.45 | 1.464545 | 2.47E-01 | 170.82 | 23.44 | |
| 10 | 0.56 | LP21 | 0.55 | 1.458224 | 8.08E-01 | 192.30 | 24.16 | |
| 10 | 0.56 | LP21 | 0.65 | 1.454090 | 1.06E+00 | 192.06 | 23.96 | |
| 10 | 0.56 | LP21 | 0.75 | 1.450921 | 1.40E+00 | 182.95 | 23.40 | |
| 10 | 0.56 | LP21 | 0.85 | 1.448200 | 1.97E+00 | 165.09 | 22.87 | |
| 10 | 0.56 | LP21 | 0.95 | 1.445672 | 3.06E+00 | 162.40 | 23.33 | |
| 10 | 0.56 | LP21 | 1.05 | 1.443201 | 4.64E+00 | 169.68 | 24.18 | |
| 10 | 0.56 | LP21 | 1.15 | 1.440707 | 6.12E+00 | 177.72 | 24.91 | |
| 10 | 0.56 | LP21 | 1.25 | 1.438144 | 7.66E+00 | 184.94 | 25.53 | |
| 10 | 0.56 | LP21 | 1.35 | 1.435479 | 9.48E+00 | 191.40 | 26.09 | |
| 10 | 0.56 | LP21 | 1.45 | 1.432692 | 1.19E+01 | 197.32 | 26.68 | |
| 10 | 0.56 | LP21 | 1.55 | 1.429767 | 1.41E+01 | 202.77 | 27.15 | |
| 10 | 0.56 | LP21 | 1.65 | 1.426693 | 1.61E+01 | 207.84 | 27.51 | |

FIG.59

| BENDING RADIUS | LP01-LP01 | | LP11-LP11 | | BENDING RADIUS | LP01-LP01 | | LP11-LP11 | |
|---|---|---|---|---|---|---|---|---|---|
| | INTER-CORE DISTANCE | TRANS-MISSION DISTANCE | INTER-CORE DISTANCE | TRANS-MISSION DISTANCE | | INTER-CORE DISTANCE | TRANS-MISSION DISTANCE | INTER-CORE DISTANCE | TRANS-MISSION DISTANCE |
| mm | μm | km | μm | km | mm | μm | km | μm | km |
| 20 | 30 | 4.33E-03 | 30 | 2.08E-05 | 140 | 30 | 6.18E-04 | 30 | 2.97E-06 |
| | 40 | 5.60E+01 | 40 | 6.48E-02 | | 40 | 8.00E+00 | 40 | 9.25E-03 |
| | 50 | 1.20E+05 | 50 | 1.05E+00 | | 50 | 1.71E+04 | 50 | 1.51E-01 |
| | 60 | 2.23E+08 | 60 | 3.17E+02 | | 60 | 3.19E+07 | 60 | 4.53E+01 |
| | 70 | 8.78E+14 | 70 | 2.50E+05 | | 70 | 1.25E+14 | 70 | 3.57E+04 |
| | 80 | 2.60E+17 | 80 | 1.64E+09 | | 80 | 3.71E+16 | 80 | 2.34E+08 |
| | 90 | 6.58E+18 | 90 | 2.22E+09 | | 90 | 9.40E+17 | 90 | 3.18E+08 |
| | 100 | 4.98E+17 | 100 | 8.37E+08 | | 100 | 7.11E+16 | 100 | 1.20E+08 |
| 60 | 30 | 1.44E-03 | 30 | 6.93E-06 | 180 | 30 | 4.81E-04 | 30 | 2.31E-06 |
| | 40 | 1.87E+01 | 40 | 2.16E-02 | | 40 | 6.23E+00 | 40 | 7.20E-03 |
| | 50 | 3.98E+04 | 50 | 3.51E-01 | | 50 | 1.33E+04 | 50 | 1.17E-01 |
| | 60 | 7.43E+07 | 60 | 1.06E+02 | | 60 | 2.48E+07 | 60 | 3.52E+01 |
| | 70 | 2.93E+14 | 70 | 8.33E+04 | | 70 | 9.75E+13 | 70 | 2.78E+04 |
| | 80 | 8.65E+16 | 80 | 5.46E+08 | | 80 | 2.89E+16 | 80 | 1.82E+08 |
| | 90 | 2.19E+18 | 90 | 7.41E+08 | | 90 | 7.31E+17 | 90 | 2.47E+08 |
| | 100 | 1.66E+17 | 100 | 2.79E+08 | | 100 | 5.53E+16 | 100 | 9.30E+07 |
| 100 | 30 | 8.67E-04 | 30 | 4.16E-06 | | | | | |
| | 40 | 1.12E+01 | 40 | 1.30E-02 | | | | | |
| | 50 | 2.39E+04 | 50 | 2.11E-01 | | | | | |
| | 60 | 4.46E+07 | 60 | 6.34E+01 | | | | | |
| | 70 | 1.76E+14 | 70 | 4.99E+04 | | | | | |
| | 80 | 5.20E+16 | 80 | 3.28E+08 | | | | | |
| | 90 | 1.32E+18 | 90 | 4.45E+08 | | | | | |
| | 100 | 9.96E+16 | 100 | 1.68E+08 | | | | | |

| BENDING RADIUS [mm] | INTER-CORE DISTANCE [μm] |
|---|---|
| 20 | 69 |
| 60 | 70 |
| 100 | 71 |
| 140 | 71 |
| 180 | 71 |

OPTICAL FIBER AND OPTICAL TRANSMISSION SYSTEM

CROSS-REFERENCE TO RELATED APPLICATIONS

This application is a continuation of PCT International Application No. PCT/JP2012/050020 filed on Jan. 4, 2012, which claims the benefit of priority from the prior Japanese Patent Application No. 2011-220470 filed on Oct. 4, 2011. The entire contents of these applications are incorporated herein by reference.

BACKGROUND OF THE INVENTION

1. Field of the Disclosure

The disclosure relates to an optical fiber and an optical transmission system.

2. Description of the Related Art

With the recent dramatic increase in the Internet traffic, it is expected that transmission capacity will be insufficient in the future in optical transmission systems if only a fundamental mode of optical fibers are used in signal transmission as conventionally done. Spatial multiplexing techniques using multi-core optical fibers and mode multiplexing techniques using multi-mode optical fibers are regarded as promising methods for solving the insufficiency in the transmission capacity.

A method of widening a wavelength bandwidth of signal light is also effective for increasing the transmission capacity. For example, K. Ieda et al disclose in "Visible to Infrared WDM transmission over PCF", ECOC2006-Tu3.3.4 (2006), ultra-wide bandwidth transmission experiments over a range of a visible light bandwidth to a communication wavelength bandwidth using a holey fiber of 1.0 km in length.

The holey fiber (HF) is an optical fiber that achieves optical transmission by regularly arranging holes in a cladding to reduce an average refractive index of the cladding and using the principle of total reflection. K. Imamura, K. Mukasa, Y. Miura, and T. Yagi disclose in "Multi-core holey fibers for the long-distance (>100 km) ultra large capacity transmission," OFC2009, No. OtuC3 (2009), a multi-core holey fiber including a plurality of core portions.

As described above, an optical fiber and an optical transmission system that have a larger transmission capacity are required to handle the increasing demand for transmission capacity.

Accordingly, there is a need to provide an optical fiber and an optical transmission system that have a large transmission capacity.

SUMMARY OF THE INVENTION

According to an embodiment of the disclosure, an optical fiber propagates light over a use wavelength bandwidth of 100 nm or wider in a plurality of propagation modes, and includes: a confinement loss equal to or less than 1 dB/km in each of the plurality of propagation modes over the use wavelength bandwidth; and a bending loss equal to or less than 100 dB/m in each of the plurality of propagation modes over the use wavelength bandwidth when the optical fiber is bent at a diameter of 20 mm.

According to another embodiment of the disclosure, an optical transmission system includes: the optical fiber according to the embodiment; an optical transmission device that outputs signal light to be propagated through the optical fiber in a plurality of propagation modes; and an optical receiving device that receives the signal light propagated through the optical fiber in the plurality of propagation modes.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 2 is a table illustrating calculation results of optical characteristics of two propagation modes when $\Lambda$ is 10.0 μm and $d/\Lambda$ is 0.50;

FIG. 3 is a table illustrating calculation results of optical characteristics of two propagation modes when $\Lambda$ is 10.0 μm and $d/\Lambda$ is 0.60;

FIG. 4 is a table illustrating calculation results of optical characteristics of four propagation modes when $\Lambda$ is 10.0 μm and $d/\Lambda$ is 0.70;

FIG. 5 is a table illustrating calculation results of optical characteristics of four propagation modes when $\Lambda$ is 10.0 μm and $d/\Lambda$ is 0.80;

FIG. 14 is a table illustrating calculation results of optical characteristics of two propagation modes when $\Lambda$ is 8.0 μm and $d/\Lambda$ is 0.60;

FIG. 15 is a table illustrating calculation results of optical characteristics of four propagation modes when $\Lambda$ is 8.0 μm and $d/\Lambda$ is 0.70;

FIG. 16 is a table illustrating calculation results of optical characteristics of four propagation modes when $\Lambda$ is 8.0 μm and $d/\Lambda$ is 0.80;

FIG. 23 is a table illustrating calculation results of optical characteristics of two propagation modes when $\Lambda$ is 12.0 μm and d/$\Lambda$ is 0.60;

FIG. 24 is a table illustrating calculation results of optical characteristics of four propagation modes when $\Lambda$ is 12.0 μm and d/$\Lambda$ is 0.70;

FIG. 25 is a table illustrating calculation results of optical characteristics of four propagation modes when $\Lambda$ is 12.0 μm and d/$\Lambda$ is 0.80;

FIG. 32 is a table illustrating calculation results of optical characteristics of three propagation modes when $\Lambda$ is 13.5 μm and d/$\Lambda$ is 0.60;

FIG. 33 is a table illustrating calculation results of optical characteristics of four propagation modes when $\Lambda$ is 13.5 μm and d/$\Lambda$ is 0.70;

FIG. 38 is a table illustrating calculation results of optical characteristics of three propagation modes when $\Lambda$ is 10.0 μm and d/$\Lambda$ is 0.60;

FIG. 39 is a table illustrating calculation results of optical characteristics of three propagation modes when $\Lambda$ is 10.0 μm and d/$\Lambda$ is 0.58;

FIG. 40 is a table illustrating calculation results of optical characteristics of three propagation modes when $\Lambda$ is 10.0 μm and d/$\Lambda$ is 0.56;

FIG. 59 is a table illustrating a relation between an inter-core distance and a transmission distance at which an optical crosstalk between propagation modes is −30 dB when propagation of two modes, LP01 mode and LP11 mode, are performed;

DETAILED DESCRIPTION OF THE INVENTION

Embodiments of an optical fiber according to the disclosure are described in detail below with reference to the accompanying drawings. The embodiments are not limited to the disclosure. In the description, a bending loss means a macro-bending loss when an optical fiber is bent at a diameter (bending diameter) of 20 mm. Any terms not specifically defined in the description follow definitions and measuring methods of the ITU-T (International Telecommunication Union Standardization Sector) G. 650.1. Hereinafter, a holey fiber is abbreviated as HF.

First Embodiment

Figure 1:
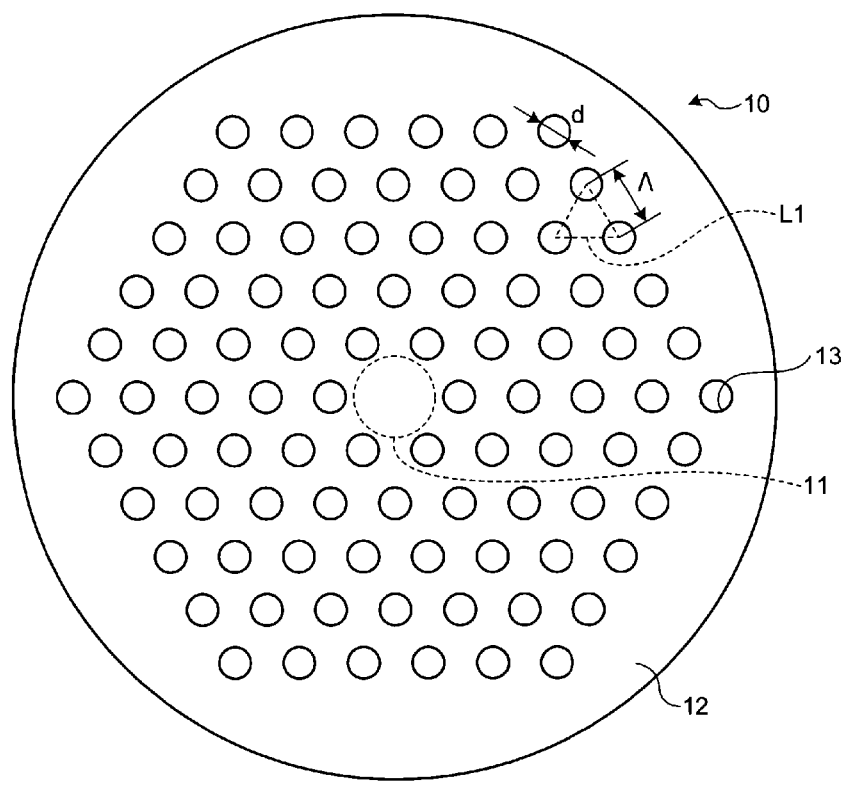
FIG. 1 is a schematic cross sectional view of a holey fiber (HF) according to a first embodiment.

FIG. 1 is a schematic cross sectional view of a holey fiber (HF) according to a first embodiment of the disclosure. As illustrated in FIG. 1, this HF 10 includes a core portion 11 located at an approximate center thereof and a cladding portion 12 located around the core portion 11. The core portion 11 and the cladding portion 12 are made of pure silica glass containing no dopants for adjusting their refractive indices.

The cladding portion 12 has a plurality of holes 13 arranged around the core portion 11 in layers. If a combination of the holes 13 arranged at vertices and sides of a regular hexagon with the core portion 11 at its center is considered as one layer, this HF 10 has five layers of the holes 13. The holes 13 are arranged in these layers and to form a triangular lattice L1. Each hole 13 has a diameter d. A lattice constant of the triangular lattice L1, i.e., a center-to-center distance between the holes 13, is $\Lambda$.

The HF 10 enables light of a use wavelength bandwidth to propagate in a plurality of propagation modes and a confinement loss of each propagation mode to be equal to or less than 1 dB/km in the use wavelength bandwidth by setting $\Lambda$ and d/$\Lambda$ to predetermined values. The use wavelength bandwidth is a predetermined bandwidth of equal to or greater than 100 nm in a range of a visible light bandwidth to a communication wavelength bandwidth (approximately 0.45 µm to 1.65 µm). As a result, multi-mode transmission is achievable with low loss in a wide bandwidth of 100 nm or wider, and optical transmission having a larger transmission capacity than that of the conventional technique is achievable. The use wavelength bandwidth is preferably 200 nm or wider, and more preferably 300 nm or wider, 500 nm or wider, or 1000 nm or wider.

Preferable values of $\Lambda$ and d/$\Lambda$ of the HF 10 are described below using results of calculation by FEM (Finite Element Method). In the following calculation, a calculating area is set assuming that an outer diameter of the cladding portion 12 is 180 µm. The calculation is performed using a perfectly matched layer (PML). The cladding portion 12 having an outer diameter (cladding diameter) larger than the cladding diameter of 125 µm of a typical optical fiber is able to further suppress an increase in transmission loss due to a microbend. The microbend is a tiny bend in an optical fiber, which is formed when a side pressure is applied to the optical fiber.

FIG. 2 is a table illustrating calculation results of optical characteristics of two propagation modes when $\Lambda$ is 10.0 µm and d/$\Lambda$ is 0.50. FIG. 3 is a table illustrating calculation results of optical characteristics of two propagation modes when $\Lambda$ is 10.0 µm and d/$\Lambda$ is 0.60. The optical characteristics are illustrated for a wavelength range of 0.45 µm to 1.65 which is a range of the visible light bandwidth to the communication wavelength bandwidth. The two propagation modes are an LP01 mode, which is a fundamental mode, and an LP11 mode, which is a first higher-order mode.

In FIGS. 2 and 3, "$n_{eff}$" means an effective refractive index, "$A_{eff}$" means an effective core area, and "MFD" means a mode field diameter. In addition, "E" is a symbol representing an exponent of 10 in values of the confinement loss. For example, "7.83E-0.8" means "$7.83 \times 10^{-8}$". As described later, a blank column in which no numeric value is written in the confinement loss columns or the bending loss columns means that the value of the confinement loss or the bending loss is extremely large under the corresponding condition and thus confinement of light is insufficient.

As illustrated in FIGS. 2 and 3, when $\Lambda$ is 10.0 µm and d/$\Lambda$ are 0.50 and 0.60 in the HF 10, the confinement losses in the two modes, the LP01 and LP11 modes, are equal to or less than 1.0 dB/km (equal to or less than 1.0E-3 dB/m) over at least a bandwidth of 1200 nm at a wavelength range of 0.45 µm to 1.65 µm, and two-mode transmission is possible.

When d/$\Lambda$ is 0.50, however, the bending loss in the LP11 mode is extremely large. For example, the bending loss is 243 dB/m at a wavelength of 1.65 nm, which is larger than 100 dB/m.

In contrast, when d/$\Lambda$ is 0.60, the bending loss in the LP11 mode is equal to or less than 100 dB/m, more specifically equal to or less than 2 dB/m, over at least a bandwidth of 1000 nm or wider at a wavelength range of 0.45 µm to 1.65 µm, being preferable for practical use. The bending loss in the LP01 mode is equal to or less than 100 dB/m, more specifically equal to or less than 2 dB/m, over at least a bandwidth of 1200 nm or wider at a wavelength range of 0.45 µm to 1.65 µm, being preferable for practical use. That is, when d/$\Lambda$ is 0.60, two-mode transmission preferable for practical use is possible over at least a bandwidth of 1000 nm or wider at a wavelength range of 0.65 µm to 1.65 µm.

FIG. 4 is a table illustrating calculation results of optical characteristics of four propagation modes when $\Lambda$ is 10.0 µm and d/$\Lambda$ is 0.70. The four propagation modes are the LP01 mode, which is the fundamental mode, the LP11 mode, which is the first higher-order mode, an LP21 mode, which is the second higher-order mode, and an LP02 mode, which is the third higher-order mode. As illustrated in FIG. 4, when $\Lambda$ is 10.0 µm and d/$\Lambda$ is 0.70 in the HF 10, confinement losses in the three modes LP01, LP11, and LP11 are equal to or less than 1.0 dB/km over at least a bandwidth of 1200 nm or wider at a wavelength range of 0.45 µm to 1.65 µm, and three-mode transmission is possible. Furthermore, confinement loss in the LP02 mode is equal to or less than 1.0 dB/km over at least a bandwidth of 1000 nm or wider at a wavelength range of 0.45 µm to 1.45 µm and four-mode transmission is possible.

In the LP21 mode, however, bending loss is larger than 100 dB/m, at least at the wavelength of 0.45 µm. In the LP02 mode, bending loss is larger than 100 dB/m, at least at a wavelength equal to or less than 1.35 µm. Therefore, preferably for practical use, for example, at the wavelength of 0.45 µm, two-mode transmission is performed, and in at least a wavelength bandwidth of 800 nm or wider at 0.55 µm to 1.35 µm, and in at least a wavelength bandwidth of 100 nm or greater at 1.55 µm to 1.65 µm, three-mode transmission is performed. The four-mode transmission preferable for practical use is possible at least at a wavelength of 1.45 µm.

FIG. 5 is a table illustrating calculation results of optical characteristics of four propagation modes when Λ is 10.0 µm and d/Λ is 0.80. As illustrated in FIG. 5, when Λ is 10.0 µm and d/Λ is 0.80 in the HF 10, confinement losses in the four modes are equal to or less than 1.0 dB/km and bending losses thereof are equal to or less than 100 dB/m over at least a bandwidth of 1200 nm or wider at a wavelength range of 0.45 µm to 1.65 µm, and thus four-mode transmission preferable for practical use is possible.

As described above, d/Λ is preferably set to greater than 0.5 when multi-mode transmission preferable for practical use is performed.

Figure 6:
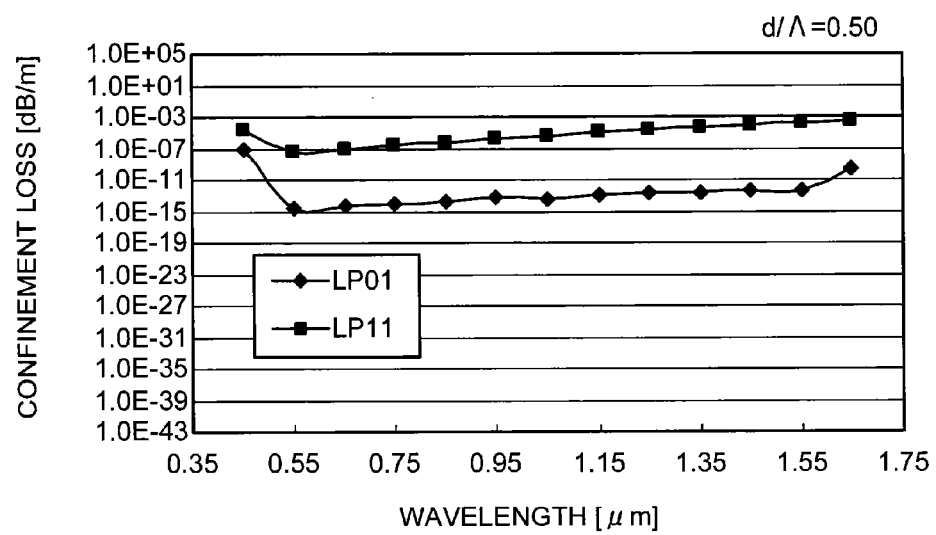
FIG. 6 is a graph illustrating wavelength dependences of confinement losses of two propagation modes when $\Lambda$ is 10.0 μm and $d/\Lambda$ is 0.50.
Figure 7:
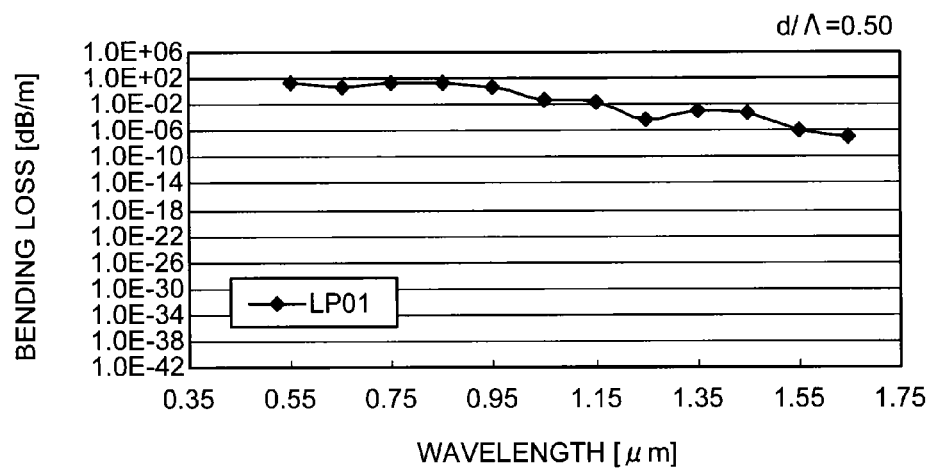
FIG. 7 is a graph illustrating a wavelength dependence of a bending loss of an LP01 propagation mode when $\Lambda$ is 10.0 μm and $d/\Lambda$ is 0.50.
Figure 8:
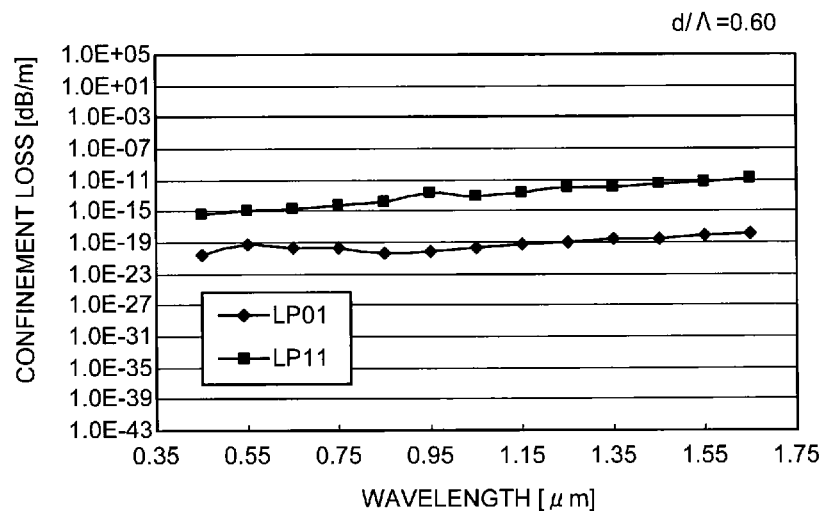
FIG. 8 is a graph illustrating wavelength dependences of confinement losses of two propagation modes when $\Lambda$ is 10.0 μm and $d/\Lambda$ is 0.60.
Figure 9:
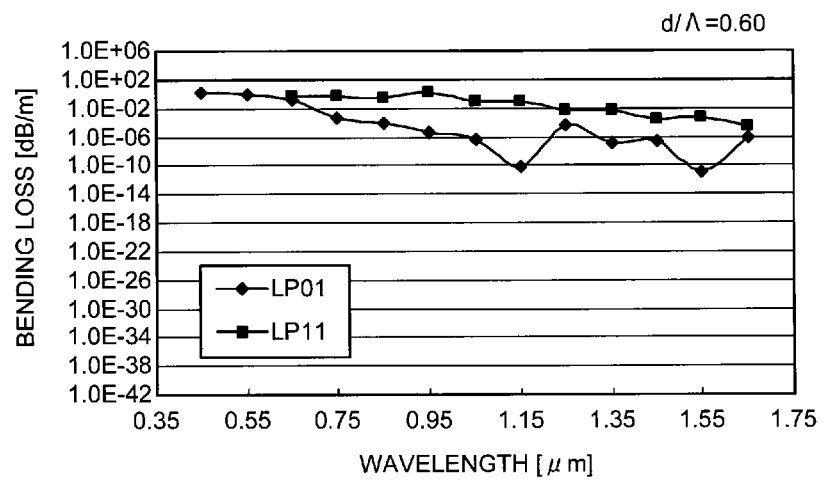
FIG. 9 is a graph illustrating wavelength dependences of bending losses of two propagation modes when $\Lambda$ is 10.0 μm and $d/\Lambda$ is 0.60.
Figure 10:
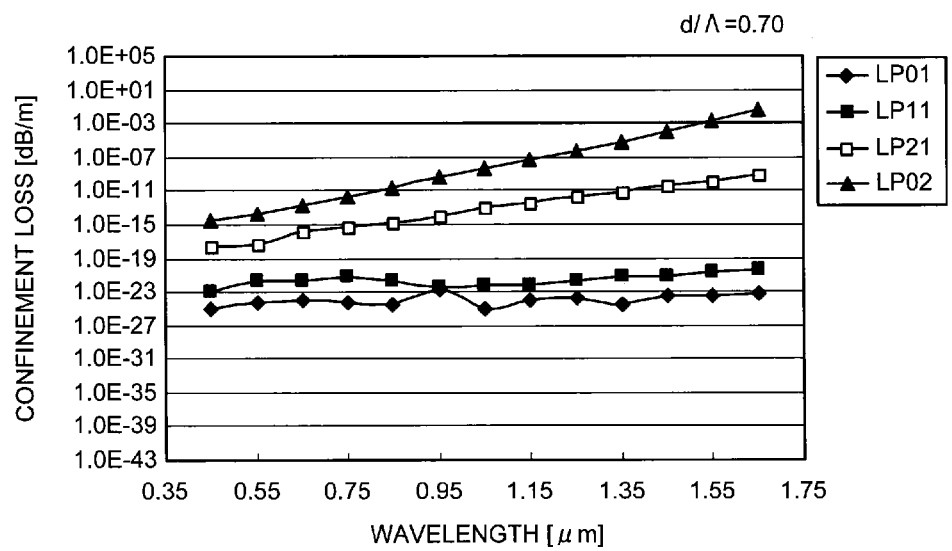
FIG. 10 is a graph illustrating wavelength dependences of confinement losses of four propagation modes when $\Lambda$ is 10.0 μm and $d/\Lambda$ is 0.70.
Figure 11:
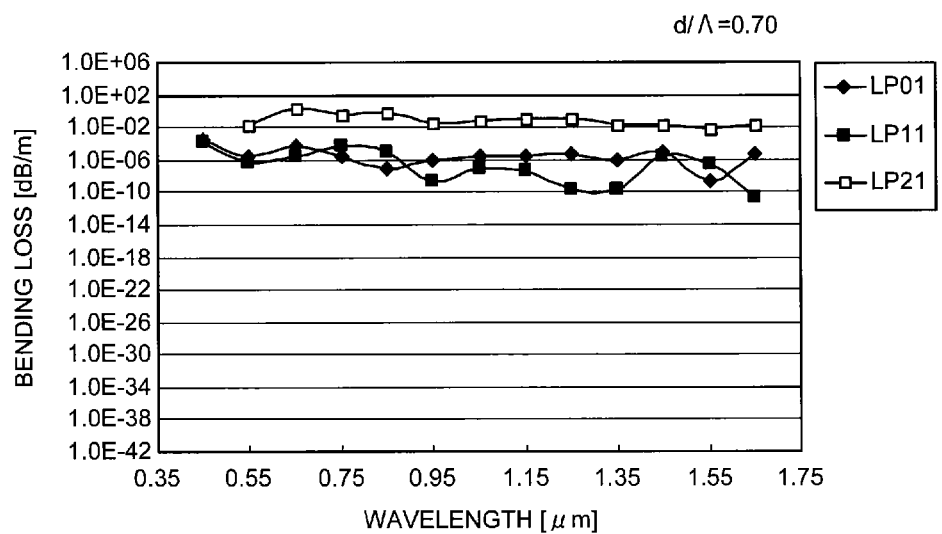
FIG. 11 is a graph illustrating wavelength dependences of bending losses of three propagation modes when $\Lambda$ is 10.0 μm and $d/\Lambda$ is 0.70.
Figure 12:
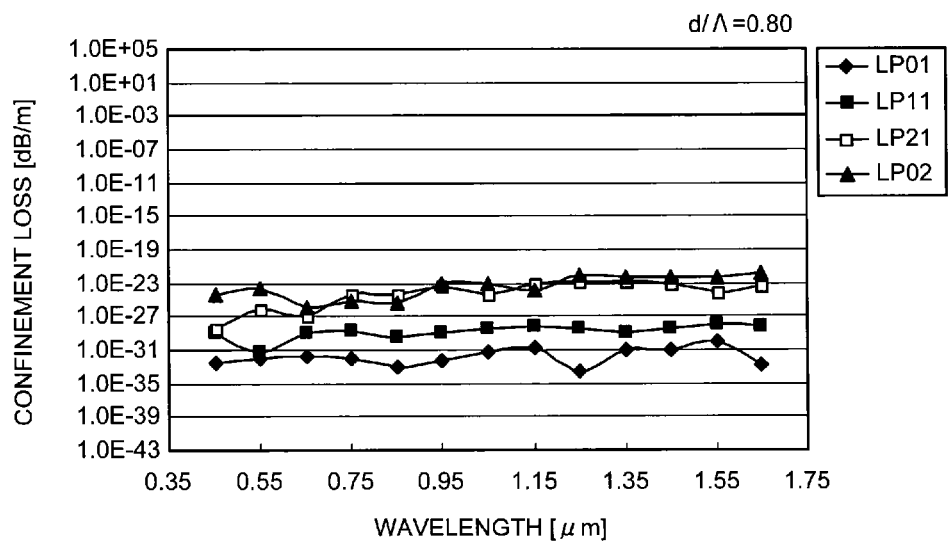
FIG. 12 is a graph illustrating wavelength dependences of confinement losses of four propagation modes when $\Lambda$ is 10.0 μm and $d/\Lambda$ is 0.80.
Figure 13:
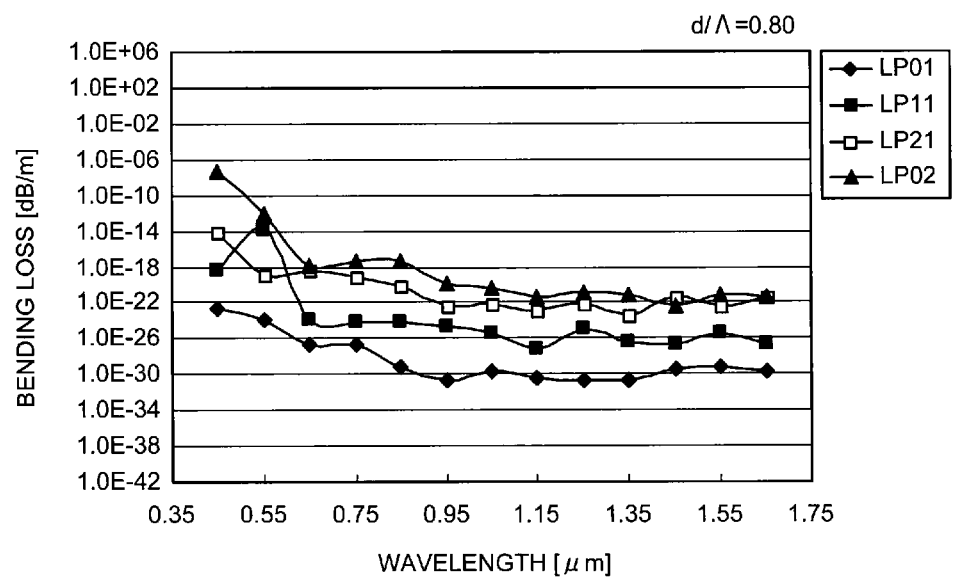
FIG. 13 is a graph illustrating wavelength dependences of bending losses of four propagation modes when $\Lambda$ is 10.0 μm and $d/\Lambda$ is 0.80.

FIG. 6 is a graph illustrating wavelength dependences of confinement losses of two propagation modes when Λ is 10.0 µm and d/Λ is 0.50. FIG. 7 is a graph illustrating wavelength dependence of bending loss in the LP01 mode when Λ is 10.0 µm and d/Λ is 0.50. FIGS. 8 and 9 are graphs illustrating wavelength dependences of confinement losses and bending losses, respectively, in two propagation modes when Λ is 10.0 µm and d/Λ is 0.60. FIG. 10 is a graph illustrating wavelength dependences of confinement losses in four propagation modes when Λ is 10.0 µm and d/Λ is 0.70. FIG. 11 is a graph illustrating wavelength dependences of bending losses in three propagation modes when Λ is 10.0 µm and d/Λ is 0.70. FIGS. 12 and 13 are graphs illustrating wavelength dependences of confinement losses and bending losses, respectively, of four propagation modes when Λ is 10.0 µm and d/Λ is 0.80. The graphs illustrated in FIGS. 6 to 13 are made using the corresponding data illustrated in FIGS. 2 to 5.

As illustrated in FIGS. 6 to 13, the confinement losses tend to increase with an increase in wavelengths. The bending losses tend to decrease with an increase in the wavelengths. As for gradients of the confinement losses with respect to the wavelengths, the gradients of the LP21 and LP02 modes tend to be larger than those of the LP01 and LP11 modes. For example, if three-mode transmission using the LP01, LP11, and LP21 modes is desired, even more reliable three-mode transmission is achievable by setting the value of d/Λ such that the confinement loss in the LP02 mode becomes larger than 1 dB/km and by appropriately selecting the use wavelength bandwidth as necessary.

The optical characteristics of the four propagation modes are illustrated in FIGS. 4, 5, and 10 to 13. A propagation mode of a higher order is usable for optical transmission, as long as its confinement loss is equal to or less than 1.0 dB/km in a predetermined wavelength bandwidth, and is preferably practically used as long as its bending loss is equal to or less than 100 dB/m in the predetermined wavelength bandwidth.

An example in which Λ is set to 8.0 µm is described below. FIG. 14 is a table illustrating calculation results of optical characteristics of two propagation modes when Λ is 8.0 µm and d/Λ is 0.60. As illustrated in FIG. 14, when Λ is 8.0 µm and d/Λ is 0.60 in the HF 10, confinement losses of two modes LP01 and LP11 are equal to or less than 1.0 dB/km and bending losses thereof are equal to or less than 100 dB/m over at least a bandwidth of 1200 nm or wider at a wavelength range of 0.45 µm to 1.65 µm, and thus two-mode transmission preferable for practical use is possible.

FIG. 15 is a table illustrating calculation results of optical characteristics of four propagation modes when Λ is 8.0 µm and d/Λ is 0.70. As illustrated in FIG. 15, when Λ is 8.0 µm and d/Λ is 0.70 in the HF 10, confinement losses in the three modes LP01, LP11, and LP21 are equal to or less than 1.0 dB/km over at least the bandwidth of 1200 nm or wider at a wavelength range of 0.45 µm to 1.65 µm, and three-mode transmission is possible. Furthermore, confinement loss in the LP02 mode is equal to or less than 1.0 dB/km over at least a bandwidth of 600 nm or wider at a wavelength range of 0.55 µm to 1.15 µm, and four-mode transmission is possible.

In the LP21 mode, the bending loss is larger than 100 dB/m at least at a wavelength equal to or less than 0.65 µm. In the LP02 mode, the bending loss is larger than 100 dB/m at least at a wavelength equal to or less than 0.65 µm and at a wavelength equal to or greater than 1.25 µm. Therefore, for example, it is preferable for practical use that over at least a wavelength bandwidth of 200 nm or wider at a wavelength range of 0.45 µm to 0.65 µm, two-mode transmission is performed, over at least a wavelength bandwidth of 400 nm or wider at a wavelength range of 1.25 µm to 1.65 µm, three-mode transmission is performed, and over at least a wavelength bandwidth of 400 nm or wider at a wavelength range of 0.75 µm to 1.15 µm, four-mode transmission is performed.

FIG. 16 is a table illustrating calculation results of optical characteristics of four propagation modes when Λ is 8.0 µm and d/Λ is 0.80. As illustrated in FIG. 16, when Λ is 8.0 µm and d/Λ is 0.80 in the HF 10, confinement losses of the four modes are equal to or less than 1.0 dB/km and bending losses thereof are equal to or less than 100 dB/m over at least a bandwidth of 1200 nm or wider at a wavelength range of 0.45 µm to 1.65 µm, and thus four-mode transmission preferable for practical use is possible.

Figure 17:
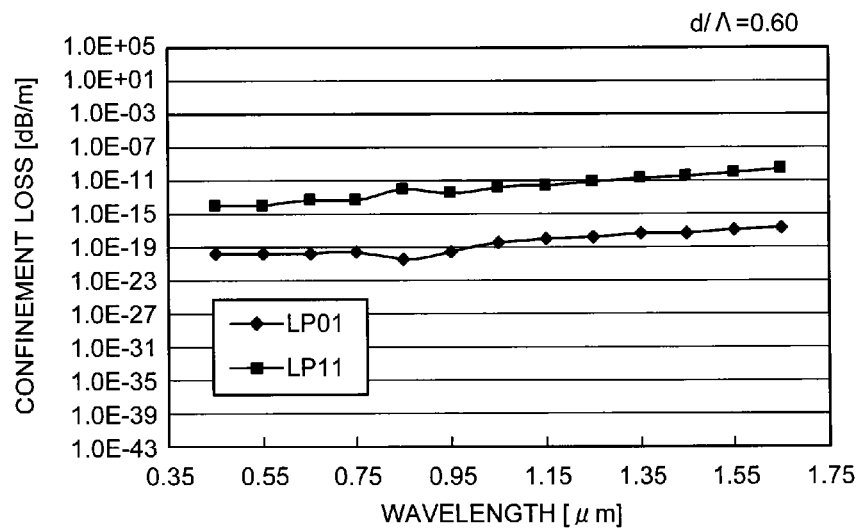
FIG. 17 is a graph illustrating wavelength dependences of confinement losses of two propagation modes when $\Lambda$ is 8.0 μm and $d/\Lambda$ is 0.60.
Figure 18:
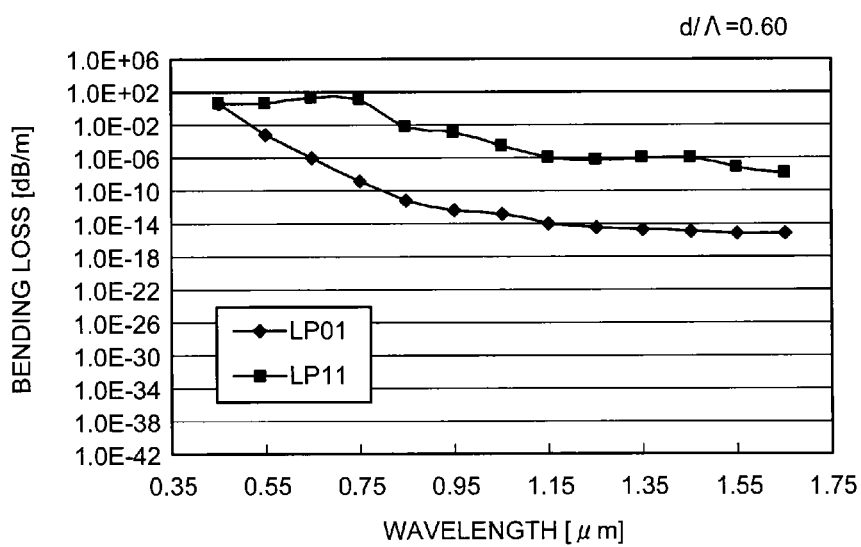
FIG. 18 is a graph illustrating wavelength dependences of bending losses of two propagation modes when $\Lambda$ is 8.0 μm and $d/\Lambda$ is 0.60.
Figure 19:
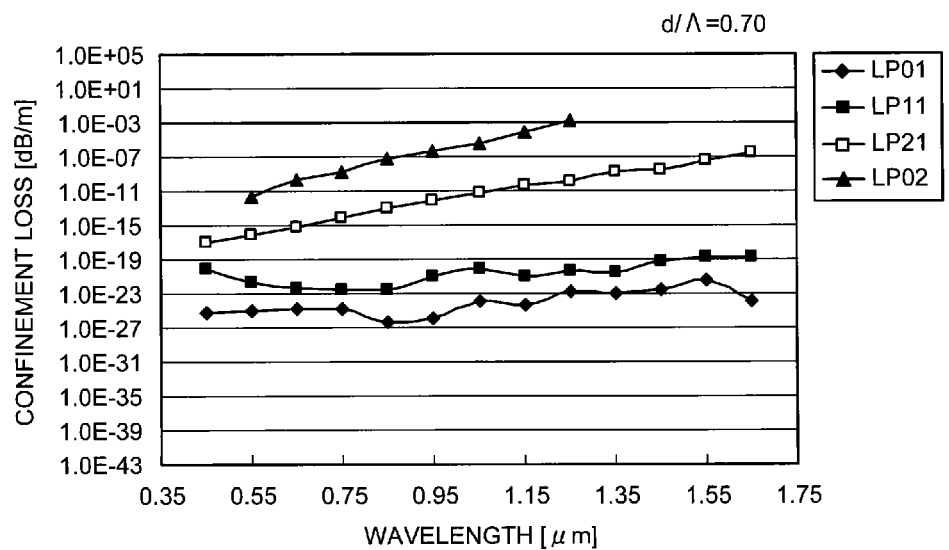
FIG. 19 is a graph illustrating wavelength dependences of confinement losses of four propagation modes when $\Lambda$ is 8.0 μm and $d/\Lambda$ is 0.70.
Figure 20:
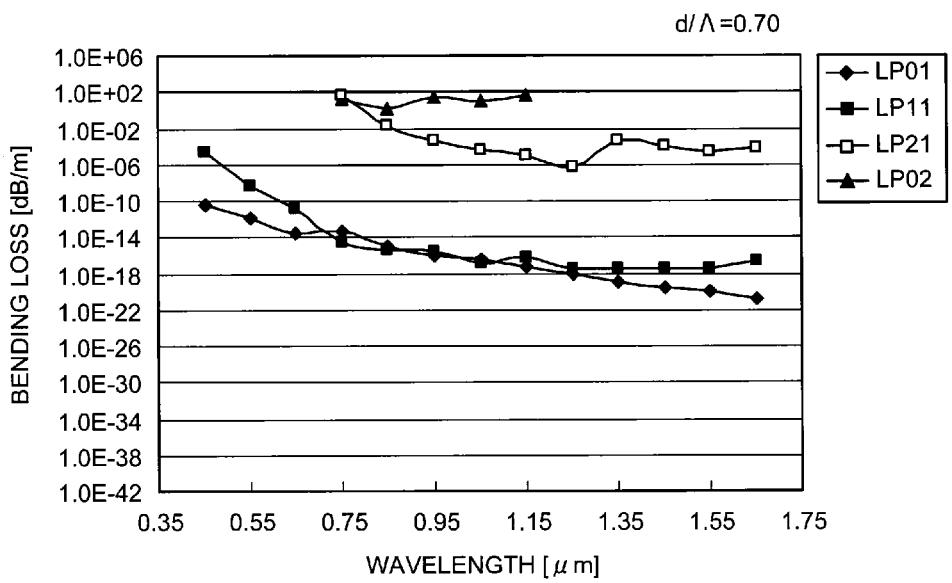
FIG. 20 is a graph illustrating wavelength dependences of bending losses of four propagation modes when $\Lambda$ is 8.0 μm and d/$\Lambda$ is 0.70.
Figure 21:
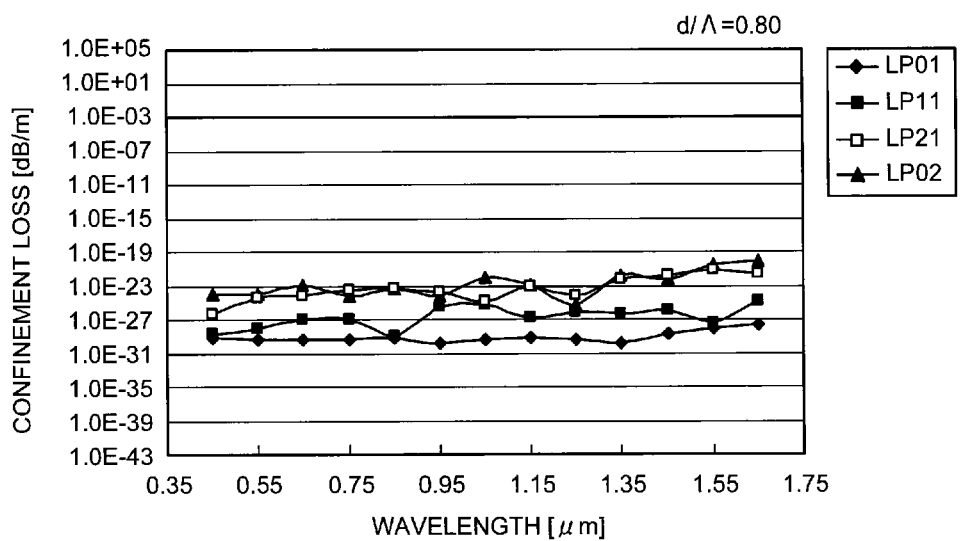
FIG. 21 is a graph illustrating wavelength dependences of confinement losses of four propagation modes when $\Lambda$ is 8.0 μm and d/$\Lambda$ is 0.80.
Figure 22:
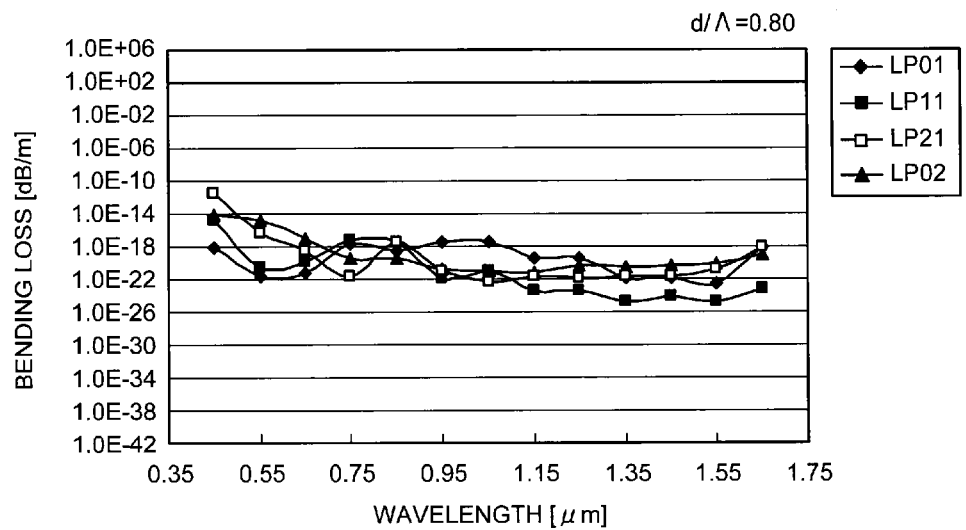
FIG. 22 is a graph illustrating wavelength dependences of bending losses of four propagation modes when $\Lambda$ is 8.0 μm and d/$\Lambda$ is 0.80.

FIGS. 17 and 18 are graphs illustrating wavelength dependences of confinement losses and bending losses, respectively, of two propagation modes when Λ is 8.0 µm and d/Λ is 0.60. FIGS. 19 and 20 are graphs illustrating wavelength dependences of confinement losses and bending losses, respectively, of four propagation modes when Λ is 8.0 µm and d/Λ is 0.70. FIGS. 21 and 22 are graphs illustrating wavelength dependences of confinement losses and bending losses, respectively, of four propagation modes when Λ is 8.0 µm and d/Λ is 0.80. The graphs illustrated in FIGS. 17 to 22 are made using the corresponding data illustrated in FIGS. 14 to 16.

Similarly to the examples in FIGS. 6 to 13, in the examples illustrated in FIGS. 17 to 22, more reliable three-mode transmission is achievable by appropriately selecting the use wavelength bandwidth taking the confinement loss in the LP02 mode into consideration and setting a smaller value for d/Λ.

Furthermore, for any higher-order propagation mode, confinement loss equal to or less than 1.0 dB/km in a predetermined wavelength bandwidth is usable for optical transmission, and bending loss equal to or less than 100 db/m in the predetermined wavelength bandwidth is preferably usable practically.

An example in which Λ is set to 12.0 µm is described below. FIG. 23 is a table illustrating calculation results of optical characteristics of two propagation modes when Λ is 12.0 µm and d/Λ is 0.60. As illustrated in FIG. 23, when Λ is 12.0 µm and d/Λ is 0.60 in the HF 10, confinement losses of two modes LP01 and LP11 are equal to or less than 1.0 dB/km over at least a bandwidth of 1200 nm or wider at a wavelength range of 0.45 µm to 1.65 µm, and two-mode transmission is possible.

In the LP11 mode, the bending loss is larger than 100 dB/m at least at a wavelength equal to or less than 0.95 µm. As a result, it is preferable for practical use to perform the two-mode transmission for example over at least a wavelength bandwidth of 600 nm or wider at a wavelength range of 1.05 µm to 1.65 µm.

Generally, the smaller the effective core area, the stronger the optical confinement, and thus to reduce the bending loss, the effective core area is preferably small. To reduce the bending loss to 100 dB/m or less, the effective core area is preferably 150 µm² or less, more preferably 130 µm² or less, for example.

FIG. 24 is a table illustrating calculation results of optical characteristics of four propagation modes when $\Lambda$ is 12.0 µm and d/$\Lambda$ is 0.70. As illustrated in FIG. 24, when $\Lambda$ is 12.0 µm and d/$\Lambda$ is 0.70 in the HF 10, confinement losses of four modes LP01, LP11, LP21, and LP02 are equal to or less than 1.0 dB/km over at least a bandwidth of 1200 nm or wider at a wavelength range of 0.45 µm to 1.65 µm and four-mode transmission is possible.

In the LP02 mode, bending loss is larger than 100 dB/m at least at a wavelength equal to or less than 0.45 µm and at a wavelength equal to or greater than 1.55 µm. Therefore, it is preferable for practical use to perform, for example, three-mode transmission at least at a wavelength of 0.45 µm and at least over a wavelength bandwidth of 100 nm or wider at a wavelength range of 1.55 µm to 1.65 µm, and four-mode transmission over at least a wavelength bandwidth of 900 nm or wider at a wavelength range of 0.55 µm to 1.45 µm.

FIG. 25 is a table illustrating calculation results of optical characteristics of four propagation modes when $\Lambda$ is 12.0 µm and d/$\Lambda$ is 0.80. As illustrated in FIG. 25, when $\Lambda$ is 12.0 µm and d/$\Lambda$ is 0.80 in the HF 10, confinement losses of four modes are equal to or less than 1.0 dB/km and bending losses thereof are equal to or less than 100 dB/m, over at least a bandwidth of 1200 nm or wider at a wavelength range of 0.45 µm to 1.65 µm, and thus four-mode transmission preferable for practical use is possible. In FIG. 25, all of the effective core areas are smaller than 150 µm² and the bending losses are equal to or less than 100 dB/m, which are preferable.

Figure 26:
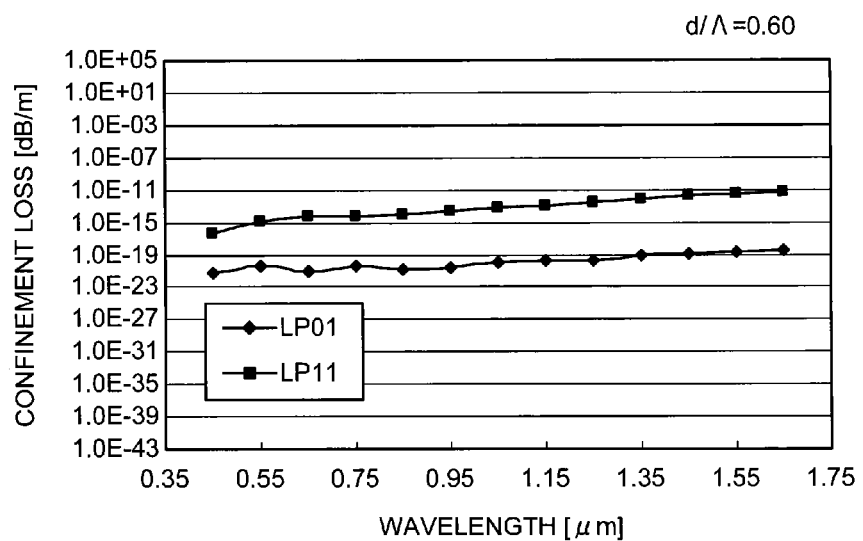
FIG. 26 is a graph illustrating wavelength dependences of confinement losses of two propagation modes when $\Lambda$ is 12.0 μm and d/$\Lambda$ is 0.60.
Figure 27:
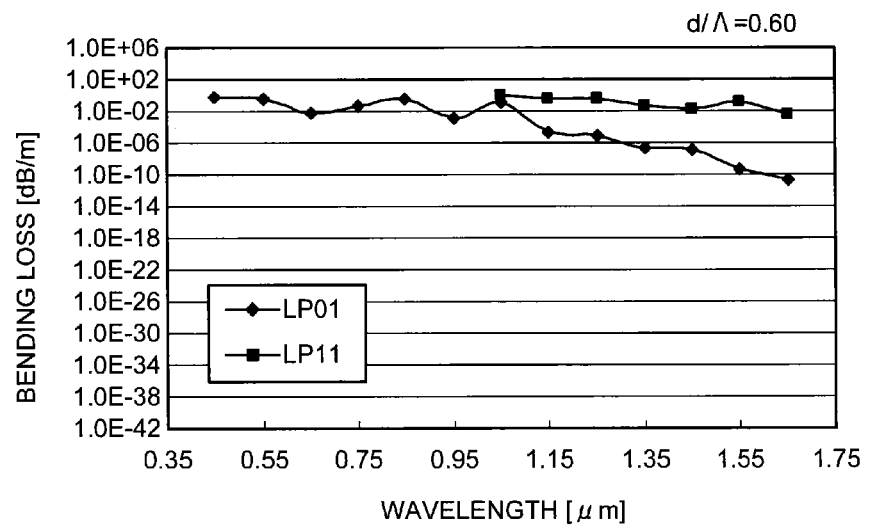
FIG. 27 is a graph illustrating wavelength dependences of bending losses of two propagation modes when $\Lambda$ is 12.0 μm and d/$\Lambda$ is 0.60.
Figure 28:
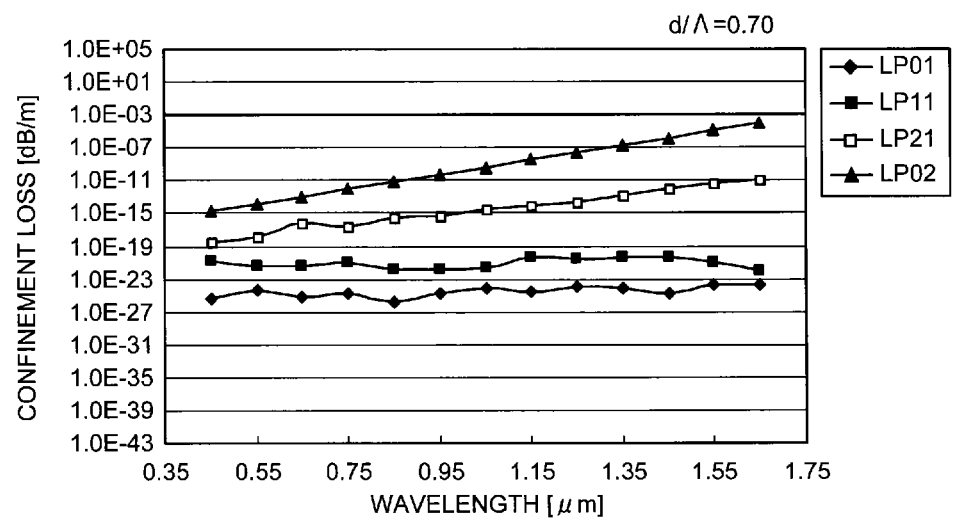
FIG. 28 is a graph illustrating wavelength dependences of confinement losses of four propagation modes when $\Lambda$ is 12.0 μm and d/$\Lambda$ is 0.70.
Figure 29:
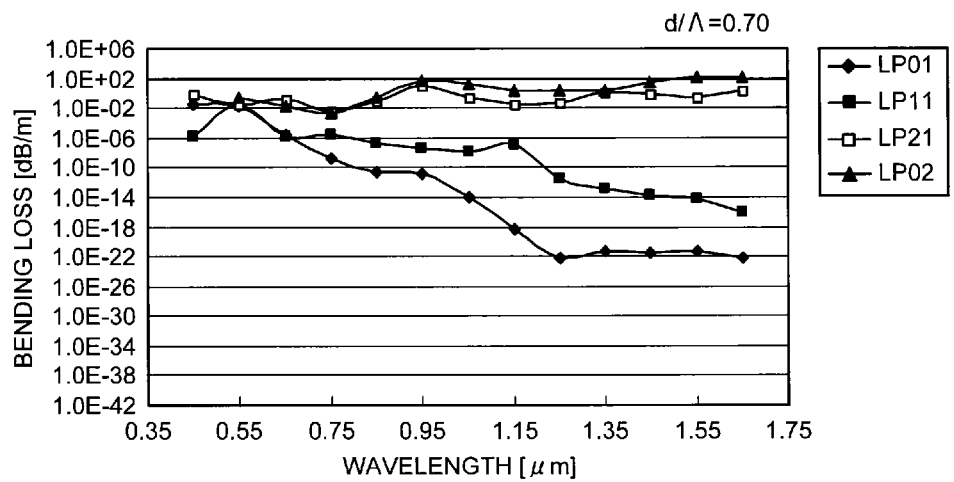
FIG. 29 is a graph illustrating wavelength dependences of bending losses of four propagation modes when $\Lambda$ is 12.0 μm and d/$\Lambda$ is 0.70.
Figure 30:
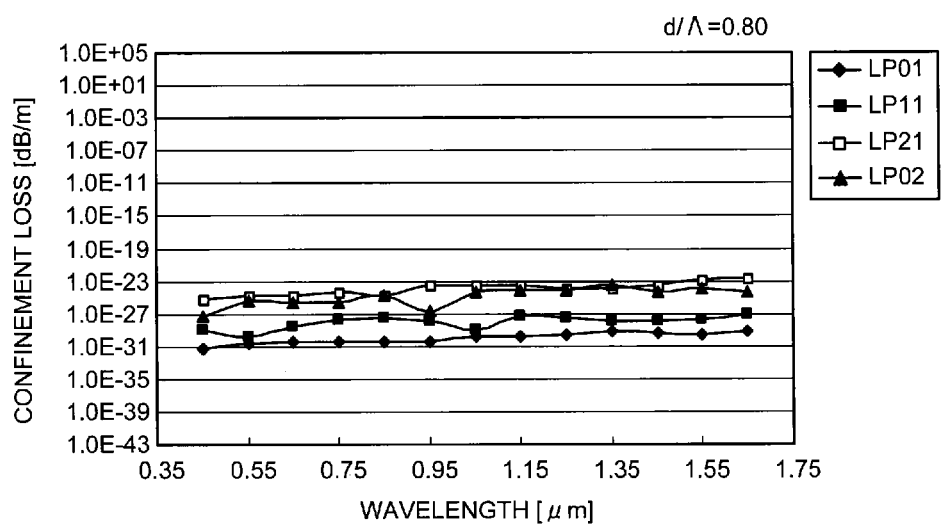
FIG. 30 is a graph illustrating wavelength dependences of confinement losses of four propagation modes when $\Lambda$ is 12.0 μm and d/$\Lambda$ is 0.80.
Figure 31:
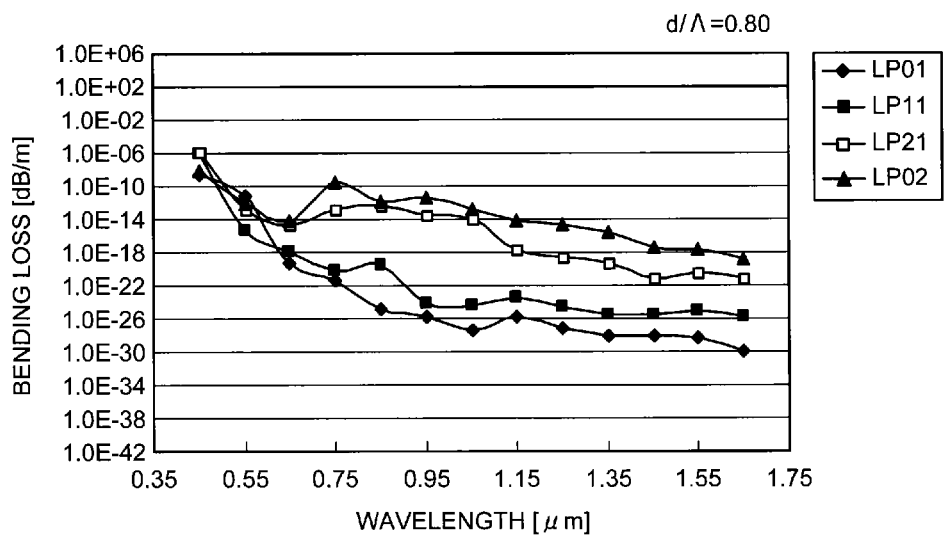
FIG. 31 is a graph illustrating wavelength dependences of bending losses of four propagation modes when $\Lambda$ is 12.0 μm and d/$\Lambda$ is 0.80.

FIGS. 26 and 27 are graphs illustrating wavelength dependences of confinement losses and bending losses, respectively, of two propagation modes when $\Lambda$ is 12.0 µm and d/$\Lambda$ is 0.60. FIGS. 28 and 29 are graphs illustrating wavelength dependences of confinement losses and bending losses, respectively, of four propagation modes when $\Lambda$ is 12.0 µm and d/$\Lambda$ is 0.70. FIGS. 30 and 31 are graphs illustrating wavelength dependences of confinement losses and bending losses, respectively, of four propagation modes when $\Lambda$ is 12.0 µm and d/$\Lambda$ is 0.80. The graphs illustrated in FIGS. 26 to 31 are made using the corresponding data illustrated in FIGS. 23 to 25.

Similarly to the examples in FIGS. 6 to 13, in the examples illustrated in FIGS. 26 to 31, more reliable three-mode transmission using the LP01, LP11, and LP21 modes is achievable by setting the value of d/$\Lambda$ such that the confinement loss of the LP02 mode becomes larger than 1 dB/km and by appropriately selecting the use wavelength bandwidth as necessary.

Furthermore, any higher-order propagation mode is usable for optical transmission if the confinement loss is equal to or less than 1.0 dB/km in a predetermined wavelength bandwidth, and is preferably and practically usable if the bending loss is equal to or less than 100 db/m in the predetermined wavelength bandwidth.

A case in which $\Lambda$ is set to 13.5 µm is described below. FIG. 32 is a table illustrating calculation results of optical characteristics of three propagation modes when $\Lambda$ is 13.5 µm and d/$\Lambda$ is 0.60. As illustrated in FIG. 32, when $\Lambda$ is 13.5 µm and d/$\Lambda$ is 0.60 in the HF 10, confinement losses of two modes LP01 and LP11 are equal to or less than 1.0 dB/km over at least a bandwidth of 1200 nm or wider at a wavelength range of 0.45 µm to 1.65 µm, and two-mode transmission is possible.

In the LP01 mode however, the bending loss is larger than 100 dB/m at least at a wavelength equal to or less than 0.85 µm. In the LP11 mode, the bending loss is larger than 100 dB/m at least at a wavelength equal to or less than 1.35 µm. Therefore, it is preferable for practical use to perform the two-mode transmission for example over a wavelength bandwidth of 200 nm or wider at a wavelength range of 1.45 µm to 1.65 µm.

FIG. 33 is a table illustrating calculation results of optical characteristics of four propagation modes when $\Lambda$ is 13.5 µm and d/$\Lambda$ is 0.70. In the calculation results of FIG. 33, the LP11 mode is a TE mode while the LP21 mode is an EH mode. As illustrated in FIG. 33, when $\Lambda$ is 13.5 µm and d/$\Lambda$ is 0.70 in the HF 10, confinement losses of the four modes LP01, LP11, LP21, and LP02 are equal to or less than 1.0 dB/km and bending losses thereof are equal to or less than 100 dB/m over at least a bandwidth of 1200 nm or wider at a wavelength range of 0.45 µm to 1.65 µm, and thus four-mode transmission preferable for practical use is possible.

Figure 34:
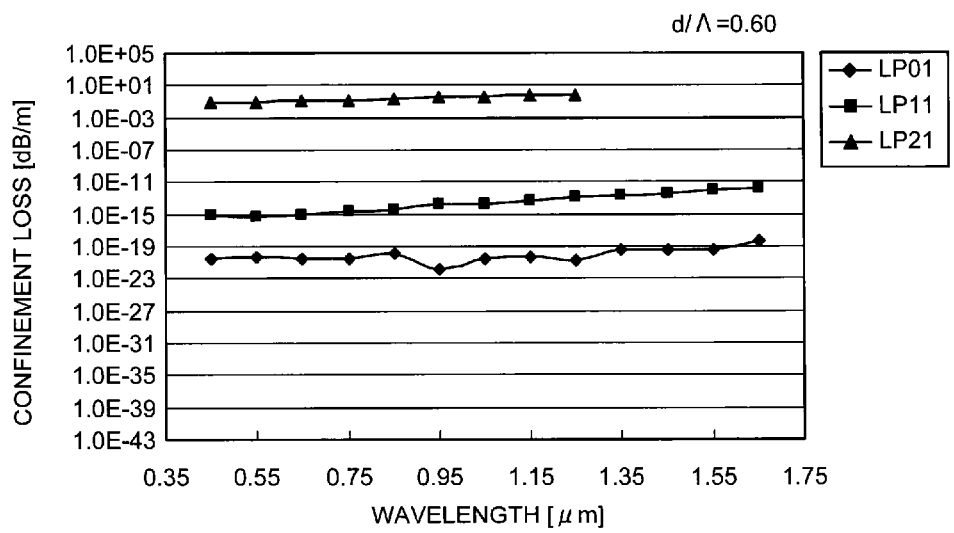
FIG. 34 is a graph illustrating wavelength dependences of confinement losses of three propagation modes when $\Lambda$ is 13.5 μm and d/$\Lambda$ is 0.60.
Figure 35:
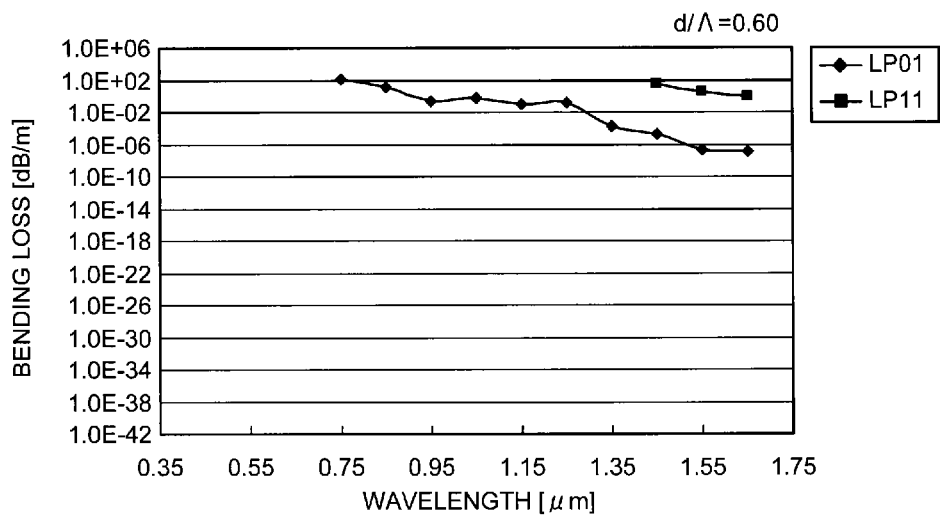
FIG. 35 is a graph illustrating wavelength dependences of bending losses of two propagation modes when $\Lambda$ is 13.5 μm and d/$\Lambda$ is 0.60.
Figure 36:
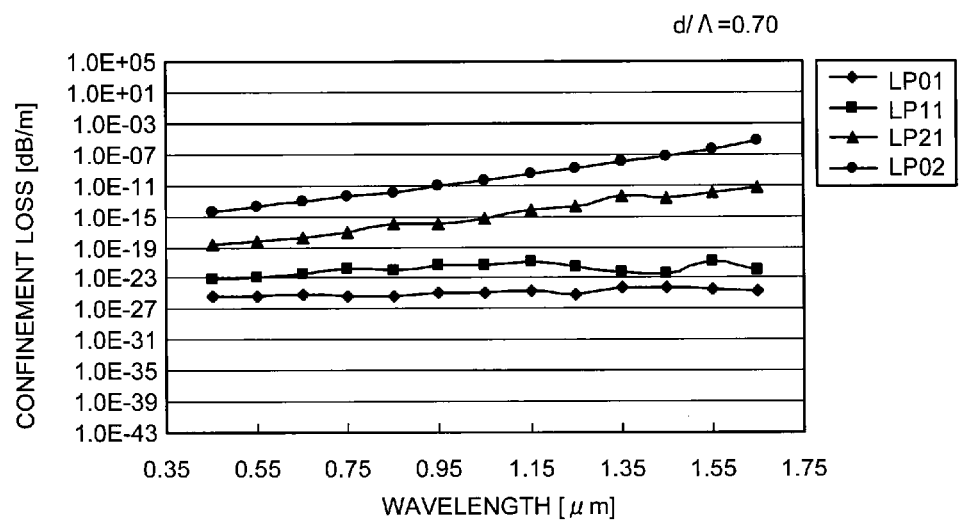
FIG. 36 is a graph illustrating wavelength dependences of confinement losses of four propagation modes when $\Lambda$ is 13.5 μm and d/$\Lambda$ is 0.70.
Figure 37:
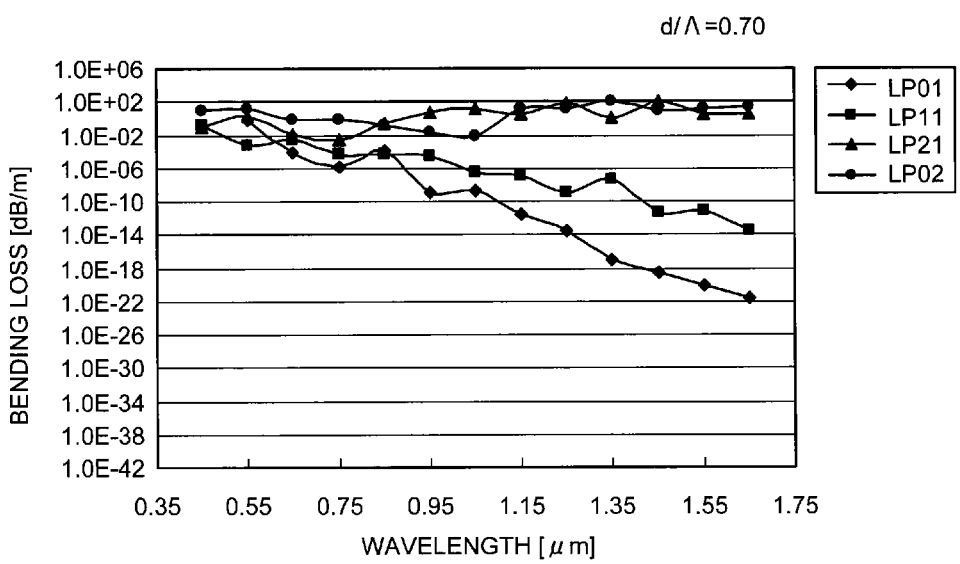
FIG. 37 is a graph illustrating wavelength dependences of bending losses of four propagation modes when $\Lambda$ is 13.5 μm and d/$\Lambda$ is 0.70.

FIG. 34 is a graph illustrating wavelength dependences of confinement losses of three propagation modes when $\Lambda$ is 13.5 µm and d/$\Lambda$ is 0.60. FIG. 35 is a graph illustrating wavelength dependences of bending loss of two modes when $\Lambda$ is 13.5 µm and d/$\Lambda$ is 0.60. FIGS. 36 and 37 are graphs illustrating wavelength dependences of confinement losses and bending losses, respectively, of four propagation modes when $\Lambda$ is 13.0 µm and d/$\Lambda$ is 0.70.

Similarly to the examples in FIGS. 6 to 13, in the examples illustrated in FIGS. 34 to 37, more reliable three-mode transmission using the LP01, LP11, and LP21 modes is achievable by setting the value of d/$\Lambda$ such that the confinement loss in the LP02 mode is larger than 1 dB/km and by appropriately selecting the use wavelength bandwidth as necessary.

Furthermore, any higher-order propagation mode is usable for optical transmission if the confinement loss is equal to or less than 1.0 dB/km in a predetermined wavelength bandwidth, and preferably and practically usable if the bending loss is equal to or less than 100 db/m in the predetermined wavelength bandwidth.

When $\Lambda$ is greater than 13.5 µm, the wavelength bandwidth over which the bending loss of the LP11 mode becomes greater than 100 dB/m is widened even if d/$\Lambda$ is 0.6, for example. As a result, the bandwidth over which the two-mode transmission is preferably and practically possible is shortened. Therefore, a preferable range of $\Lambda$ is 8.0 µm to 13.5 µm.

In the above calculation, a calculating area was set assuming a cladding diameter of the cladding portion 12 to be 180 µm. In the following description, calculation is made using a calculating area set assuming the cladding diameter to be 125 µm. Reliability of an optical fiber having a cladding diameter of 125 µm is higher than that of an optical fiber having a cladding diameter of 180 µm.

FIG. 38 is a table illustrating calculation results of optical characteristics of three propagation modes when $\Lambda$ is 10.0 µm and d/$\Lambda$ is 0.60. As illustrated in FIG. 38, when $\Lambda$ is 10.0 µm and d/$\Lambda$ is 0.60 in the HF 10, confinement losses of the two modes LP01 and LP11 are equal to or less than 1.0 dB/km and bending losses thereof are equal to or less than 100 dB/m over at least a bandwidth of 1200 nm or wider at a wavelength range of 0.45 µm to 1.65 µm, and thus two-mode transmission preferable for practical use is possible.

FIG. 39 is a table illustrating calculation results of optical characteristics of three propagation modes when $\Lambda$ is 10.0 µm and d/$\Lambda$ is 0.58. As illustrated in FIG. 39, when $\Lambda$ is 10.0 µm and d/Λ is 0.58 in the HF 10, confinement losses of two modes are equal to or less than 1.0 dB/km over at least a bandwidth of 1200 nm or wider at a wavelength range of 0.45 µm to 1.65 µm, and two-mode transmission is possible.

In both of the propagation modes, the bending losses are larger than 100 dB/m at least at a wavelength of 0.45 µm. Therefore, it is preferable for practical use to perform the two-mode transmission for example over at least a wavelength bandwidth of 1100 nm or wider at a wavelength range of 0.55 µm to 1.65 µm.

FIG. 40 is a table illustrating calculation results of optical characteristics of three propagation modes when Λ is 10.0 µm and d/Λ is 0.56. As illustrated in FIG. 40, when Λ is 10.0 µm and d/Λ is 0.56 in the HF 10, confinement losses of two modes are equal to or less than 1.0 dB/km over at least a bandwidth of 1200 nm or wider at a wavelength range of 0.45 µm to 1.65 µm, and two-mode transmission preferable for practical use is possible.

In the LP11 mode however, the bending loss may become larger than 100 dB/m at least at a wavelength equal to or less than 0.65 µm. As a result, it is preferable for practical use to perform two-mode transmission for example over at least a wavelength bandwidth of 900 nm or wider at a wavelength range of 0.75 µm to 1.65 µm.

Figure 41:
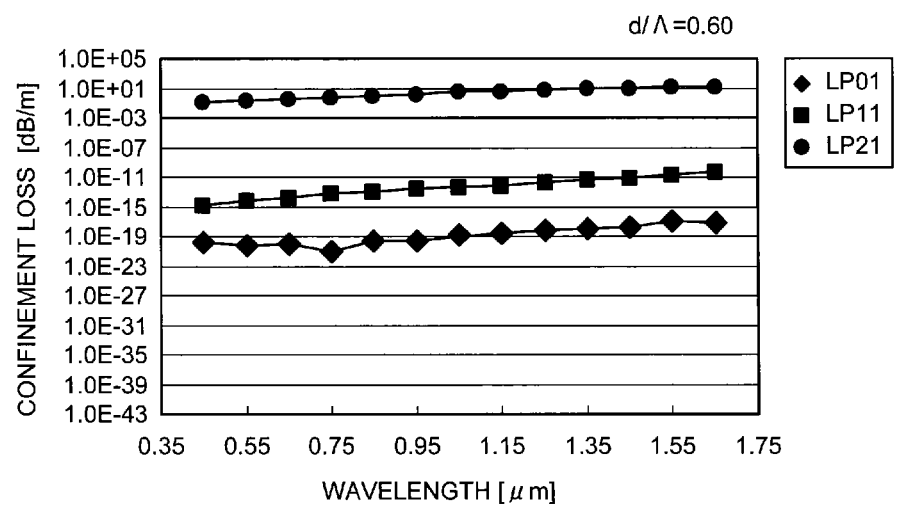
FIG. 41 is a graph illustrating wavelength dependences of confinement losses of three propagation modes when $\Lambda$ is 10.0 μm and d/$\Lambda$ is 0.60.
Figure 42:
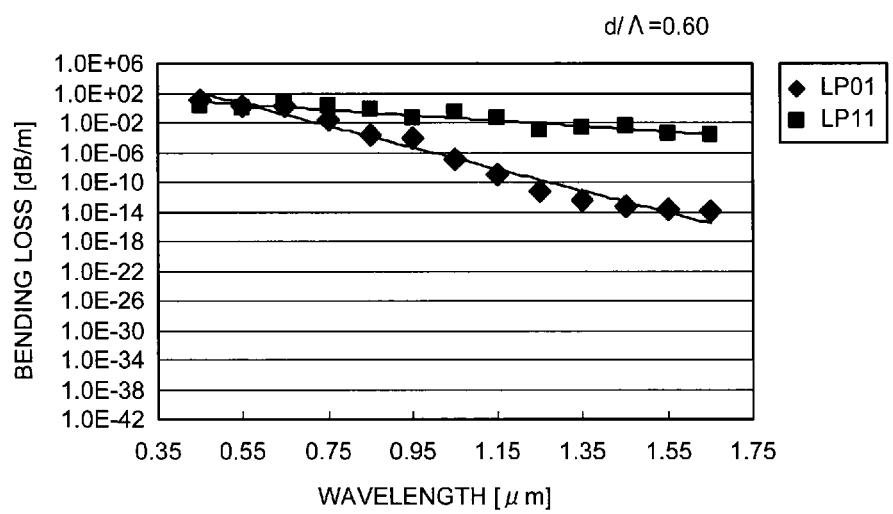
FIG. 42 is a graph illustrating wavelength dependences of bending losses of two propagation modes when $\Lambda$ is 10.0 μm and d/$\Lambda$ is 0.60.
Figure 43:
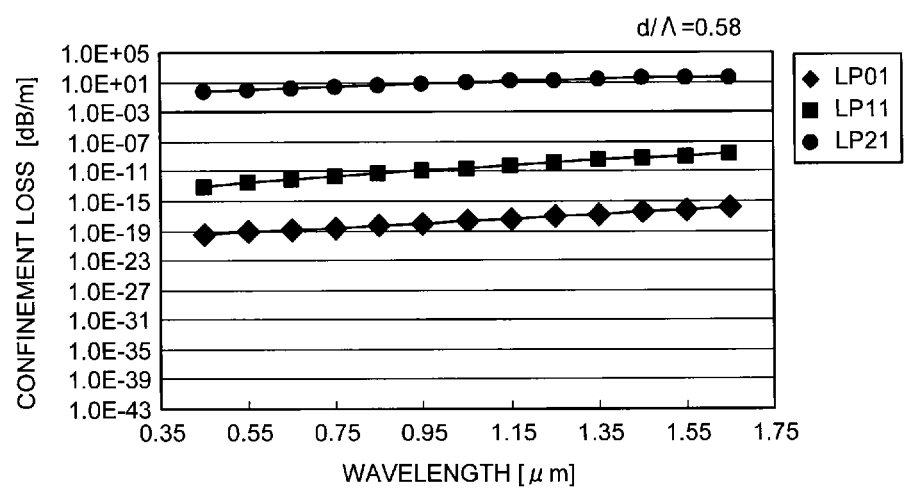
FIG. 43 is a graph illustrating wavelength dependences of confinement losses of three propagation modes when $\Lambda$ is 10.0 μm and d/$\Lambda$ is 0.58.
Figure 44:
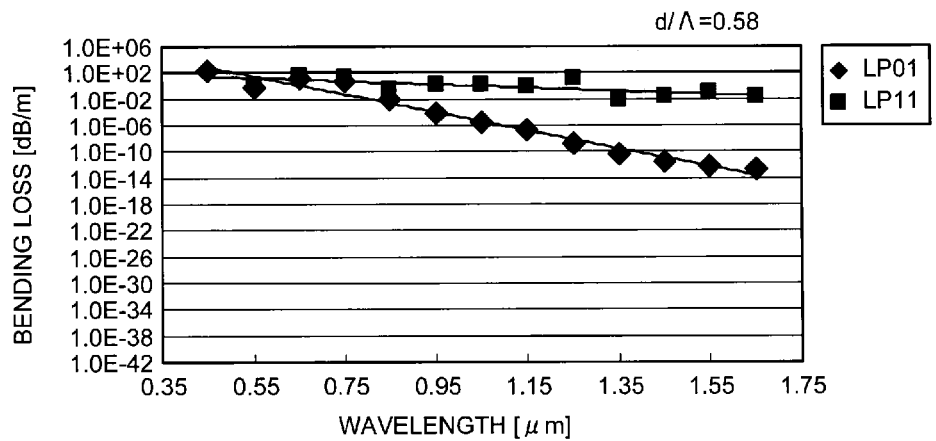
FIG. 44 is a graph illustrating wavelength dependences of bending losses of two propagation modes when $\Lambda$ is 10.0 μm and d/$\Lambda$ is 0.58.
Figure 45:
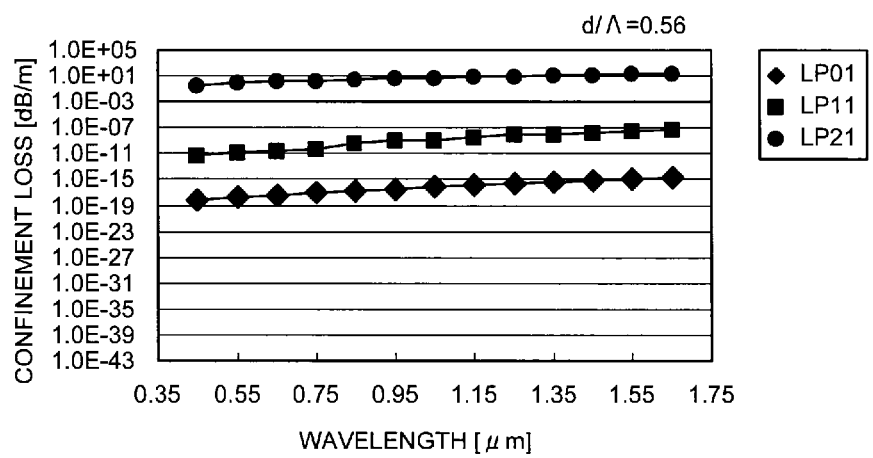
FIG. 45 is a graph illustrating wavelength dependences of confinement losses of three propagation modes when $\Lambda$ is 10.0 μm and d/$\Lambda$ is 0.56.
Figure 46:
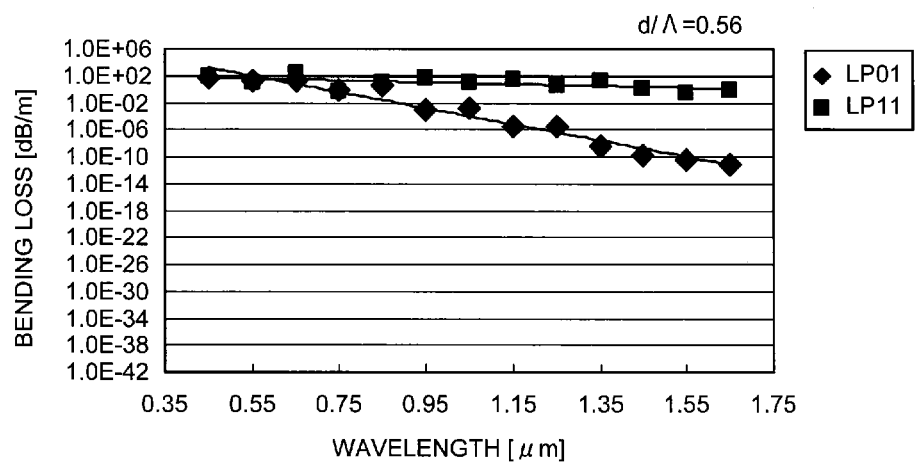
FIG. 46 is a graph illustrating wavelength dependences of bending losses of two propagation modes when $\Lambda$ is 10.0 μm and d/$\Lambda$ is 0.56.

FIGS. 41 and 42 are graphs illustrating wavelength dependences of confinement losses and bending losses of three or two propagation modes respectively when Λ is 10.0 µm and d/Λ is 0.60. FIGS. 43 and 44 are graphs illustrating wavelength dependences of confinement losses and bending losses of three or two propagation modes respectively when Λ is 10.0 µm and d/Λ is 0.58. FIGS. 45 and 46 are graphs illustrating wavelength dependences of confinement losses and bending losses of three or two propagation modes respectively when Λ is 10.0 mm and d/Λ is 0.56. The graphs illustrated in FIGS. 41 to 46 are made using the corresponding data illustrated in FIGS. 38 to 40.

With reference to FIGS. 38 to 46, the preferable conditions for the two-mode transmission are described above. The confinement losses are able to be made equal to or less than 1.0 dB/km and the bending losses are able to be made equal to or less than 100 dB/m, respectively over a desired wide bandwidth in a plurality of propagation modes by setting Λ to 8.0 µm to 13.5 µm and d/Λ to greater than 0.5.

Figure 47:
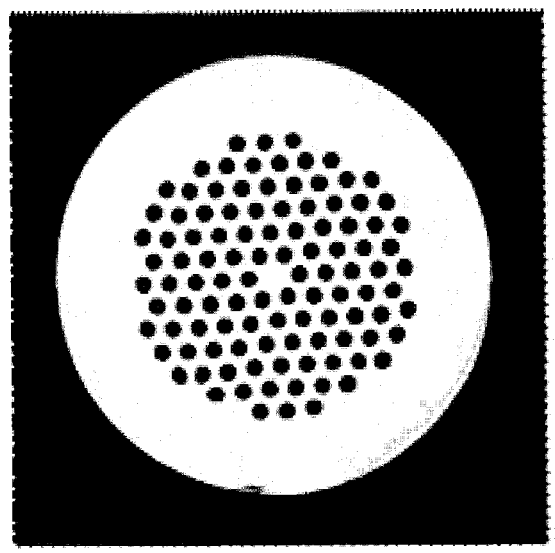
FIG. 47 is a photograph illustrating a cross-sectional surface of a manufactured HF.
Figure 48:
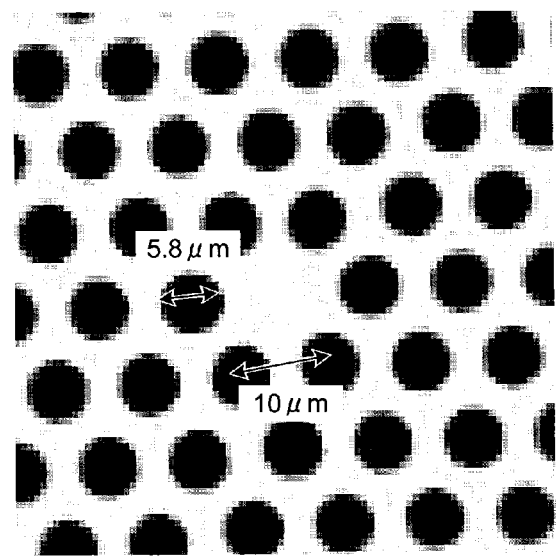
FIG. 48 is an enlarged view of the vicinity of a core portion of FIG. 47.

As a working example of the embodiment, a HF having the structure illustrated in FIG. 1 was manufactured by a known stack-and-draw method by setting Λ to 10.0 µm and d to 5.8 µm (i.e., d/Λ is 0.58). FIG. 47 is a photograph illustrating a cross-section of the manufactured HF. FIG. 48 is an enlarged view of the vicinity of a core portion in FIG. 47. As illustrated in FIG. 48, the value of Λ is approximately 10.0 µm and that of d is approximately 5.8 µm, both of which were measured on the photograph of the cross-section, and it was possible to manufacture the HF as designed.

In the first embodiment, the number of layers of the holes 13 in the HF is five. The number of layers is preferably equal to or greater than five, enabling reduction of confinement loss. The number of layers of the holes to be formed may be equal to or greater than five and equal to or less than six because the five-layer structure is able to sufficiently reduce the confinement losses in the higher-order modes. The number of layers of holes to be formed is preferably equal to or less than six, because an increase in the number of layers markedly reduces the ease of manufacturing.

The optical fiber according to the disclosure is also achievable with a structure of a typical optical fiber having no holes, which is called a solid type, not being limited to the above-described HF. A second embodiment of the disclosure, in which a solid type optical fiber is adopted, is described below.

Second Embodiment

Figure 49:
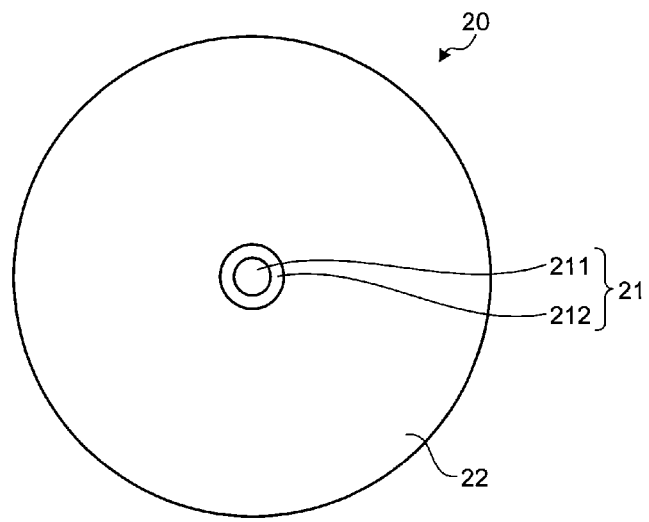
FIG. 49 is a schematic cross sectional view of an optical fiber according to a second embodiment.

FIG. 49 is a schematic cross sectional view of an optical fiber according to a second embodiment of the disclosure. As illustrated in FIG. 49, an optical fiber 20 includes a core portion 21 located at a center thereof and a cladding portion 22 formed around the core portion 21.

The core portion 21 includes a center core portion 211 and an outer core portion 212 that is located around the center core portion 211. The center core portion 211 is made of quartz glass containing a dopant such as germanium (Ge), which increases a refractive index thereof. The outer core portion 212 is made of quartz glass containing a dopant such as fluorine (F), which decreases a refractive index thereof. The cladding portion 22 is made of pure quartz glass containing no dopant for adjusting a refractive index thereof. As a result, the center core portion 211 has a refractive index that is maximum in the core portion 21 and higher than that of the cladding portion 22. The outer core portion 212 has a refractive index lower than that of the cladding portion 22.

Figure 50:
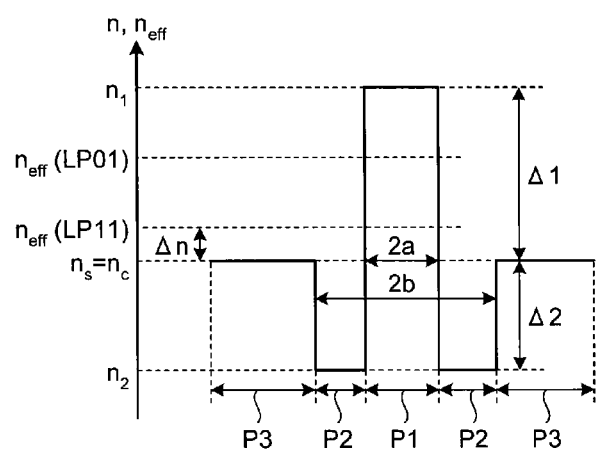
FIG. 50 is a schematic diagram illustrating a refractive index profile of the optical fiber illustrated in FIG. 49.

FIG. 50 is a schematic diagram illustrating a refractive index profile of the optical fiber 20 illustrated in FIG. 49. In FIG. 50, a region P1 illustrates the refractive index profile of the center core portion 211. A region P2 illustrates the refractive index profile of the outer core portion 212. A region P3 illustrates the refractive index profile of the cladding portion 22. In this way, the optical fiber 20 has a so-called W-type refractive index profile, in which the refractive index of the outer core portion 212 is lower than that of the cladding portion 22.

As illustrated in FIG. 50, a relative refractive-index difference of the center core portion 211 with respect to the cladding portion 22 is denoted by Δ1, while a relative refractive-index difference of the outer core portion 212 with respect to the cladding portion 22 is denoted by Δ2. The relative refractive-index differences Δ1 and Δ2 are defined by the following formulae (1) and (2).

$$\Delta 1 = \{(n_1 - n_c)/n_c\} \times 100 [\%] \tag{1}$$

$$\Delta 2 = \{(n_2 - n_c)/n_c\} \times 100 [\%] \tag{2}$$

where $n_1$ is the maximum refractive index of the center core portion 211, $n_2$ is the refractive index of the outer core portion 212, and $n_c$ is the refractive index of the cladding portion 22. In the second embodiment, the cladding portion 22 is made of pure quartz glass. Thus, $n_c$ is equal to a refractive index $n_s$ of quartz glass (which is 1.44439 at a wavelength of 1550 nm).

As illustrated in FIG. 50, a diameter of the center core portion 211 is 2a while the outer diameter of the outer core portion 212 is 2b. A ratio b/a of the outer diameter 2b of the outer core portion to the diameter 2a of the center core portion is denoted by Ra. The diameter 2a of the center core portion is defined as a diameter at which the relative refractive-index difference Δ1 becomes 0% at a border between the center core portion 211 and the outer core portion 212. The outer diameter 2b of the outer core portion is defined as a diameter at which a relative refractive-index difference becomes half of the relative refractive-index difference Δ2 at a border between the outer core portion 212 and the cladding portion 22.

As illustrated in FIG. 50, an effective refractive index in the LP01 mode, which is the fundamental mode of the propagation modes of the optical fiber 20, is denoted by $n_{\it{eff}}(LP01)$, while an effective refractive index of the LP11 mode, which is the higher-order mode of first order, is denoted by $n_{\it{eff}}(LP11)$.

When a difference between $n_{eff}$ (LP11) and the refractive index $n_c$ of the cladding portion 22 is denoted by Δn, confinement loss in the LP11 mode is able to be made equal to or less than 1.0 dB/km, and more preferably bending loss in the LP11 mode is able to be made equal to or less than 100 dB/m over a desired use wavelength bandwidth of 100 nm or wider by setting Δn to a predetermined value. In this case, confinement loss in the LP01 mode, which is the fundamental mode, of equal to or less than 1.0 dB/km, and more preferably bending loss in the LP01 mode of equal to or less than 100 dB/m are realized. As a result, two-mode transmission with low loss is achievable over a wide bandwidth of 100 nm or wider.

To achieve the multi-mode transmission including higher-order propagation modes such as the three-mode transmission and the four-mode transmission, a difference between the effective refractive index $n_{eff}$ of the highest-order propagation mode and the refractive index $n_c$ of the cladding portion 22 is set such that the confinement loss of the highest-order propagation mode becomes equal to or less than 1.0 dB/km, and more preferably the bending loss of the highest-order propagation mode becomes equal to or less than 100 dB/m over a desired use wavelength bandwidth of 100 nm or wider.

Examples of optical characteristics of the optical fiber 20 having the W-type refractive index profile are described below using results of simulation calculation by the FEM. In the following calculation, a calculating area is set assuming a case in which an outer diameter of the cladding portion 22 is 180 μm. The calculation was performed using the PML.

Figure 51:
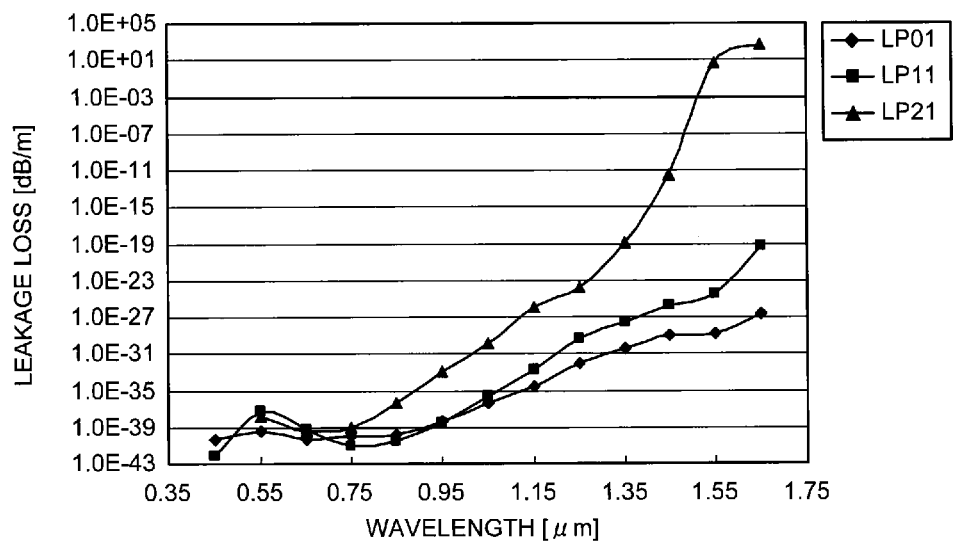
FIG. 51 is a graph illustrating wavelength dependences of leakage losses of three propagation modes when an effective core area is 170 μm$^2$.
Figure 52:
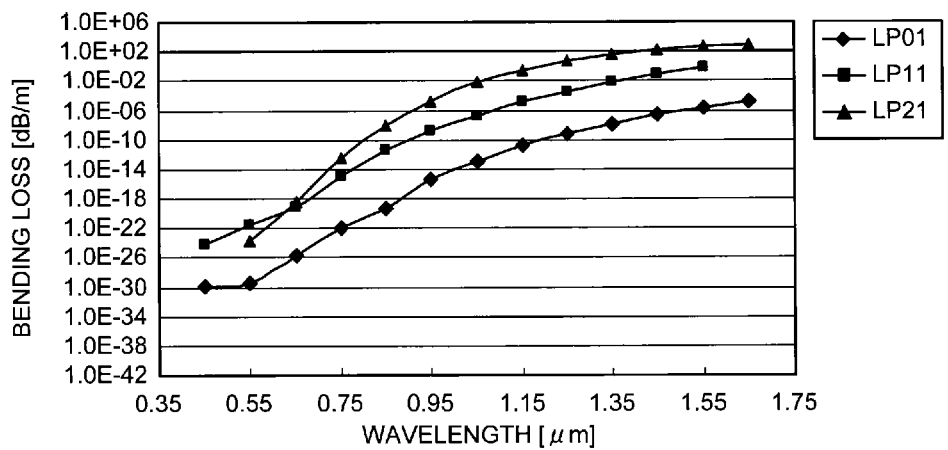
FIG. 52 is a graph illustrating wavelength dependences of bending losses of three propagation modes when the effective core area is 170 μm$^2$.

FIG. 51 is a graph illustrating wavelength dependences of leakage losses of three propagation modes when an effective core area is 170 μm². Herein, leakage loss corresponds to confinement loss of the holey fiber and is an index representing an amount of leaked light that is unable to be confined in the core and leaks out. FIG. 52 is a graph illustrating wavelength dependences of bending losses of three propagation modes when the effective core area is 170 μm². In FIGS. 51 and 52, the relative refractive-index difference Δ1 is set to 0.33%, the relative refractive-index difference Δ2 is set to −0.1%, the diameter 2a of the center core portion is set to 17.2 μm, the outer diameter 2b of the outer core portion is set to 34.4 μm, (i.e., Ra is 2.0), and the effective core area is 170 μm².

As illustrated in FIGS. 51 and 52, when the effective core area is 170 μm², the leakage losses of the two modes LP01 and LP11 are equal to or less than 1.0 dB/km (equal to or less than 1.0E-3 dB/m) and the bending losses thereof are equal to or less than 100 dB/m over a wavelength bandwidth of 100 nm or wider around a wavelength of 1.5 μm, and two-mode transmission preferable for practical use is possible. At a wavelength shorter than 1.5 μm, the leakage losses of the three modes LP01, LP11, and LP21 are equal to or less than 1.0 dB/km and the bending losses thereof are equal to or less than 100 dB/m over a wavelength bandwidth of 100 nm or wider, and three-mode transmission preferable for practical use is possible.

Figure 53:
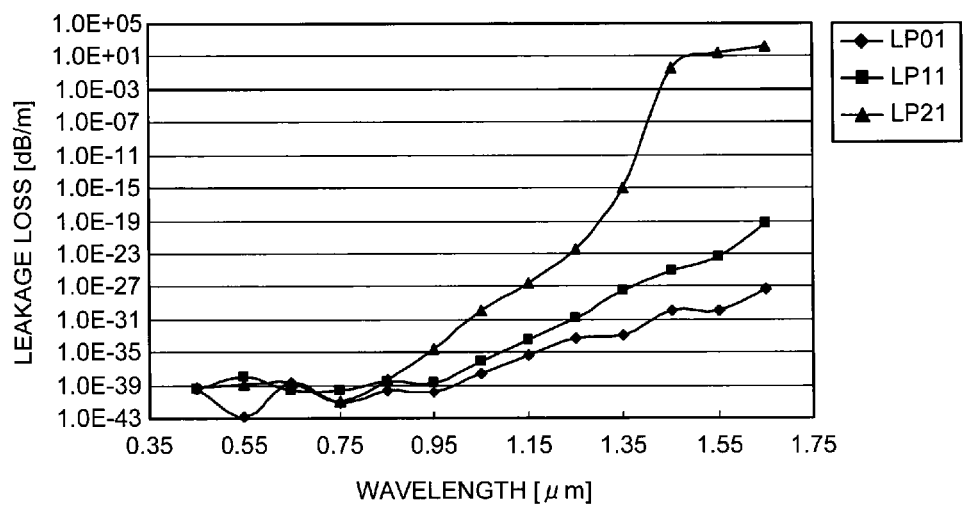
FIG. 53 is a graph illustrating wavelength dependences of leakage losses of three propagation modes when the effective core area is 130 μm$^2$.
Figure 54:
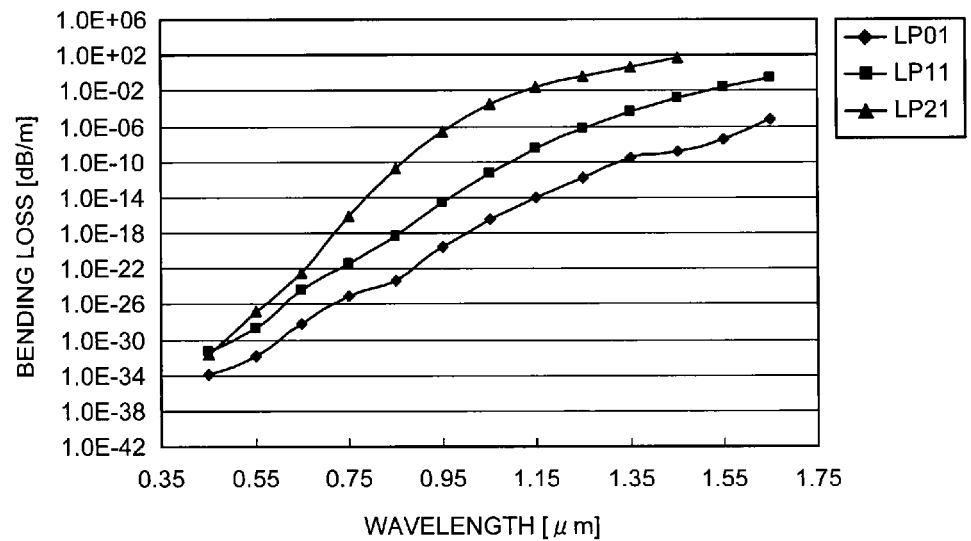
FIG. 54 is a graph illustrating wavelength dependences of bending losses of three propagation modes when the effective core area is 130 μm$^2$.

FIG. 53 is a graph illustrating wavelength dependences of leakage losses of three propagation modes when the effective core area is 130 μm². FIG. 54 is a graph illustrating wavelength dependences of bending losses of three propagation modes when the effective core area is 130 μm². In FIGS. 53 and 54, the relative refractive-index difference Δ1 is set to 0.37%, the relative refractive-index difference Δ2 is set to −0.1%, the diameter 2a of the center core portion is set to 15.2 μm, the outer diameter 2b of the outer core portion is set to 45.6 μm, (i.e., Ra is 3.0), and the effective core area is 130 μm².

As illustrated in FIGS. 53 and 54, when the effective core area is 130 μm² also, the leakage losses of the two modes LP01 and LP11 are equal to or less than 1.0 dB/km and the bending losses thereof are equal to or less than 100 dB/m over a wavelength bandwidth of 100 nm or wider around the wavelength of 1.5 μm, and two-mode transmission preferable for practical use is possible. Further, at a wavelength shorter than 1.4 μm for example, the leakage losses of the three modes LP01, LP11, and LP21 are equal to or less than 1.0 dB/km and the bending losses thereof are equal to or less than 100 dB/m over a wavelength bandwidth of 100 nm or wider, and three-mode transmission preferable for practical use is possible.

Figure 55:
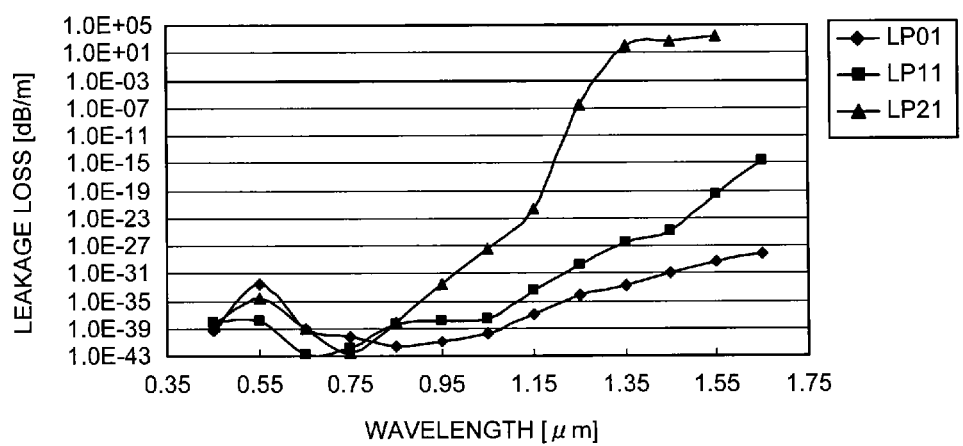
FIG. 55 is a graph illustrating wavelength dependences of leakage losses of three propagation modes when the effective core area is 90 μm$^2$.
Figure 56:
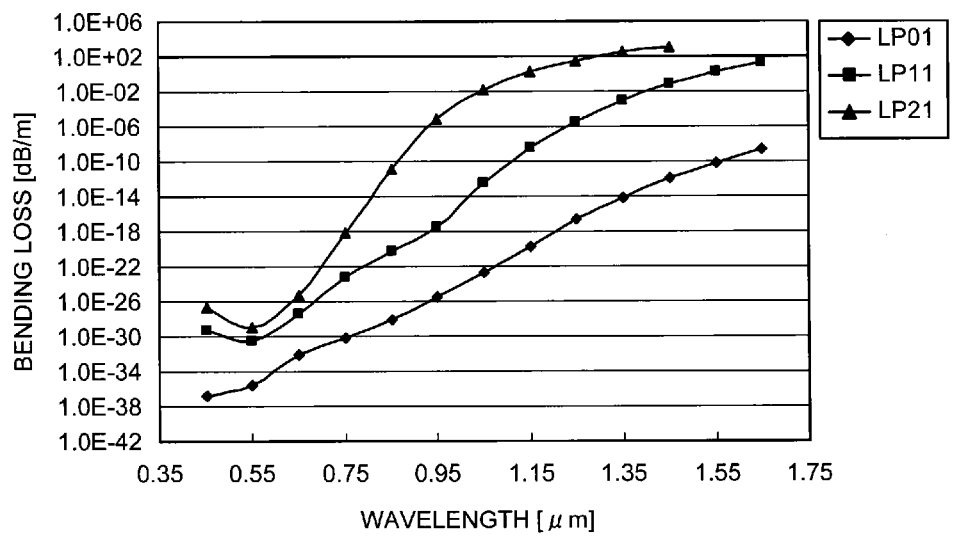
FIG. 56 is a graph illustrating wavelength dependences of bending losses of three propagation modes when the effective core area is 90 μm$^2$.

FIG. 55 is a graph illustrating wavelength dependences of leakage losses of three propagation modes when the effective core area is 90 μm². FIG. 56 is a graph illustrating wavelength dependences of bending losses of three propagation modes when the effective core area is 90 μm². In FIGS. 55 and 56, the relative refractive-index difference Δ1 is set to 0.46%, the relative refractive-index difference Δ2 is set to −0.1%, the diameter 2a of the center core portion is set to 11.8 μm, the outer diameter 2b of the outer core portion is set to 35.4 μm, (i.e., Ra is 3.0), and the effective core area is 90 μm².

As illustrated in FIGS. 55 and 56, when the effective core area is 90 μm², the leakage losses of the two modes LP01 and LP11 are equal to or less than 1.0 dB/km and the bending losses thereof are equal to or less than 100 dB/m over a wavelength bandwidth of 100 nm or wider around the wavelength of 1.5 μm and two-mode transmission preferable for practical use is possible. Further, for example at a wavelength shorter than 1.2 μm, the leakage losses of the three modes LP01, LP11, and LP21 are equal to or less than 1.0 dB/km and the bending losses thereof are equal to or less than 100 dB/m over a wavelength bandwidth of 100 nm or wider, for example, and three-mode transmission preferable for practical use is possible.

Furthermore, a wavelength bandwidth of 100 nm or wider in which multi-mode transmission is possible is achievable when the relative refractive-index difference Δ1 is 0.33% to 0.46%, the relative refractive-index difference Δ2 is equal to or greater than −0.1% and less than 0%, the diameter 2a of the center core portion is 11.8 μm to 17.2 μm, and Ra is equal to or greater than 2.0 and equal to or less than 3.0.

Third Embodiment

Figure 57:
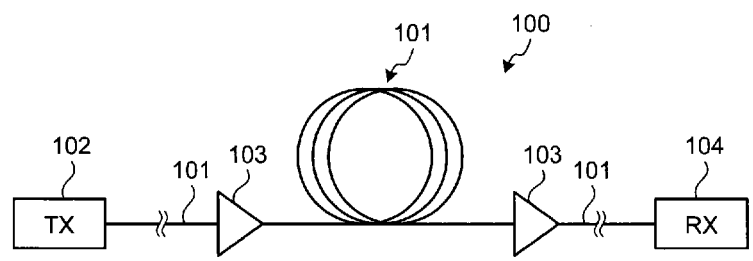
FIG. 57 is a schematic structural view of an optical transmission system according to a third embodiment.

FIG. 57 is a schematic structural view of an optical transmission system according to a third embodiment of the disclosure. As illustrated in FIG. 57, an optical transmission system 100 includes an optical fiber 101, an optical transmission device 102, an optical amplifier 103, and an optical receiving device 104.

The optical fiber 101 is an optical transmission path that connects the optical transmission device 102 and the optical receiving device 104. The optical fiber 101 is the optical fiber according to the first or the second embodiment for example, and propagates light of a predetermined use wavelength bandwidth in a plurality of propagation modes.

The optical transmission device 102 includes a signal light source such as a semiconductor laser element and outputs signal light for signal transmission using a plurality of propagation modes (e.g., the LP01 and LP11 modes) of the optical fiber 101.

The optical amplifier 103 is inserted between the optical fiber 101. The optical amplifier 103 is configured to amplify signal light propagating in the plurality of propagation modes of the optical fiber 101 per propagation mode. Field patterns of light beams in the propagation modes are different from one another. Accordingly, the optical amplifier 103 is able to amplify the signal light in each propagation mode individually or simultaneously. The optical amplifier 103 may not be provided depending on a transmission distance (a total distance of the optical fiber 101 to be used).

The optical receiving device 104 receives signal light propagated in the propagation modes of the optical fiber 101, and includes a plurality of light receiving elements that convert signal light into electrical signals per propagation mode and a signal processor that processes the electrical signals converted by the light receiving elements.

The optical transmission system 100 transmits signal light by mode-division-multiplexing transmission using the optical fiber 101 capable of propagating a plurality of modes. Therefore, a transmission unit of the optical transmission device 102 and a receiving unit of the optical receiving device 104 each include a mode multiplexer-demultiplexer that couples the signal light into the respective propagation modes or demultiplexes the mode-multiplexed signal light into signal light beams of the respective propagation modes for the signal light to be received per propagation mode. The optical transmission system 100 is able to achieve an optical transmission system having a large transmission capacity.

Fourth Embodiment

Figure 58:
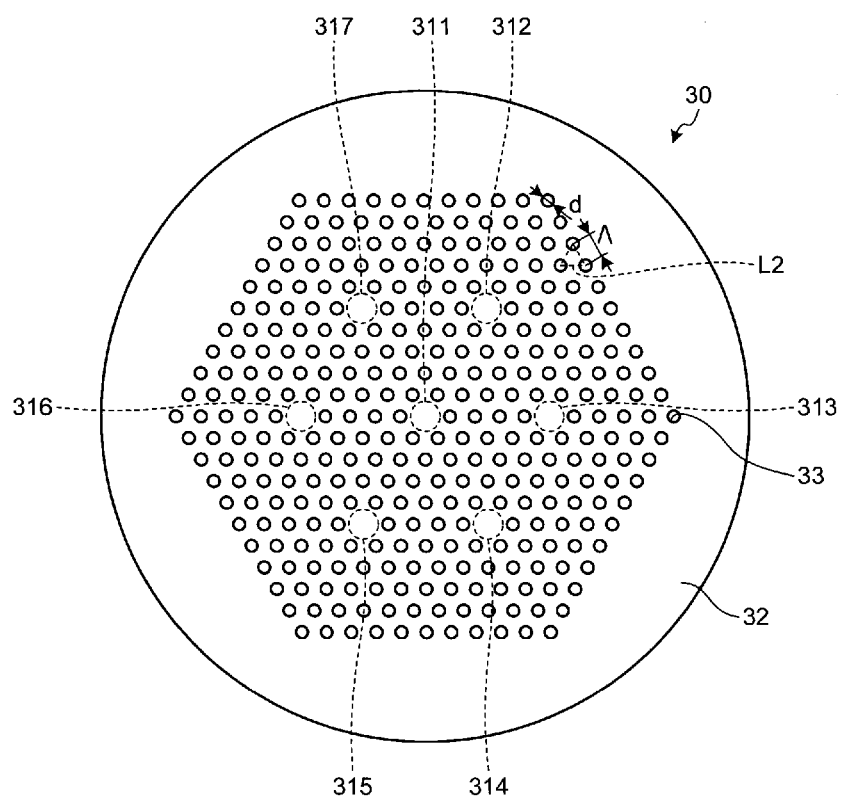
FIG. 58 is a schematic cross sectional view of a holey fiber (HF) according to a fourth embodiment.
Figure 60:
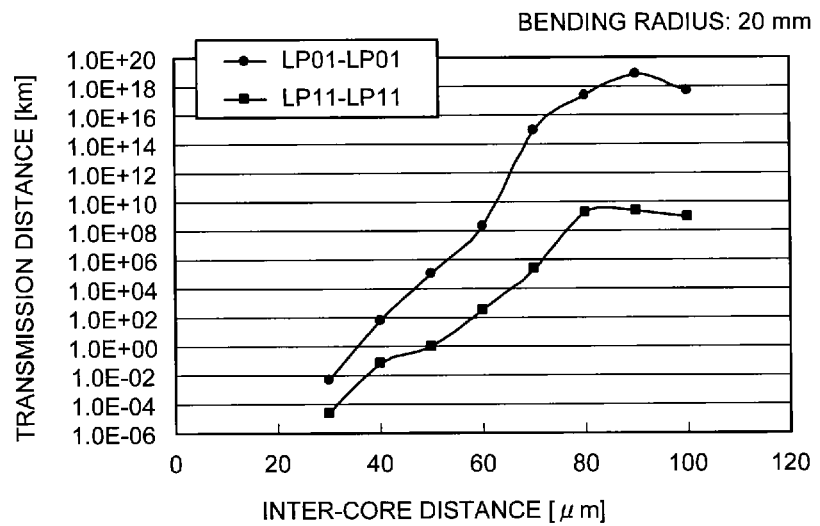
FIG. 60 is a graph illustrating relations between inter-core distances and transmission distances when a bending radius is 20 mm.
Figure 61:
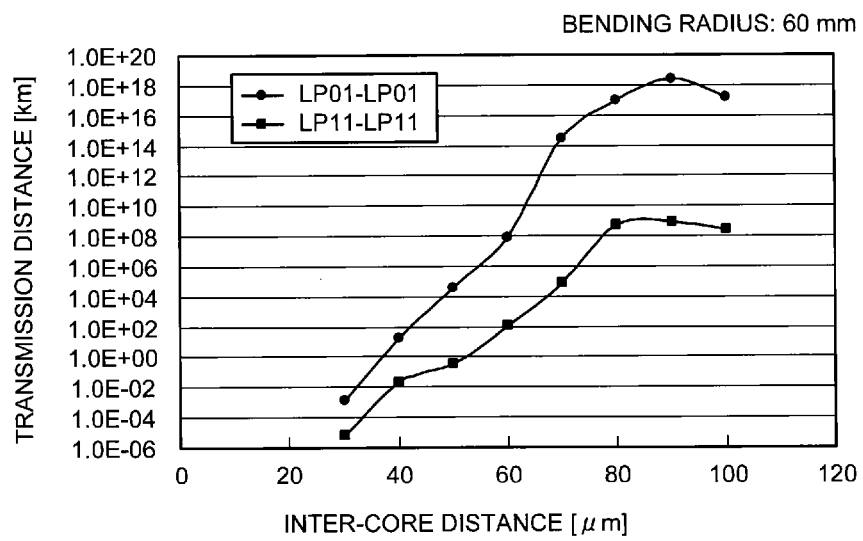
FIG. 61 is a graph illustrating relations between inter-core distances and transmission distances when the bending radius is 60 mm.
Figure 62:
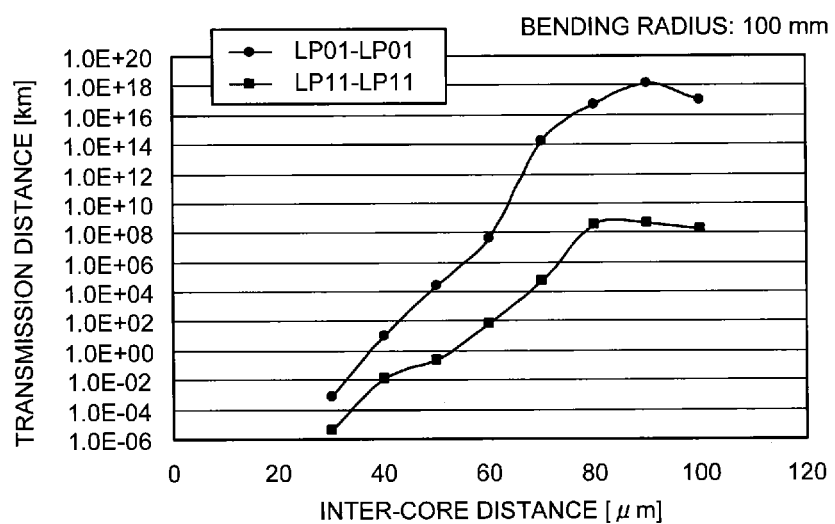
FIG. 62 is a graph illustrating relations between inter-core distances and transmission distances when the bending radius is 100 mm.
Figure 63:
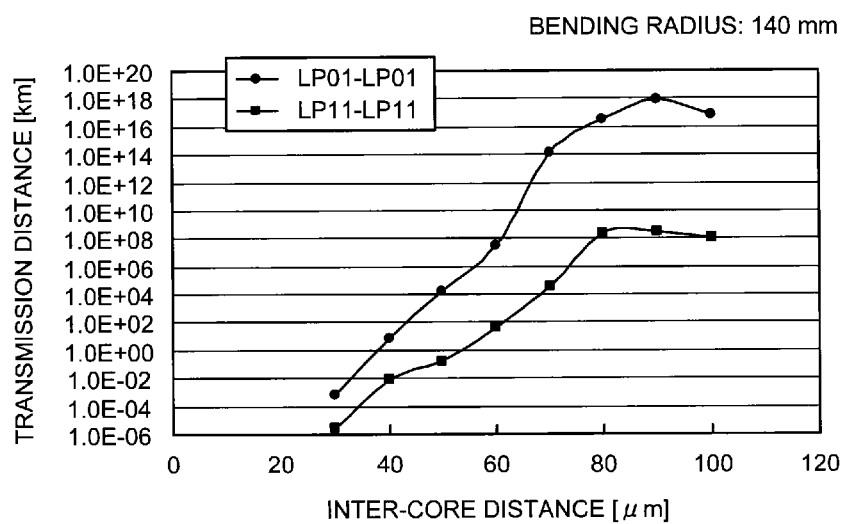
FIG. 63 is a graph illustrating relations between inter-core distances and transmission distances when the bending radius is 140 mm.

FIG. 58 is a schematic cross sectional view of a holey fiber (HF) according to a fourth embodiment of the disclosure. As illustrated in FIG. 58, this HF 30 is a so-called multi-core HF, and includes seven core portions 311 to 317 disposed apart from each other and a cladding portion 32 located around the core portions 311 to 317. The core portion 311 is disposed at an approximate center of the cladding portion 32. The core portions 312 to 317 are disposed at respective vertices of a regular hexagon with the core portion 311 at a center. The cladding portion 32 includes a plurality of holes 33 periodically arranged around the core portions 311 to 317. The holes 33 are arranged to form a triangle lattice L2 and form regular-hexagon-shaped layers surrounding the core portions 311 to 317. Each hole 33 has a diameter d. A lattice constant of the triangular lattice L2, i.e., a center-to-center distance between the holes 33, is $\Lambda$. In the HF 30, the core portions 311 to 317 are surrounded by at least five layers of the holes, and four of the holes are interposed between the respective core portions 311 to 317. The core portions 311 to 317 and the cladding portion 32 are made of pure quartz glass containing no dopant for adjusting refractive indices thereof.

The HF 30 enables light of a use wavelength bandwidth to propagate in a plurality of propagation modes and confinement loss of each propagation mode to be equal to or less than 1 dB/km in the use wavelength bandwidth by setting $\Lambda$ and $d/\Lambda$ to predetermined values. The use wavelength bandwidth is a predetermined bandwidth of 100 nm or wider at a range of the visible light bandwidth to the communication wavelength bandwidth (approximately 0.45 µm to 1.65 µm). As a result, multi-mode transmission is achievable with low loss over a broad bandwidth of 100 nm or wider, and optical transmission with a larger transmission capacity than that of the conventional technique is achievable. The use wavelength bandwidth is preferably equal to or greater than 200 nm, and more preferably equal to or greater than 300 nm, equal to or greater than 500 nm, or equal to or greater than 1000 nm. When the bending loss of the HF 30 is equal to or less than 100 dB/m, it is preferable for practical use.

Preferable values of $\Lambda$ and $d/\Lambda$ for the HF 30 may be set similarly to those for the HF 10 according to the first embodiment described with reference to FIGS. 2 to 46.

Optical crosstalk in the HF 30 is described below. For multi-core HFs such as the HF 30, the optical crosstalk between core portions is preferably small to suppress interference among optical signals transmitted in the core portions 311 to 317. If an effective core area of each core portion is large, the optical crosstalk becomes larger. Setting of a distance between the core portions that allows the optical crosstalk to be suppressed is described below for a condition under which the effective core area is relatively large with $\Lambda$=13.5 µm and $d/\Lambda$=0.6 in the HF 30 as illustrated in FIG. 32. When $\Lambda$=13.5 µm and $d/\Lambda$=0.6 as illustrated in FIG. 32, the effective core area in the LP01 mode is 168.72 µm$^2$ at a wavelength of 1.55 µm, for example.

In the HF 30, neighboring core portions with respect to the core portion 311 are the core portions 312 to 317, and the number of these neighboring core portions is six. With respect to each of the core portions 312 to 317, the number of neighboring core portions is three and the other three core portions are more separated than the three neighboring core portions. The crosstalk between the core portions is abruptly reduced as the separated distance increases and thus only the crosstalk among the neighboring core portions needs to be taken into consideration.

In the following description, the crosstalk between two neighboring core portions is calculated. The core portion 311 has six neighboring core portions and each of the core portions 312 to 317 has three neighboring core portions, and thus the core portion 311 receives six times as much interference as that of the crosstalk between two neighboring core portions, while each of the core portions 312 to 317 receives three times as much interference as that of the crosstalk between two neighboring core portions.

In the HF 30, light is propagated in two or more propagation modes and thus, the optical crosstalk among the propagation modes needs to be taken into consideration. However, the crosstalk between modes of different types is smaller than that between modes of the same type. Therefore, only the crosstalk between modes of the same type will be described below.

The optical crosstalk may depend on a bending radius of the HF 30. Calculation results for optical crosstalk when the HF 30 is bent at various bending radii are described below.

FIG. 59 is a table illustrating a relation between a separated distance between the core portions (inter-core distance), and a length (transmission distance) of the HF 30 for which the optical crosstalk between the propagation modes becomes −30 dB, when the two modes LP01 and LP11 are propagated. FIGS. 60 to 64 are graphs illustrating relations between inter-core distances and transmission distances when the bending radii are 20 mm, 60 mm, 100 mm, 140 mm, and 180 mm, respectively. In FIGS. 59 to 64, "LP01-LP01" means the optical crosstalk between the LP01 modes of the neighboring core portions, for example.

The inter-core distance needs to be determined such that a desired crosstalk is achieved for propagation modes between which the strongest optical coupling and the largest crosstalk occur. If this is done, the crosstalk between the other propagation modes satisfies a desired value. As illustrated in FIGS. 59 to 64, the optical coupling is large between the LP11 modes. Therefore, when the bending radius is 20 mm, the inter-core distance is set to 69 µm in order to cause the crosstalk between the LP11 modes to be −30 dB at the transmission distance of 10000 km (1.0E+04 km), for example. When the inter-core distance is set to 69 µm or greater, the crosstalk at the transmission distance of 10000 km is equal to or less than −30 dB. The transmission distance of 10000 km, which is the trans-Pacific distance, is preferable, as this is a distance for which optical signals are transmittable sufficiently distantly.

Figures 64, 65:
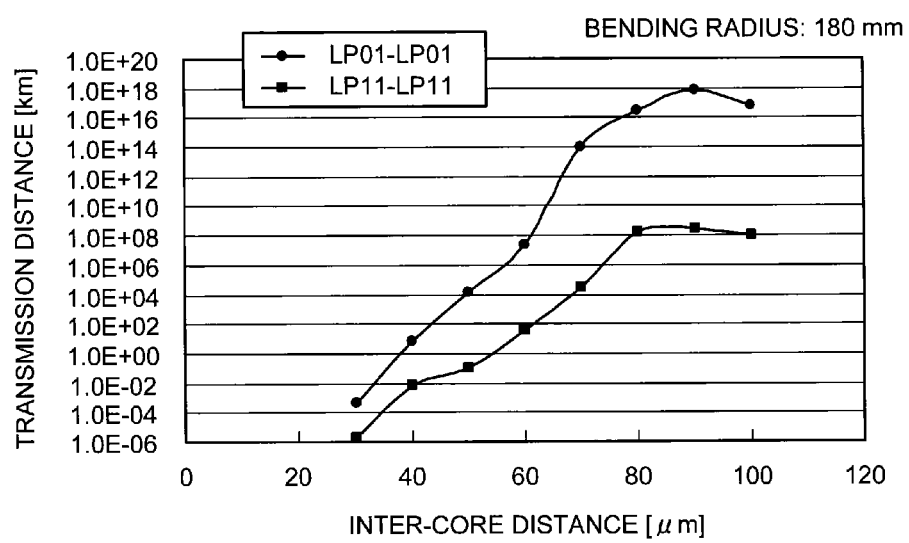
FIG. 64 is a graph illustrating relations between inter-core distances and transmission distances when the bending radius is 180 mm.
FIG. 65 is a table illustrating a relation between the bending radius of the HF and the inter-core distance at which crosstalk between LP11 modes is −30 dB at a transmission distance of 10000 km.

FIG. 65 is a table illustrating a relation between the bending radii of the HF 30 and the inter-core distances with which the crosstalk between the LP11 modes becomes −30 dB at the transmission distance of 10000 km. When the two modes LP01 and LP11 are propagated in the HF 30 and the optical crosstalk is desired to be equal to or less than −30 dB at the transmission distance of 10000 km, the inter-core distance is set to a value equal to or larger than that illustrated in FIG. 65.

Each of the core portions 311 to 317 of the HF 30 is surrounded by the holes 33 common among them and thus has a separated distance from a neighboring core portion being an integral multiple of Λ, which is the center-to-center distance between the holes 33. The inter-core distance is thus preferably a value equal to or greater than that illustrated in FIG. 65 and the integral multiple of Λ.

As illustrated in FIG. 65, the inter-core distance with which the crosstalk becomes −30 dB does not heavily depend on the bending radius when the bending radius is in a range of 20 mm to 180 mm preferably. When the bending radius is greater than 180 mm, dependence of the inter-core distance with which the crosstalk becomes −30 dB on the bending radius clearly becomes less.

Figure 66:
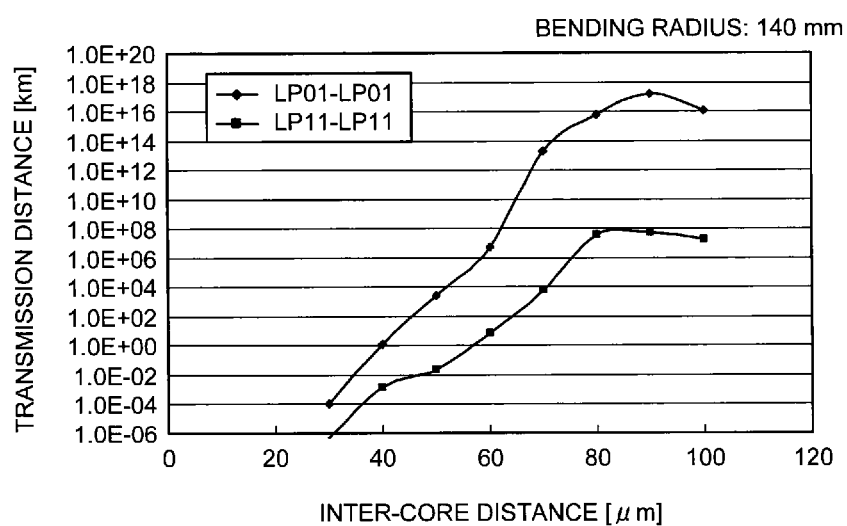
FIG. 66 is a graph illustrating relations between inter-core distances and transmission distances when the bending radius is 140 mm.

With respect to the core portion 311 located at the center of the HF 30, the core portion 311 having six neighboring core portions and receiving six times as much interference as that of the crosstalk between two core portions, on an assumption that the inter-core distance was 70 µm and the bending radius was 140 mm, a relation between the inter-core distance and the transmission distance was examined. The results are illustrated in FIG. 66. As illustrated in FIG. 66, the transmission distance at which the crosstalk became −30 dB is equal to or greater than 5000 km and transmission is possible over a transmission distance at the trans-Atlantic distance level with low crosstalk.

To realize transmission over a distance equal to or greater than 10000 km, which is the trans-Pacific distance, with the crosstalk equal to or less than −30 dB in the core portion 311 located at the center, the inter-core distance is set to approximately 75 µm.

The HF 30 according to the fourth embodiment has seven core portions but the number of core portions is not particularly limited. For example, when the core portions are arranged to be hexagonally close-packed on a cross-sectional surface of the HF, twelve core portions may be additionally arranged outside the core portions 312 to 317 in the HF 30, to form a HF having 19 core portions.

Fifth Embodiment

Figure 67:
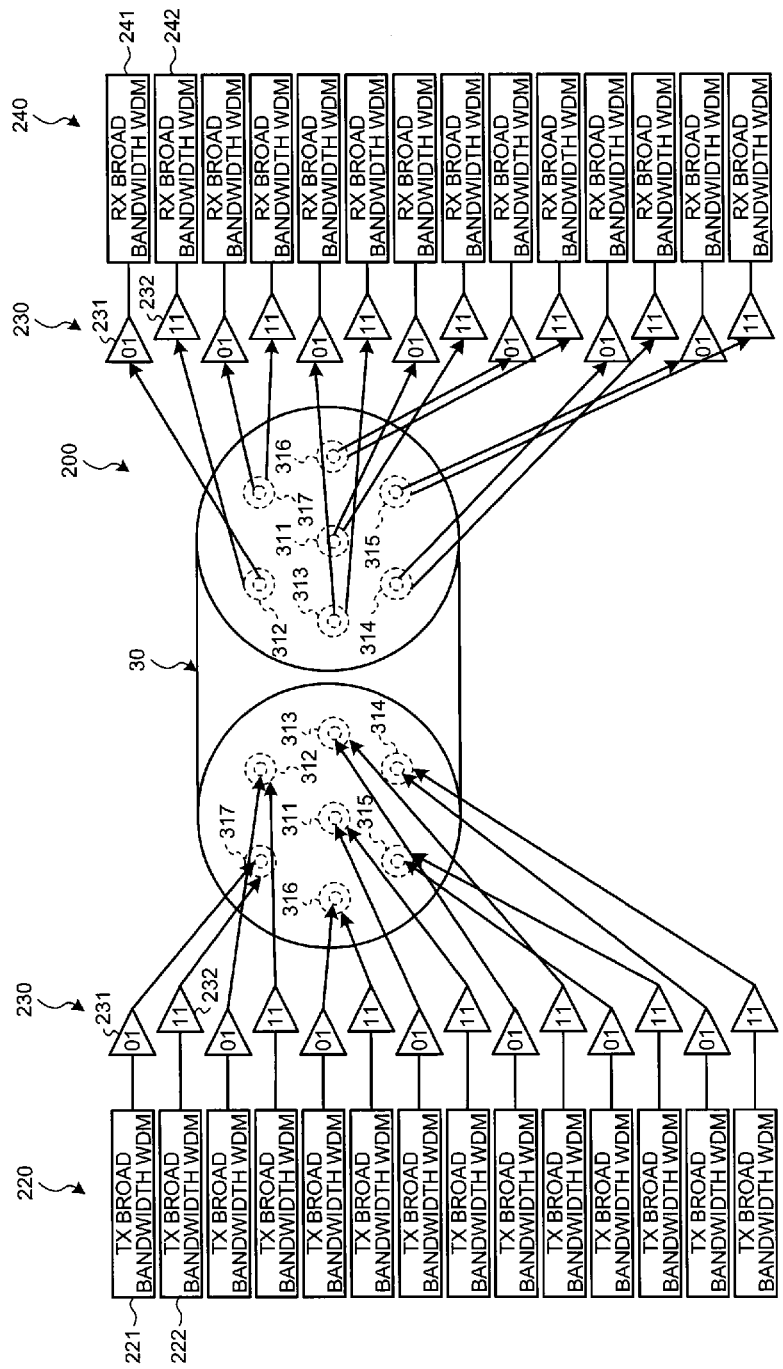
FIG. 67 is a schematic structural view of an optical transmission system according to a fifth embodiment.

FIG. 67 is a schematic structural view of an optical transmission system according to a fifth embodiment of the disclosure. As illustrated in FIG. 67, an optical transmission system 200 includes an optical transmission device 220, an optical amplification unit 230 coupled to the optical transmission device 220, the HF 30 according to the fourth embodiment coupled to the optical amplification unit 230, another optical amplification unit 230 coupled to the HF 30, and an optical receiving device 240 coupled to the another optical amplification unit 230.

Structure and operation of the optical transmission system 200 will be described.

The optical transmission device 220 includes a plurality of optical transmitters (TX) 221 and 222 each having a light source such as a semiconductor laser. The optical transmitter 221 outputs wavelength division multiplexed (WDM) signal light for LP01 mode transmission. The optical transmitter 222 outputs WDM signal light for LP11 mode transmission. The WDM signal light includes a plurality of signal light beams allocated to a wavelength grid defined by the ITU-T, for example. The signal light beams included in the WDM signal light are arranged over a broad wavelength bandwidth of 100 nm or wider, for example.

The optical amplification unit 230 includes a plurality of optical amplifiers 231 and 232. The optical amplifier 231 is configured to amplify the WDM signal light for LP01 mode transmission output from the optical transmitter 221. The optical amplifier 232 is configured to amplify the WDM signal light for LP11 mode transmission output from the optical transmitter 222. The optical amplifiers 231 and 232 each include an optical fiber amplifier or a semiconductor optical amplifier.

The WDM signal light for LP01 mode transmission output from the optical amplifier 231 and the WDM signal light for LP11 mode transmission output from the optical amplifier 232 are input to the respective core portions 311 to 317. The WDM signal light for LP01 mode transmission is input so as to be coupled into the LP01 mode in the respective core portions 311 to 317 while the WDM signal light for LP11 mode transmission is input so as to be coupled into the LP11 mode in the respective core portions 311 to 317. The input of the WDM signal light to the HF 30 may be realized by an optical fiber bundle formed by bundling optical fibers, for example. The HF 30 transmits the input WDM signal light in the respective LP01 and LP11 modes.

The optical amplification unit 230 coupled to the output side of the HF 30 also includes a plurality of optical amplifiers 231 and 232. The optical amplifier 231 is configured to amplify the WDM signal light for LP01 mode transmission transmitted through the HF 30. The optical amplifier 232 is configured to amplify the WDM signal light for LP11 mode transmission transmitted through the HF 30. The input of the WDM signal light output from the HF 30 to the respective optical amplifiers 231 and 232 may also be realized by the optical fiber bundle, for example.

The optical receiving device 240 includes a plurality of optical receivers (RX) 241 and 242 each having a light receiving element that converts received light into an electrical signal, such as a photo diode. The optical receiver 241 receives the WDM signal light transmitted through the HF 30 in the LP01 mode. The optical receiver 242 receives the WDM signal light transmitted through the HF 30 in the LP11 mode. The WDM signal light received by the optical receivers 241 and 242 are converted into electrical signals. The electrical signals are processed by a predetermined signal processor connected to the optical receivers 241 and 242.

In the optical transmission system 200, WDM signal light of a broad bandwidth is transmitted by spatial multiplexing and mode multiplexing using the HF 30, which is a multi-core type optical fiber capable of propagating two modes. The optical transmission system 200 is able to achieve wavelength multiplexing, spatial multiplexing and mode multiplexing transmission over a broad bandwidth, and thus an optical transmission system having a huge transmission capacity is able to be realized.

Sixth Embodiment

Figure 68:
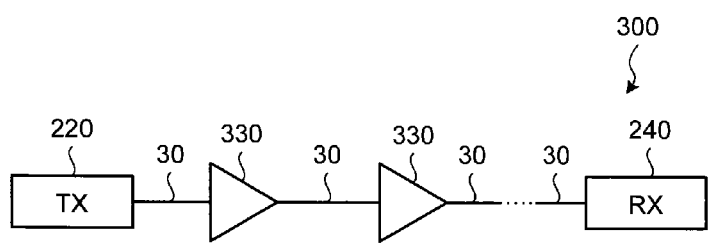
FIG. 68 is a schematic structural view of an optical transmission system according to a sixth embodiment.

FIG. 68 is a schematic structural view of an optical transmission system according to a sixth embodiment. As illustrated in FIG. 68, an optical transmission system 300 has a structure in which a plurality of HFs 30 and a plurality of multi-core optical amplifiers 330 are alternately connected between the optical transmission device 220 and the optical receiving device 240 illustrated in FIG. 67.

The multi-core optical amplifier 330 optically amplifies signal light transmitted by the HF 30 and compensates transmission loss thereof. An optical fiber amplifier, such as an erbium-doped optical fiber amplifier or a Raman amplifier, which has an amplifying optical fiber formed of a multi-core optical fiber, may be used as the multi-core optical amplifier 330, for example. Each core portion of the amplifying multi-core optical fiber is configured to amplify mode-multiplexed WDM signal light. Instead, the multi-core optical amplifier 330 may be configured to multiplex the WDM signal light transmitted through the core portions of the HF 30 into a single optical fiber using an optical fiber bundle or the like, and to amplify it with an optical fiber amplifier using an amplifying optical fiber having a single core portion. The multi-core optical amplifier 330 may be formed of a semiconductor optical amplifier.

The optical transmission system 300 is preferable for achieving longer distance optical transmission, because the HFs 30 are connected multistage-wise with the multi-core optical amplifiers 330 serving as optical repeaters in the optical transmission system 300.

Seventh Embodiment

Figure 69:
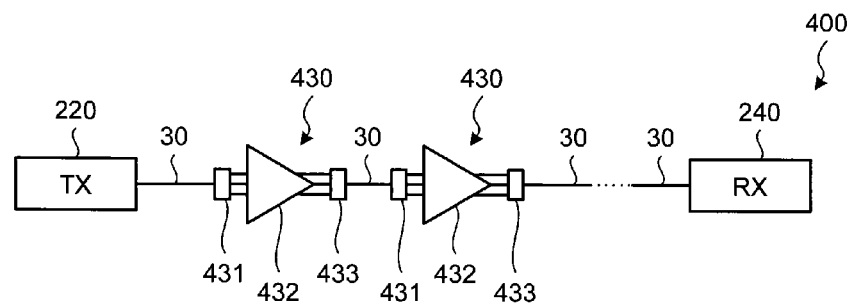
FIG. 69 is a schematic structural view of an optical transmission system according to a seventh embodiment.

FIG. 69 is a schematic structural view of an optical transmission system according to a seventh embodiment. As illustrated in FIG. 69, an optical transmission system 400 has a configuration in which a plurality of HFs 30 and a plurality of multi-core optical amplifiers 430 are alternately connected between the optical transmission device 220 and the optical receiving device 240 illustrated in FIG. 67.

The multi-core optical amplifier 430 includes an optical connector 431, an optical amplification unit 432, and an optical connector 433. The optical amplification unit 432 includes three optical fiber amplifiers. Each of the three optical fiber amplifier is an optical fiber amplifier such as a rare-earth-doped optical fiber amplifier or a Raman amplifier having an amplifying optical fiber formed of a multi-core optical fiber, for example. The amplifying multi-core optical fibers of the optical fiber amplifiers are configured to amplify the respective mode multiplexed WDM signal light in the S band (1.46 μm to 1.53 μm), C band (1.53 μm to 1.565 μm), and L band (1.565 μm to 1.625 μm). The optical connector 431 is configured to input the signal light transmitted through the HF 30 to the respective optical fiber amplifiers for the bands of the optical amplification unit 432 for the S, C, and L bands respectively. The optical connector 433 is configured to input the WDM signal light of each band amplified by the corresponding optical fiber amplifier of the optical amplification unit 432 to the corresponding core portion of the HF 30 per WDM signal light.

In the optical transmission system 400, WDM signal light of a broad bandwidth is transmitted by spatial multiplexing and mode multiplexing using the HF 30, which is a multi-core type optical fiber capable of propagating two modes. The optical transmission system 400 is able to achieve wavelength multiplexing, spatial multiplexing and mode multiplexing transmission over a broad bandwidth, and thus an optical transmission system having a huge transmission capacity is able to be realized. In the optical transmission system 400, the WDM signal light is divided into three bands and the divided WDM signal light is amplified by the optical amplifier suitable for amplifying the corresponding band. As a result, an optical transmission system having a better transmission quality is achievable.

In the above-described embodiments, the HF has a triangular-lattice-type hole structure and the solid-type optical fiber has the W-type refractive index profile, but the disclosure is not limited thereto, and is applicable to a HF having another type of hole structure or a solid-type optical fiber having another refractive index profile such as a single peak type, a step type, a segment core type, a W+side core type, a trench type, a ring type or ring-and-depressed-layer, a step type, or a combination with a side core. That is, the effects of the embodiments are achieved by any optical fiber that propagates light of a use wavelength bandwidth of 100 nm or wider in a plurality of propagation modes and has confinement loss in each propagation mode at the use wavelength bandwidth of equal to or less than 1 dB/km.

According to an embodiment of the disclosure, an optical fiber having a large transmission capacity is achievable because multi-mode transmission is possible over a broad use wavelength bandwidth.

Additional advantages and modifications will readily occur to those skilled in the art. Therefore, the disclosure in its broader aspects is not limited to the specific details, representative embodiments and alternate examples shown and described herein. Accordingly, various modifications may be made without departing from the spirit or scope of the general inventive concept as defined by the appended claims and their equivalents. Furthermore, the above-mentioned embodiments and the alternate examples can be arbitrarily combined with one another.

What is claimed is:

1. An optical fiber that propagates light over a use wavelength bandwidth of 100 nm or wider in a plurality of propagation modes, comprising:

a core portion including a center core portion and an outer core portion that is formed around the center core portion and has a refractive index lower than a maximum refractive index of the center core portion; and a cladding portion that is formed around the core portion and has a refractive index lower than the maximum refractive index of the center core portion and higher than the refractive index of the outer core portion, wherein a confinement loss is equal to or less than 1 dB/km in three or fewer of propagation modes over the use wavelength bandwidth, a bending loss is equal to or less than 100 dB/m in each of the plurality of propagation modes over the use wavelength bandwidth when the optical fiber is bent at a diameter of 20 mm, a relative refractive-index difference $\Delta 1$ of the center core portion to the cladding portion is 0.33% to 0.46%, a relative refractive-index difference $\Delta 2$ of the outer core portion to the cladding portion is equal to or greater than −0.1% and less than 0%, a diameter of the center core portion is 11.8 μm to 17.2 μm, and a ratio of an outer diameter of the outer core portion to a diameter of the center core portion is equal to or greater than 2.0 and equal to or less than 3.0.

2. The optical fiber according to claim 1, comprising a plurality of core portions.

3. The optical fiber according to claim 2, wherein a separated distance between the plurality of core portions is set such that an optical crosstalk between the plurality of core portions in the optical fiber of a length of 10000 km is equal to or less than −30 dB at a wavelength of 1550 nm.

4. The optical fiber according to claim 2, wherein a number of the plurality of core portions is seven.

5. The optical fiber according to claim 2, wherein a number of the plurality of core portions is 19.

6. The optical fiber according to claim 1, wherein the plurality of propagation modes, in which the light is propagated, are two in number and include an LP01 mode that is a fundamental mode, an LP11 mode that is a first higher-order mode, and an LP11 mode that is a first higher-order mode.

7. The optical fiber according to claim 1, wherein the plurality of propagation modes, in which the light is propagated, are three in number and include an LP01 mode that is a fundamental mode, an LP11 mode that is a first higher-order mode, and an LP21 mode that is a second higher-order mode.

8. The optical fiber according to claim 1, wherein the use wavelength bandwidth is 200 nm or wider.

9. The optical fiber according to claim 1, wherein the use wavelength bandwidth is 300 nm or wider.

10. The optical fiber according to claim 1, wherein the use wavelength bandwidth is 500 nm or wider.

11. The optical fiber according to claim 1, wherein the use wavelength bandwidth is 1000 nm or wider.

12. The optical fiber according to claim 1, wherein an outer diameter of the cladding portion is equal to or greater than 125 mm.

13. The optical fiber according to claim 1, wherein an outer diameter of the cladding portion is equal to or greater than 180 mm.

14. An optical transmission system, comprising:
the optical fiber according to claim 1;
an optical transmission device that outputs signal light to be propagated through the optical fiber in a plurality of propagation modes; and
an optical receiving device that receives the signal light propagated through the optical fiber in the plurality of propagation modes.

15. The optical transmission system according to claim 14, further comprising an optical amplifier that amplifies the signal light propagated through the optical fiber in the plurality of propagation modes per propagation mode.

* * * * *